United States Patent
Dangi et al.

(10) Patent No.: US 9,261,969 B2
(45) Date of Patent: Feb. 16, 2016

(54) GESTURE DETECTING DEVICE, GESTURE RECOGNITION DEVICE

(71) Applicant: JFE Systems, Inc., Tokyo (JP)

(72) Inventors: Ryoichi Dangi, Yotsukaido (JP); Noriyuki Ohashi, Chiba (JP); Yuko Arai, Chiba (JP); Toshiki Tsuruoka, Kisarazu (JP); Atsushi Miyauchi, Chiba (JP)

(73) Assignee: JFE Systems, Inc., Tokyo (JP)

( * ) Notice: Subject to any disclaimer, the term of this patent is extended or adjusted under 35 U.S.C. 154(b) by 0 days.

(21) Appl. No.: 14/542,249

(22) Filed: Nov. 14, 2014

(65) Prior Publication Data

US 2015/0130709 A1    May 14, 2015

(30) Foreign Application Priority Data

Nov. 14, 2013  (JP) ................................. 2013-236049

(51) Int. Cl.
*G09G 5/00* (2006.01)
*G06F 3/01* (2006.01)
*G09G 5/18* (2006.01)

(52) U.S. Cl.
CPC ........ *G06F 3/017* (2013.01); *G09G 5/18* (2013.01); *G06F 2200/1637* (2013.01)

(58) Field of Classification Search
CPC ...... G06F 3/014; G06F 3/0346; G06F 3/0416; G06F 3/04815; G06F 2200/1637; A63F 13/06; H04M 2250/12
See application file for complete search history.

(56) References Cited

U.S. PATENT DOCUMENTS

| | | | | |
|---|---|---|---|---|
| 5,602,566 A * | 2/1997 | Motosyuku | ........... | G06F 1/1626 345/156 |
| 6,466,198 B1 * | 10/2002 | Feinstein | .............. | G06F 1/1626 345/158 |
| 7,086,164 B2 * | 8/2006 | Satoh | ..................... | G01C 19/36 33/1 E |
| 7,365,734 B2 * | 4/2008 | Fateh | ..................... | G06F 1/1626 345/156 |
| 7,489,299 B2 * | 2/2009 | Liberty | ................... | G06F 3/017 345/158 |
| 7,519,468 B2 * | 4/2009 | Orr | ........................ | G01C 21/36 340/990 |
| 7,601,066 B1 * | 10/2009 | Masuyama | ............ | A63F 13/06 345/156 |
| 7,907,838 B2 * | 3/2011 | Nasiri | ..................... | A63F 13/06 396/55 |
| 7,980,952 B2 * | 7/2011 | Ohta | ....................... | A63F 13/06 345/156 |
| 2004/0130524 A1 * | 7/2004 | Matsui | .................. | G06F 1/1626 345/156 |
| 2005/0212911 A1 * | 9/2005 | Marvit | ................... | G06F 3/017 398/154 |

(Continued)

FOREIGN PATENT DOCUMENTS

| JP | 2007-299330 A | 11/2007 |
|---|---|---|
| JP | 2011-076180 A | 4/2011 |

(Continued)

*Primary Examiner* — Joe H Cheng
(74) *Attorney, Agent, or Firm* — Venable LLP; Michael A. Sartori

(57) ABSTRACT

An object of the present invention is to make it possible for smart devices such as smartphones to provide new operability to users. A gesture detecting device includes a motion detecting unit and a processor. The processor calculates deviation value outputted by the motion detecting unit. At timing when the deviation value exceeds a threshold value at the time of shaking out, the processor obtains a direction determination value at the time of shaking out, whereas at timing when the deviation value falls below a threshold value at the time of shaking back the smartphone, the processor obtains a direction determination value at the time of shaking back. Further, on the basis of a combination of the direction determination value, the processor detects a gesture of the gesture detecting device.

10 Claims, 45 Drawing Sheets

(56) References Cited

U.S. PATENT DOCUMENTS

| | | | |
|---|---|---|---|
| 2006/0052109 A1* | 3/2006 | Ashman | G06F 1/1626 455/440 |
| 2007/0002018 A1* | 1/2007 | Mori | G06F 1/1626 345/158 |
| 2008/0001770 A1* | 1/2008 | Ito | G06F 1/1626 340/669 |
| 2009/0248352 A1* | 10/2009 | Hirobe | G01C 17/28 702/150 |
| 2009/0284463 A1* | 11/2009 | Morimoto | G06F 1/1616 345/156 |
| 2010/0248833 A1* | 9/2010 | Okamura | A63F 13/06 463/36 |
| 2011/0057880 A1* | 3/2011 | Kasahara | G06F 1/1626 345/158 |
| 2014/0085341 A1* | 3/2014 | Shin | G09G 5/38 345/659 |
| 2014/0111458 A1 | 4/2014 | Konami | |

FOREIGN PATENT DOCUMENTS

| | | |
|---|---|---|
| JP | 2012-506100 A | 3/2012 |
| JP | 2012-256100 A | 12/2012 |
| JP | 2013-131853 A | 7/2013 |
| WO | WO-2010/045498 A1 | 4/2010 |
| WO | WO-2013/031281 A1 | 3/2013 |

* cited by examiner

| ACTUAL GESTURE | GESTURE DETERMINATION VALUE | X AXIS DETERMINATION F | LEFT-RIGHT DETERMINATION VALUE | | Z AXIS DETERMINATION F | FRONT-BACK DETERMINATION VALUE | |
|---|---|---|---|---|---|---|---|
| | | | SHAKING OUT | SHAKING BACK | | SHAKING OUT | SHAKING BACK |
| RIGHTWARD SHAKE GESTURE | R | R | 2 | 3 | | | |
| LEFTWARD SHAKE GESTURE | L | L | -2 | -3 | | | |
| FRONTWARD SHAKE GESTURE | F | | | | F | 2 | 3 |
| BACKWARD SHAKE GESTURE | B | | | | B | -2 | -3 |
| RIGHT-FRONTWARD SHAKE GESTURE | rf | R | 2 | 3 | F | 2 | 3 |
| RIGHT-BACKWARD SHAKE GESTURE | rb | R | 2 | 3 | B | -2 | -3 |
| LEFT-FRONTWARD SHAKE GESTURE | lf | L | -2 | -3 | F | 2 | 3 |
| LEFT-BACKWARD SHAKE GESTURE | lb | L | -2 | -3 | B | -2 | -3 |
| RIGHTWARD SPIN GESTURE | cr | cr | 2 | 3 | | | |
| LEFTWARD SPIN GESTURE | cl | cl | -2 | -3 | | | |
| FRONTWARD SPIN GESTURE | cf | | | | cf | 2 | 3 |
| BACKWARD SPIN GESTURE | cb | | | | cb | -2 | -3 |
| RIGHT-FRONTWARD SPIN GESTURE | crf | cr | 2 | 3 | cf | 2 | 3 |
| RIGHT-BACKWARD SPIN GESTURE | crb | cr | 2 | 3 | cb | -2 | -3 |
| LEFT-FRONTWARD SPIN GESTURE | clf | cl | -2 | -3 | cf | 2 | 3 |
| LEFT-BACKWARD SPIN GESTURE | clb | cl | -2 | -3 | cb | -2 | -3 |

FIG.12

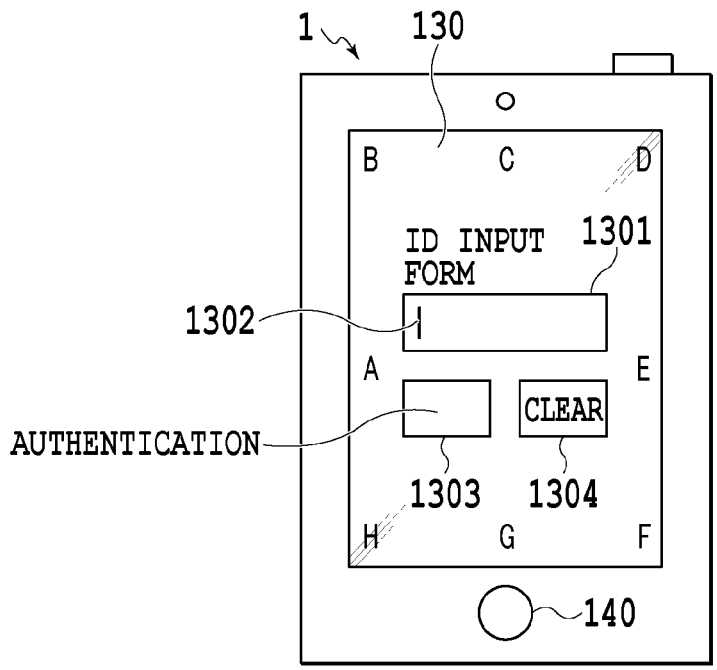
(1) ID INPUT FORM SCREEN DISPLAY EXAMPLE
RIGHT-FRONTWARD, LEFTWARD, BACKWARD, AND RIGHTWARD SHAKE GESTURES
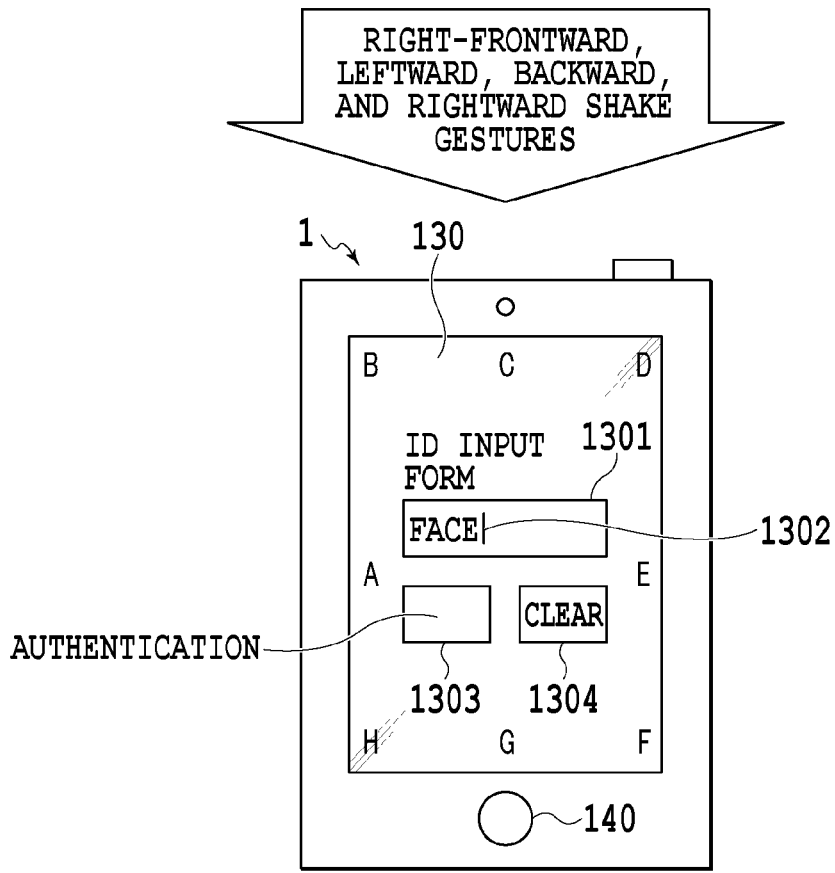
FIG.13  (2) ID INPUT FORM SCREEN DISPLAY EXAMPLE

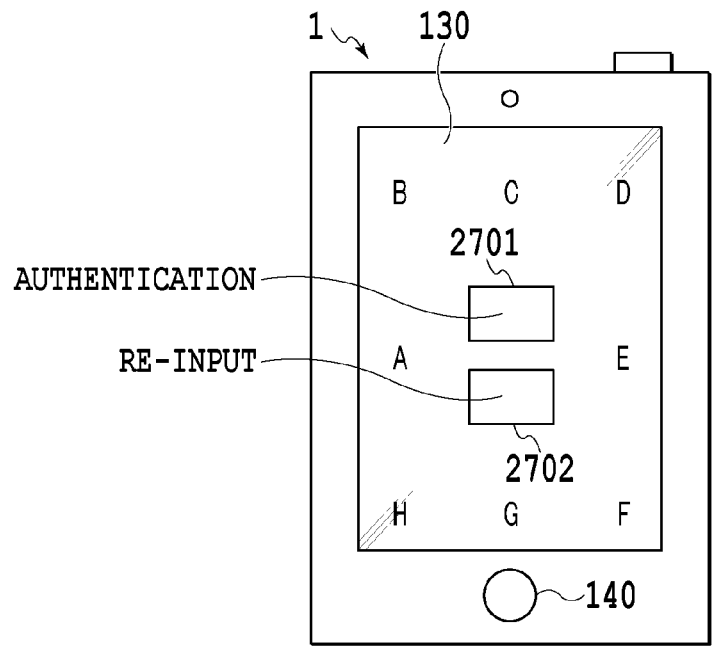
(1) AUTHENTICATION PROCESS SCREEN DISPLAY EXAMPLE
SUCCESSIVE LEFTWARD, LEFT-BACKWARD, BACKWARD, LEFTWARD, BACKWARD, LEFTWARD, AND BACKWARD SHAKE GESTURES
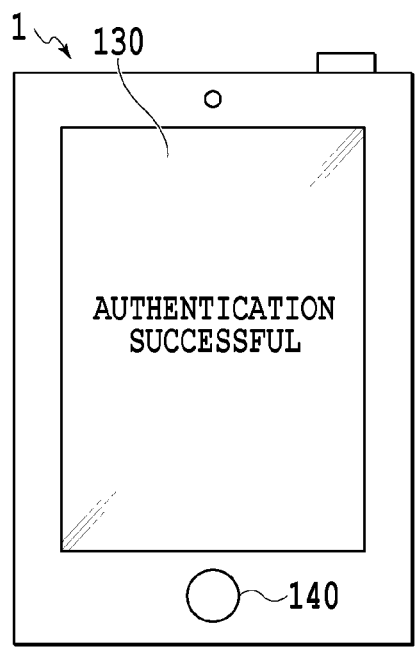
FIG.27 (2) AUTHENTICATION RESULT SCREEN DISPLAY EXAMPLE

| GESTURE | GESTURE DETERMINATION VALUE | SOUND OUTPUT | IMAGE OUTPUT |
|---|---|---|---|
| RIGHTWARD SHAKE GESTURE | R | DO | A |
| LEFTWARD SHAKE GESTURE | L | RE | B |
| FRONTWARD SHAKE GESTURE | F | MI | C |
| BACKWARD SHAKE GESTURE | B | FA | D |
| RIGHT-FRONTWARD SHAKE GESTURE | rf | SOL | E |
| RIGHT-BACKWARD SHAKE GESTURE | rb | LA | F |
| LEFT-FRONTWARD SHAKE GESTURE | lf | SI | G |
| LEFT-BACKWARD SHAKE GESTURE | lb | DO + 1 | H |
| RIGHTWARD SPIN GESTURE | cr | SOUND EFFECT 1 | I |
| LEFTWARD SPIN GESTURE | cl | SOUND EFFECT 2 | J |
| FRONTWARD SPIN GESTURE | cf | SOUND EFFECT 3 | K |
| BACKWARD SPIN GESTURE | cb | SOUND EFFECT 4 | L |
| RIGHT-FRONTWARD SPIN GESTURE | crf | SOUND EFFECT 5 | M |
| RIGHT-BACKWARD SPIN GESTURE | crb | SOUND EFFECT 6 | N |
| LEFT-FRONTWARD SPIN GESTURE | clf | SOUND EFFECT 7 | O |
| LEFT-BACKWARD SPIN GESTURE | clb | SOUND EFFECT 8 | P |

FIG.29

| SEQUENCE NUMBER | GESTURE | GESTURE MODE | GESTURE DETERMINATION VALUE | SOUND OUTPUT |
|---|---|---|---|---|
| 1 | LEFTWARD SHAKE GESTURE | | L | DO |
| 2 | LEFT-BACKWARD SHAKE GESTURE | | lb | RE |
| 3 | BACKWARD SHAKE GESTURE | | B | MI |
| 4 | LEFTWARD SHAKE GESTURE | | L | DO |
| 5 | BACKWARD SHAKE GESTURE | | B | MI |
| 6 | LEFTWARD SHAKE GESTURE | | L | DO |
| 7 | BACKWARD SHAKE GESTURE | | B | MI |

FIG.31

| SEQUENCE NUMBER | GESTURE | GESTURE MODE | GESTURE DETERMINATION VALUE | IMAGE OUTPUT |
|---|---|---|---|---|
| 1 | RIGHT-FRONTWARD SHAKE GESTURE | 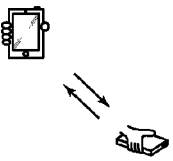 | rf | F |
| 2 | LEFTWARD SHAKE GESTURE | 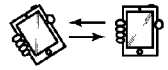 | L | A |
| 3 | BACKWARD SHAKE GESTURE | 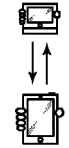 | B | C |
| 4 | RIGHTWARD SHAKE GESTURE | 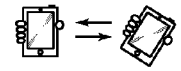 | R | E |
FIG.32

| | GESTURE | GESTURE DETERMINATION VALUE | OPERATION CONTENT |
|---|---|---|---|
| LOCAL OPERATION | RIGHTWARD SHAKE GESTURE | R | RIGHTWARD SELECTION OR RIGHTWARD SWITCHING |
| | LEFTWARD SHAKE GESTURE | L | LEFTWARD SELECTION OR LEFTWARD SWITCHING |
| | FRONTWARD SHAKE GESTURE | F | DOWNWARD SELECTION OR DOWNWARD SWITCHING |
| | BACKWARD SHAKE GESTURE | B | UPWARD SELECTION OR UPWARD SWITCHING |
| | RIGHTWARD DOUBLE SHAKE GESTURE | RR | SELECTION OF RIGHTWARD BUTTON OR INTERFACE |
| | LEFTWARD DOUBLE SHAKE GESTURE | LL | SELECTION OF LEFTWARD BUTTON OR INTERFACE |
| | FRONTWARD DOUBLE SHAKE GESTURE | FF | SELECTION OF DOWNWARD BUTTON OR INTERFACE |
| | BACKWARD DOUBLE SHAKE GESTURE | BB | SELECTION OF UPWARD BUTTON OR INTERFACE |
| GLOBAL OPERATION | SUCCESSIVE LEFTWARD, RIGHTWARD, LEFTWARD, RIGHTWARD, LEFTWARD, AND RIGHTWARD SHAKE GESTURES | LRLRLR | INITIALIZATION OF VALUE SELECTED THROUGH EACH INTERFACE |

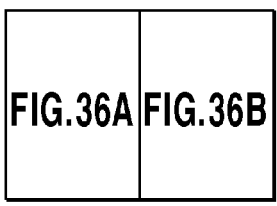
FIG. 36
FIG. 36A
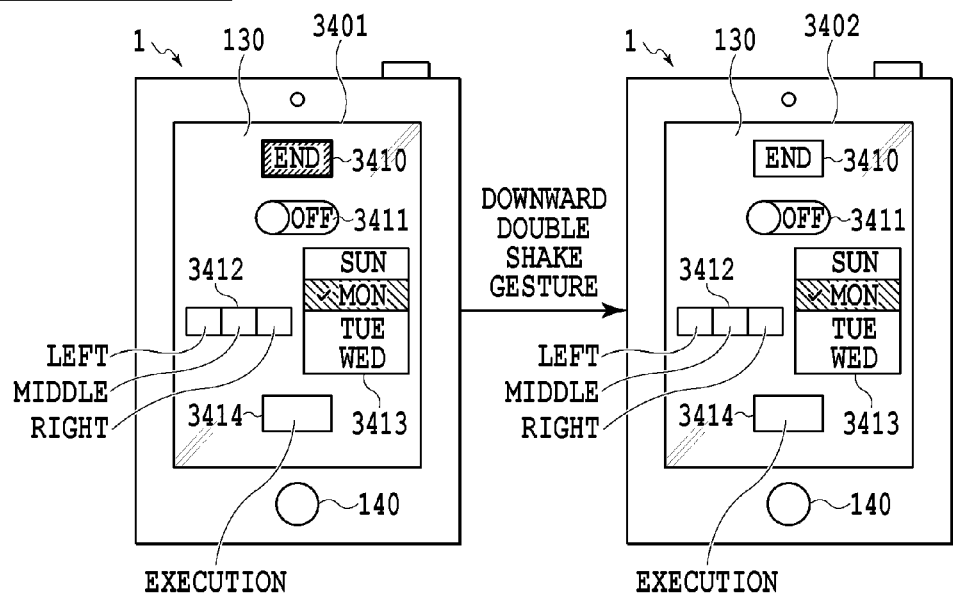
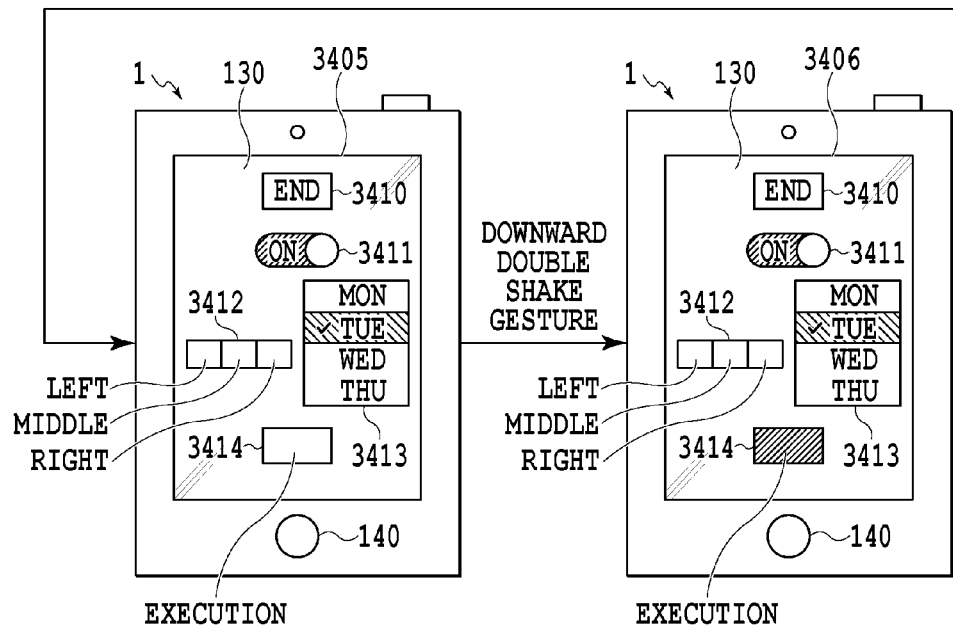

FIG.39A

CONVERSION TABLE     3901

| ACTUAL GESTURE | GESTURE DETERMINATION VALUE | NEURAL NETWORK INPUT SIGNAL |
|---|---|---|
| RIGHTWARD SHAKE GESTURE | R | +1 |
| LEFTWARD SHAKE GESTURE | L | −1 |
| FRONTWARD SHAKE GESTURE | F | +4 |
| BACKWARD SHAKE GESTURE | B | −4 |
| RIGHT-FRONTWARD SHAKE GESTURE | rf | −2 |
| RIGHT-BACKWARD SHAKE GESTURE | rb | −3 |
| LEFT-FRONTWARD SHAKE GESTURE | lf | +3 |
| LEFT-BACKWARD SHAKE GESTURE | lb | +2 |

FIG.39B

TUTOR SIGNAL DEFINITION TABLE     3902

| CODE | TUTOR SIGNAL |
|---|---|
| 1 | 1000 |
| 2 | 0100 |
| 3 | 0010 |
| 4 | 0001 |
| ... | ... |
| n | xxxx |

FIG.39C

MEANING TABLE     3903

| CODE | DEFINITION INFORMATION |
|---|---|
| 1 | A |
| 2 | △ |
| 3 | Z |
| 4 | YAMADA, TARO |
| ... | ... |
| n | yyyy |

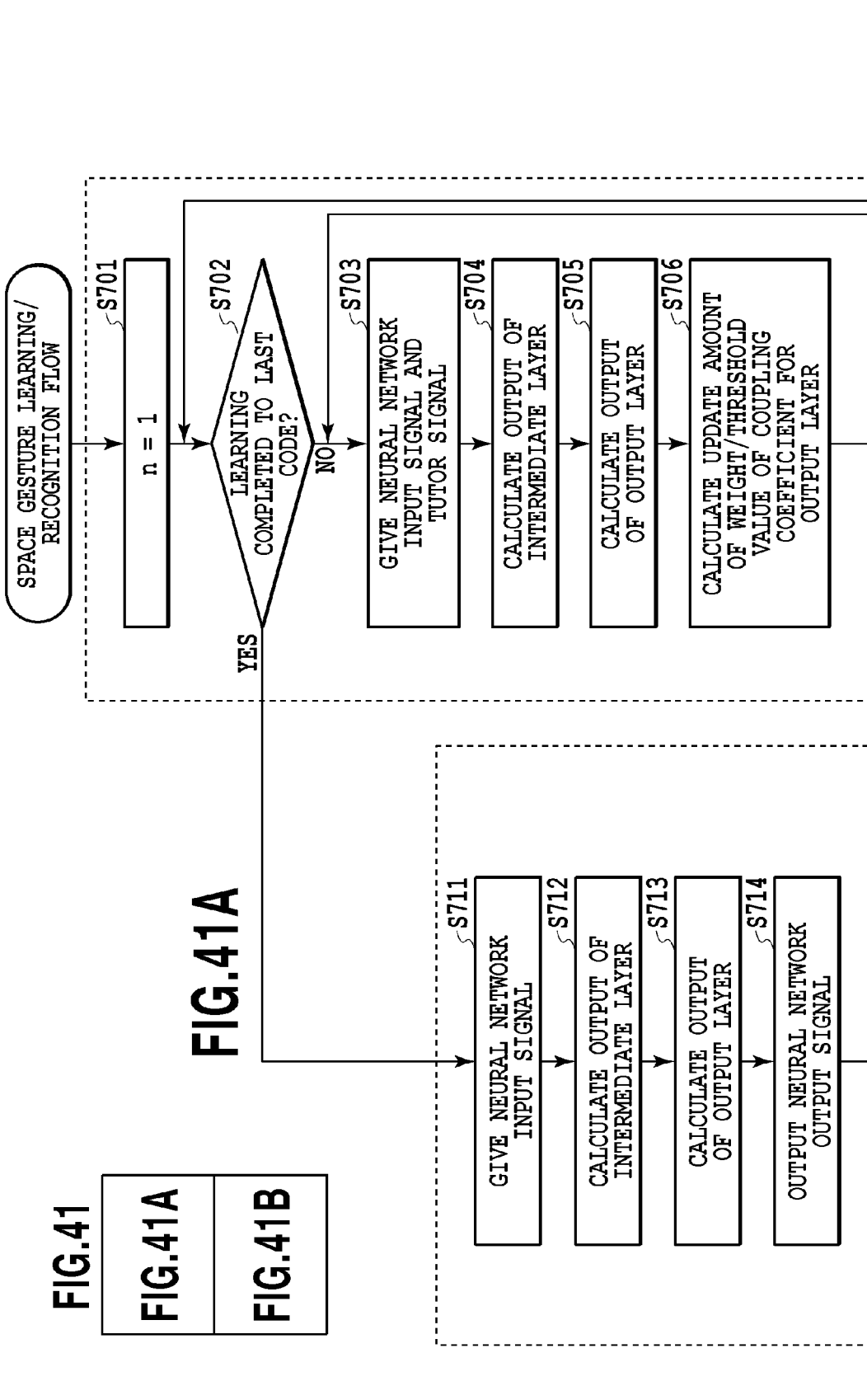

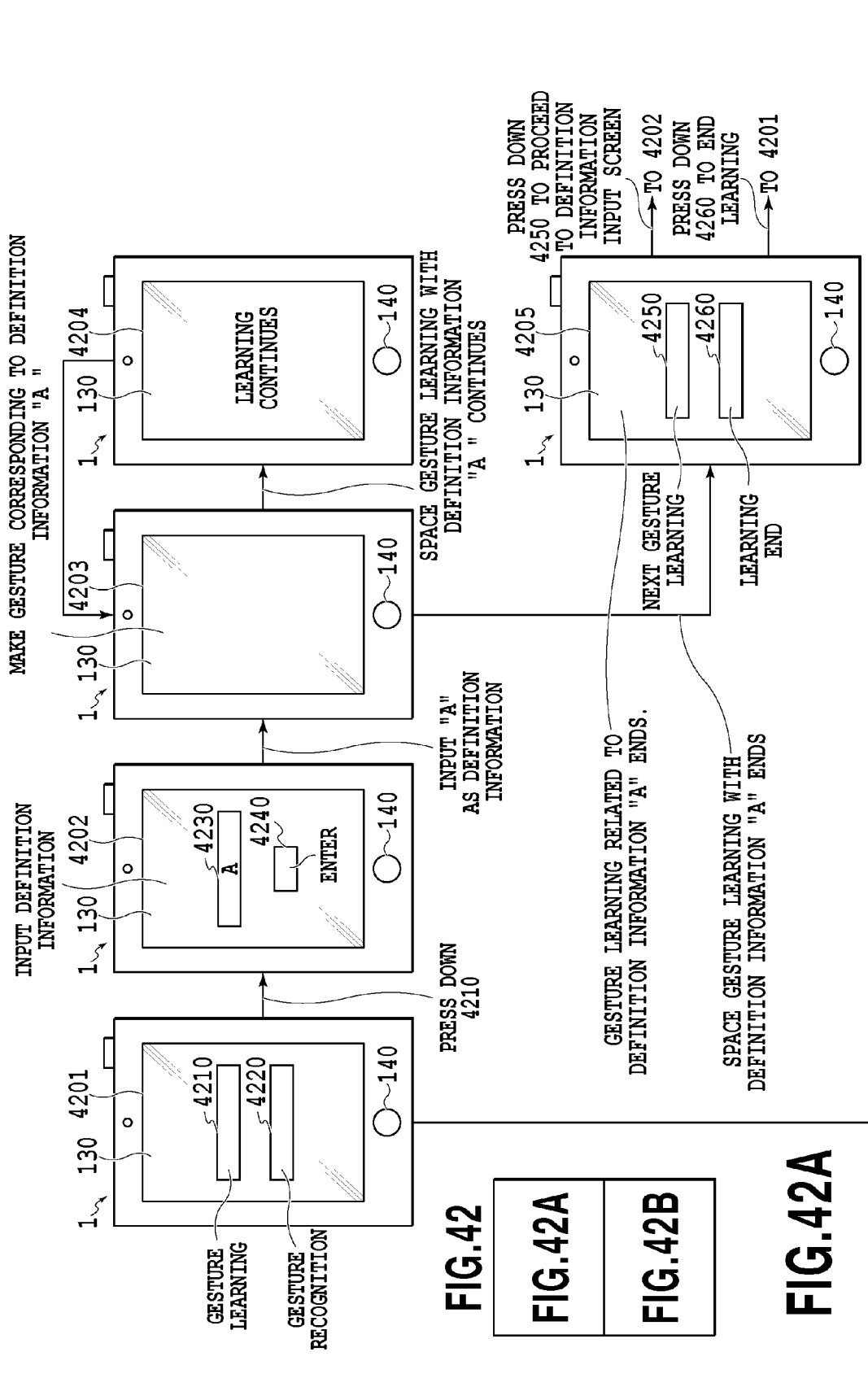

GESTURE DETECTING DEVICE, GESTURE RECOGNITION DEVICE

CROSS-REFERENCES TO RELATED APPLICATIONS

This application claims the benefit of Japanese Patent Application No. 2013-236049, filed Nov. 14, 2013, which is hereby incorporated by reference herein in its entirety.

BACKGROUND OF THE INVENTION

1. Field of the Invention

The present invention relates to a gesture detecting device and gesture recognition device. More specifically, the present invention relates to a gesture detecting device that can detect gestures, and a gesture recognition device that can recognize gestures.

2. Description of the Related Art

As a method for making smart devices such as smart phones recognize information such as characters, a known input method uses a smart keyboard displayed on a touch screen display of a smart device (for example, Japanese Patent Laid-Open No. 2012-256100, or Japanese Patent Laid-Open No. 2013-131853). Also, to operate an interface or the like displayed on the touch screen display of the smart device, a user can use a finger or a stylus pen to perform a touch operation.

However, the size of a touch screen display of a smart device is limited, and therefore inputting information such as characters through a smart keyboard may be difficult for a user. Also, when wearing gloves for going out or the like in winter, there is a problem that a smart device cannot recognize a touch operation on a touch screen display. Further, in workplaces where wearing gloves is required for on-site work, such as in factories, it is difficult to perform a touch operation on a smart device.

To solve the above problems, there is disclosed a smart device that recognizes a gesture by a user's finger through a touch screen display of the smart device and performs an operation related to the gesture.

There is also known a smartphone that recognizes a gesture in space to the smart device, and according to the recognized gesture, changes the display content of a keyboard object.

In addition, in the case where a touch operation on a smart device is difficult, a technique that operates the smart device by voice is also known; however, operability at the time of operating various buttons and various interfaces displayed on a touch screen display of the smart device is problematic.

According to the present invention, a smart device such as a smartphone detects gestures, and on the basis of the detected gestures, performs various processes. The present invention intends to, on the basis of this, provide new operability to users in smart devices such as smartphones.

SUMMARY OF THE INVENTION

An object of the present invention is to make it possible for smart devices such as smartphones to provide new operability to users.

In the aspect of the present invention, there is provided a gesture detecting device including: a motion detecting unit; and a processor, wherein the motion detecting unit outputs pieces of deviation value in three-dimensional sensor axis directions in response to a gesture made to the gesture detecting device, and wherein the processor is configured to: when in response to the gesture made to the gesture detecting device, first deviation value on a first sensor axis changes so as to exceed a threshold value, and then the first deviation value on the first sensor axis changes so as to fall below the threshold value, detect a tilt of the gesture detecting device to obtain a first direction determination value for the first sensor axis; when in response to the gesture made to the gesture detecting device, second deviation value on a second sensor axis changes so as to exceed a threshold value, and then the second deviation value on the second sensor axis changes so as to fall below the threshold value, detect a tilt of the gesture detecting device to obtain a second direction determination value for the second sensor axis; and while in response to the gesture made to the gesture detecting device, third deviation value on a third sensor axis is changing so as to exceed a threshold value, obtain neither the first direction determination value nor the second direction determination value, and thereby detects the gesture made to the gesture detecting device.

Further features of the present invention will become apparent from the following description of exemplary embodiments (with reference to the attached drawings).

BRIEF DESCRIPTION OF THE DRAWINGS

FIG. 12 is a table illustrating a relationship between a gesture and determination values in the embodiment;

FIG. 13 is a screen transition diagram of the smartphone in the embodiment;

FIG. 27 is a screen transition diagram of the smartphone in the second embodiment;

FIG. 29 is a table illustrating a relationship between a gesture determination value and outputs in the third embodiment;

FIG. 31 is an explanatory diagram of gesture modes of the smartphone in the third embodiment;

FIG. 32 is an explanatory diagram of gesture modes of the smartphone in the third embodiment;

FIG. 35 is a table illustrating a relationship between a gesture and operation contents;

FIG. 36 is a diagram showing the relationship between FIGS. 36A and 36B;

FIG. 36A is a screen transition diagram of the smartphone in the fourth embodiment;

FIG. 39A, FIG. 39B and FIG. 39C are an explanatory diagram illustrating data tables in the fifth embodiment;

FIG. 41 is a diagram showing the relationship between FIGS. 41A and 41B;

FIG. 41A is a processing flowchart of the smartphone in the fifth embodiment;

FIG. 42 is a diagram showing the relationship between FIGS. 42A and 42B;

FIG. 42A is a processing flowchart of the smartphone in the fifth embodiment.

DESCRIPTION OF THE EMBODIMENTS

First Embodiment

An embodiment of the present invention is described with reference to the drawings. In the following embodiment, a gesture detecting device capable of detecting a gesture in space is described. As the gesture detecting device, a smartphone is taken as an example for the description.

Figure 1:
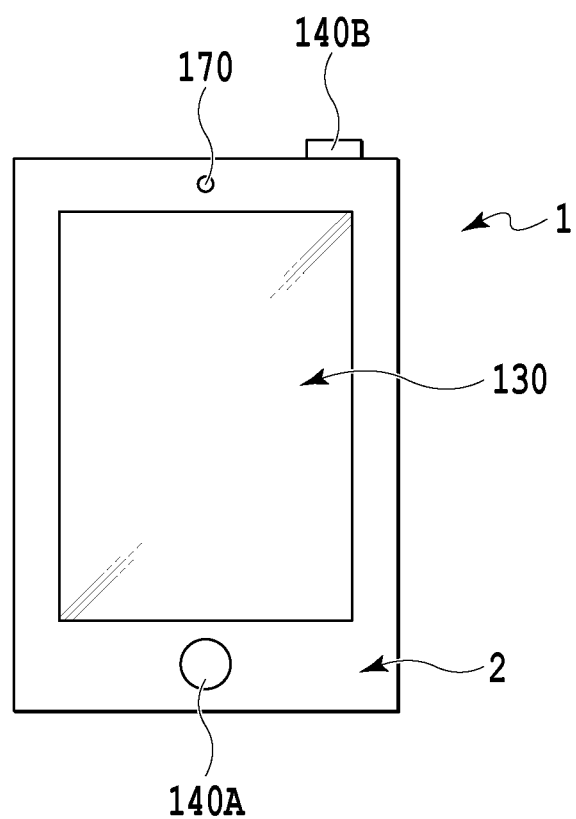
FIG. 1 is an appearance front view of a smartphone in an embodiment.
Figure 2:
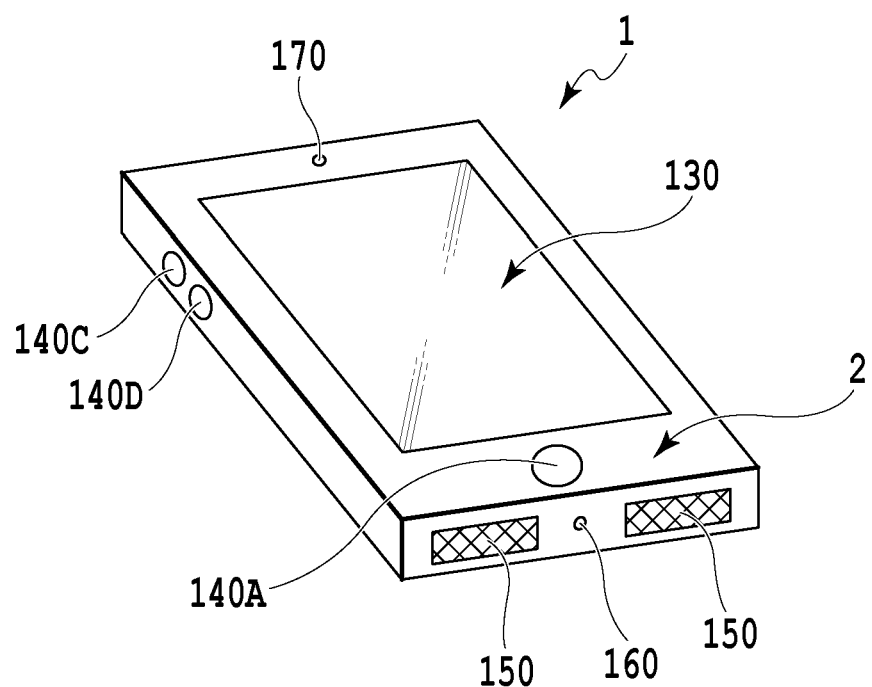
FIG. 2 is an appearance perspective view of the smartphone in the embodiment.

FIGS. 1 and 2 are appearance diagrams of the smartphone 1 in this embodiment of the present invention. As illustrated in FIGS. 1 and 2, the smartphone 1 has a housing 2, touch screen display 130, operation buttons 140, speakers 150, microphone 160, and camera 170. The touch screen display 130 can detect the touch of a finger, a stylus pen, or the like.

Figure 3:
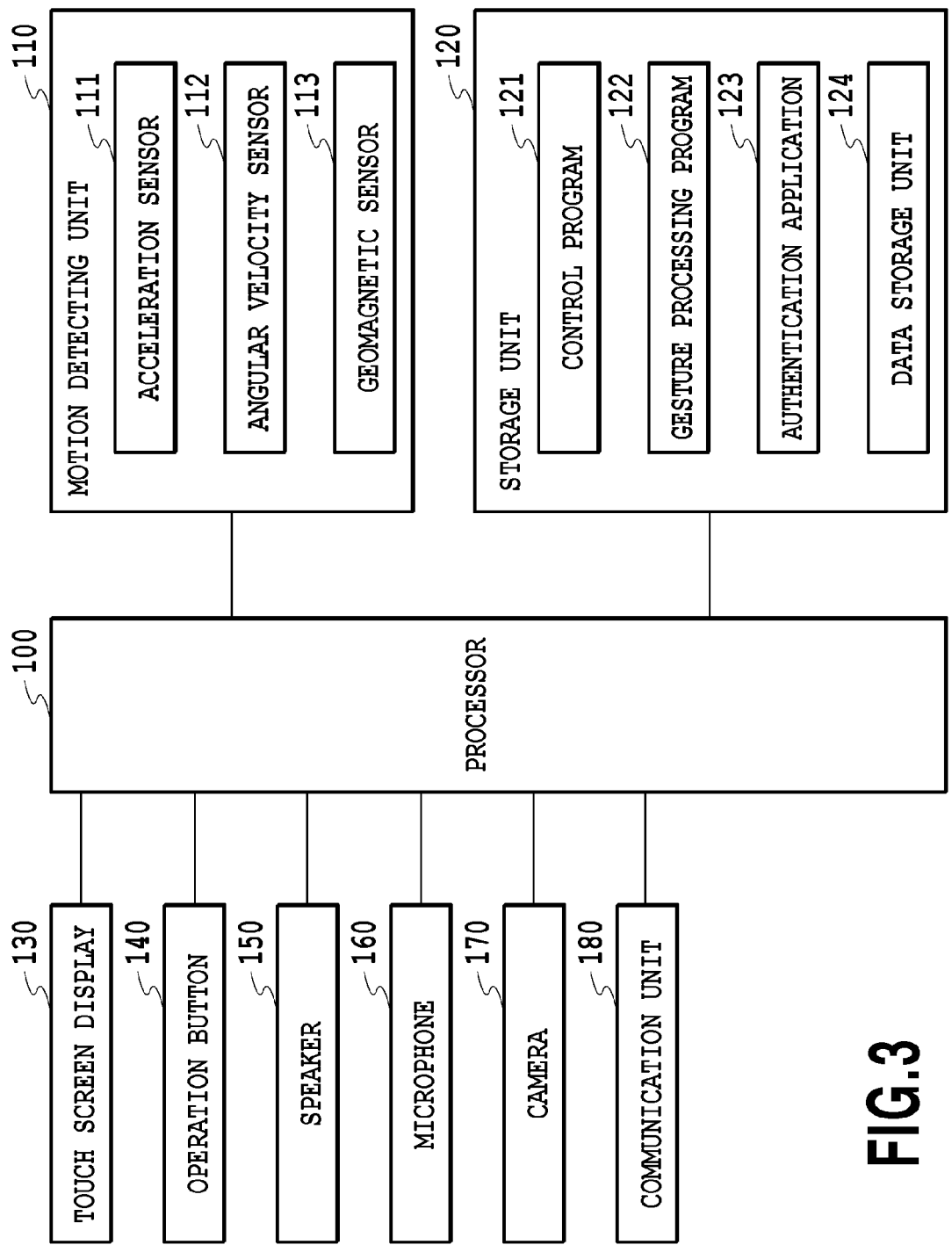
FIG. 3 is a block configuration diagram illustrating functions of the smartphone in the embodiment.

FIG. 3 is a block configuration diagram of the smartphone 1 in this embodiment of the present invention. As illustrated in FIG. 3, the smartphone 1 has: a processor 100; and a motion detecting unit 110, storage unit 120, touch screen display 130, operation buttons 140, speakers 150, microphone 160, camera 170, and communication unit 180 that are respectively connected to the processor 100.

The processor 100 includes a calculation circuit such as a central processing unit (CPU), and performs integrated control of processing of the smartphone 1. The processor 100 appropriately calls data stored in the storage unit 120, and executes instructions stored in a control program 121. Also, the processor 100 appropriately calls a value outputted by the motion detecting unit 110, and executes instructions stored in a gesture processing program 122.

The motion detecting unit 110 is configured to include an acceleration sensor 111, angular velocity sensor 112, and geomagnetic sensor 113, and each of the sensors can detect displacements of distance, velocity, direction, angle, and the like. In order to detect the action of the smartphone 1 in space, output results from the acceleration sensor, angular velocity sensor, and geomagnetic sensor are utilized in combination.

The storage unit 120 includes storage devices such as a semiconductor storage device and a magnetic storage device, and stores programs and data. The storage unit 120 has the control program 121, gesture processing program 122, authentication application 123, and data storage unit 124.

The control program 121 is for making each control of the smartphone 1 function. Specifically, the control program 121 stores input from the touch screen display or any of the operation buttons 140 in the data storage unit 124 as data, and appropriately calls the data to execute instructions stored in the control program 121, thus performing data processing.

The gesture processing program 122 can detect a gesture of the smartphone 1 to store a gesture determination value corresponding to the detected gesture in the data storage unit 124.

The authentication application 123 is an application program that performs personal authentication of a user on the basis of information such as characters, figures, and/or symbols inputted through the touch screen display 130. Also, the authentication application 123 can perform personal authentication of a user on the basis of gesture determination values outputted by the gesture processing program 122. Details will be described later.

The data storage unit 124 is a data storage area for storing various pieces of data used by the gesture processing program 122 and authentication application 123.

The touch screen display 130 functions as a display unit, and can detect the touch of a finger, a stylus pen, or the like by a user as well as displaying characters, images, symbols, and/or the like.

The operation buttons 140 are arranged at multiple positions of the smartphone 1, and can variously work the smartphone 1 by being pressed by a user. For example, 140A and 140B respectively represent a home button, and a sleep/sleep cancel button. Also, 140C and 140D are volume buttons. This specification does not refer to each type of buttons, but simply refers to the "buttons 140".

The speakers 150 are for outputting, for example, a ringtone, or music. Specifically, on the basis of an instruction of the processor 100, sound data stored in the data storage unit 124 is converted to a sound signal and then transmitted to the speakers 150, and the speakers 150 having received the sound signal output sound.

The microphone 160 is one for inputting user's speech. Specifically, on the basis of an instruction of the processor 100, sound is converted into a sound signal through the microphone 160.

The camera 170 is for photographing an object. A signal resulting from photographing by the camera 170 is converted into data by the processor 100, and the converted data is stored in the data storage unit 124.

The communication unit 180 performs communication wirelessly based on a method provided by publicly-known wireless communication standards. As wireless communication standards, there are cellular phone communication standards such as 4G standards. As the cellular phone communication standards, there are, for example, LTE (Long Term Evolution), WiMAX (Worldwide Interoperability for Microwave Access), Wi-Fi, and the like. The communication unit 180 can support at least one of such communication standards.

Figure 4A:
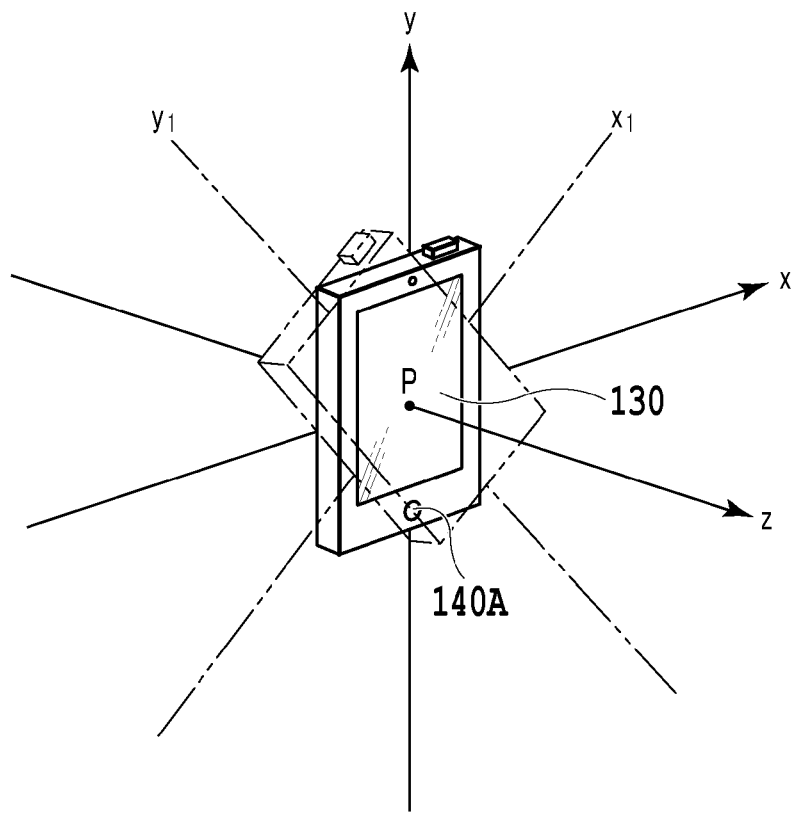
FIG. 4A and FIG. 4B are an example of a gesture of the smartphone in the embodiment.
Figure 4B:
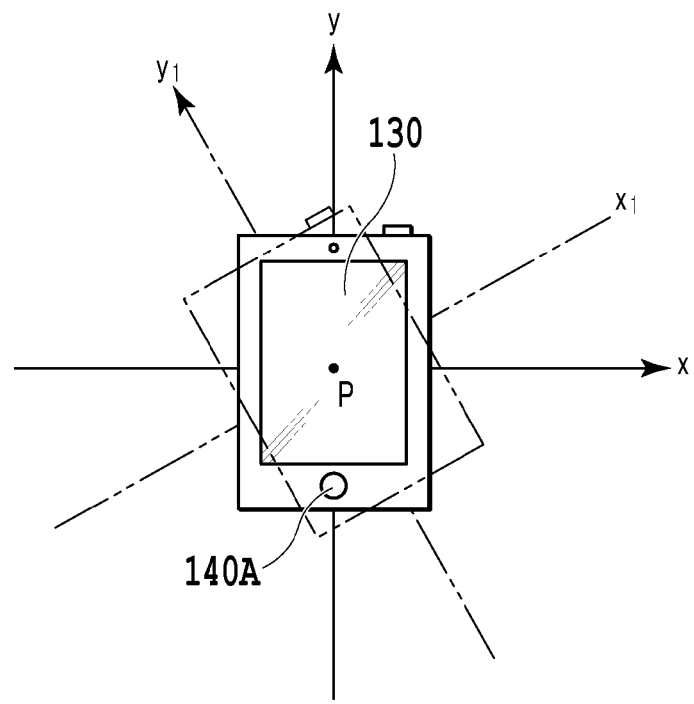

FIGS. 4A and 4B are diagram illustrating a gesture of the smartphone 1 in the left-right direction in three-dimensional coordinates. FIG. 4A is a perspective view illustrating tilting the smartphone 1 leftward in the three-dimensional coordinates, and FIG. 4B is a front view illustrating tilting the smartphone 1 leftward in the three-dimensional coordinates.

In FIGS. 4A and 4B, the point P is positioned at substantially the center of the smartphone 1, and coincides with the origin (0, 0, 0) of the three-dimensional coordinates. When tilting the smartphone 1 leftward substantially around the point P in an xy plane around the z-axis, the smartphone 1 is tilted in a posture indicated by a chain double-dashed line in FIGS. 4A and 4B with the smartphone 1 directing the touch screen display 130 toward a user. When doing this, the gesture processing program 122 calculates a tilt angle of the smartphone 1 in the xy plane around the z axis using deviation value outputted from the acceleration sensor 111.

Here, the calculation of the tilt angle of the smartphone 1 is described. As illustrated in FIGS. 4A and 4B, in order to detect the tilt of the smartphone in the xy plane around the z axis, given that the deviation value detected with respect to a sensor axis (x1, y1, z1) is (ax1, ay1, az1), a calculation expression for the tilt with respect to the earth axis (x, y, z) is as follows:

The tilt angle θ of the smartphone 1 around the z axis: atan(ay1/ax1).

The above calculation expression is based on a publicly-known technique, which does not limit a calculation method, and the deviation value (ax1, ay1, az1), another sensor output, or another calculation expression may be applied.

In the present embodiment, according to the above calculation expression, as the tilt angle θ of the smartphone 1 in the xy plane around the z axis, when tilting the smartphone 1 leftward, a minus value is outputted, whereas when tilting the smartphone 1 rightward, a plus value is outputted.

Further, in the present embodiment, when the tilt angle of the smartphone 1 exceeds a predetermined angle, a gesture of the smartphone 1 spinning (hereinafter referred to as a "spin gesture") can be detected.

In order to detect how much the smartphone 1 is tilted with respect to the y axis, in the present embodiment, part of the deviation value ay1 from the acceleration sensor 111 is used. In FIGS. 4A and 4B, when the smartphone 1 is positioned as indicated by a solid line, a value of ay1 outputted by the acceleration sensor is "−1". Also, in FIGS. 4A and 4B, when the smartphone 1 is tilted toward the posture indicated by the chain double-dashed line and tilted at 90 degrees, the value of ay1 is "0".

From the above, when the part of the deviation value ay1 outputted by the acceleration sensor 111 exceeds the predetermined value (in the present embodiment, "0"), it is determined that the smartphone 1 performs spin gesture behavior.

Figure 5A:
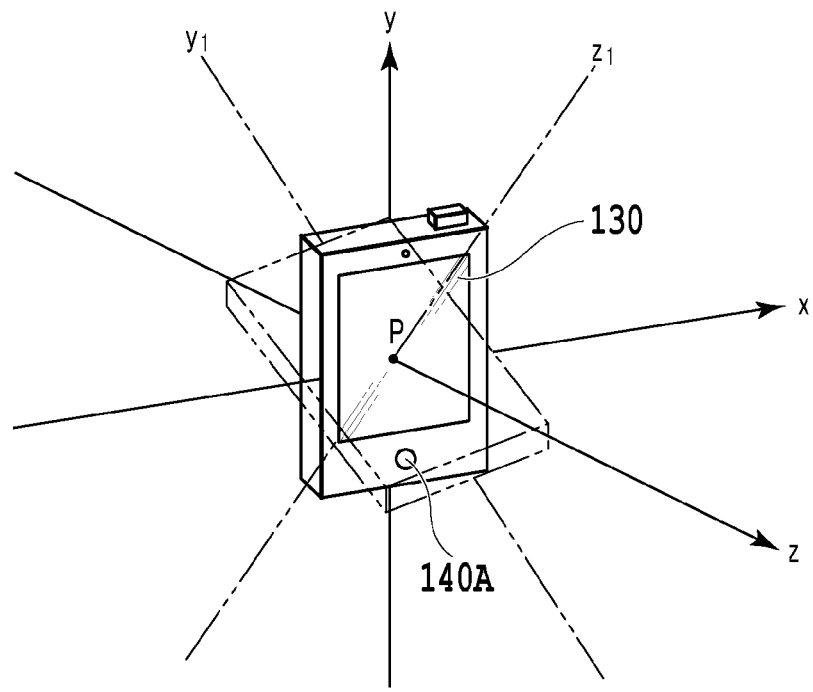
FIG. 5A and FIG. 5B are an example of a gesture of the smartphone in the embodiment.
Figure 5B:
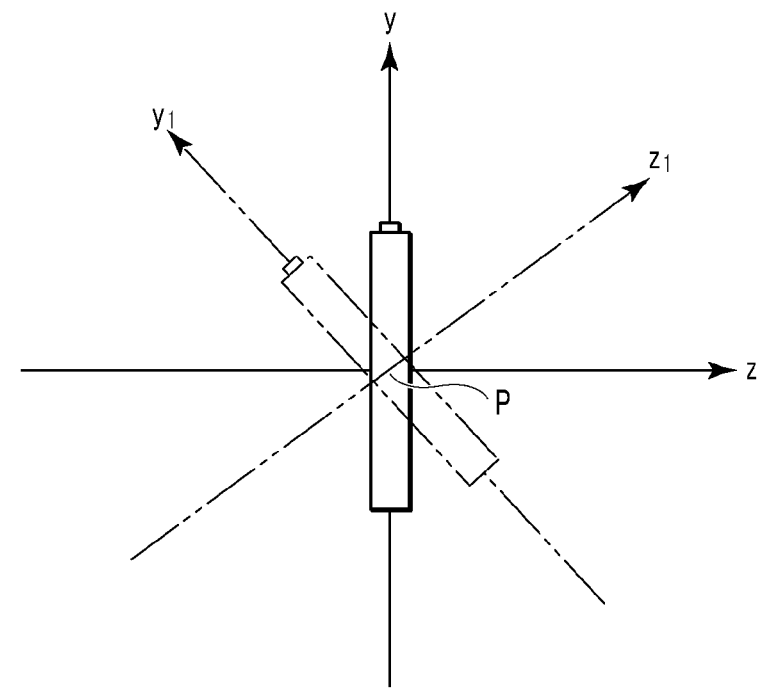

FIGS. 5A and 5B are diagram illustrating a gesture of the smartphone 1 in the front-back direction in the three-dimensional coordinates according to the embodiment of the present invention. FIG. 5A is a perspective view illustrating tilting the smartphone 1 backward in the three-dimensional coordinates, and FIG. 5B is a front view illustrating tilting the smartphone 1 backward in the three-dimensional coordinates.

In FIGS. 5A and 5B, the point P is positioned at substantially the center of the smartphone 1, and coincides with the origin (0, 0, 0) of the three-dimensional coordinates. When tilting the smartphone 1 backward substantial around the point P in a yz plane around the x-axis, the smartphone 1 changes the normal direction of the touch screen display 130 from a user direction to an upper direction, and is tilted in a posture indicated by a chain double-dashed line in FIGS. 5A and 5B. When doing this, the gesture processing program 122 calculates a tilt angle of the smartphone 1 in the yz plane around the x axis using deviation value outputted from the acceleration sensor 111.

Here, the calculation of the tilt angle of the smartphone 1 in the yz plane around the x axis is described. As illustrated in FIGS. 5A and 5B, in order to detect the tilt of the smartphone 1 in the yz plane around the x axis, given that the deviation value detected with respect to the sensor axis (x1, y1, z1) is (ax1, ay1, az1), a calculation expression for the tilt with respect to the earth's axis (x, y, z) is as follows:

The tilt angle θ of the smartphone 1 around the x axis: atan(ay1/az1).

The above calculation expression is based on the publicly-known technique, which does not limit a calculation method, and the deviation value (ax1, ay1, az1), another sensor output, or another calculation expression may be applied.

In the present embodiment, according to the above calculation expression, as the tilt angle θ of the smartphone 1 in the yz plane around the x axis, when tilting the smartphone 1 backward, a minus value is outputted, whereas when tilting the smartphone frontward, a plus value is outputted.

Further, in the present embodiment, when the tilt angle of the smartphone 1 exceeds a predetermined angle, a spin gesture of the smartphone 1 can be detected.

In order to detect how much the smartphone 1 is tilted with respect to the y axis, in the present embodiment, the part of the deviation information ay1 from the acceleration sensor 111 is used. In FIGS. 5A and 5B, when the smartphone 1 is positioned as indicated by a solid line, a value of ay1 outputted by the acceleration sensor is "−1". Also, in FIGS. 5A and 5B, when the smartphone 1 is tilted toward the posture indicated by the chain double-dashed line and is tilted at 90 degrees, the value of ay1 is "0". From the above, when the part of the deviation value ay1 outputted by the acceleration sensor 111 exceeds the predetermined value (in the present embodiment, "0"), it is determined that the smartphone 1 has performed a spin gesture.

Figure 6:
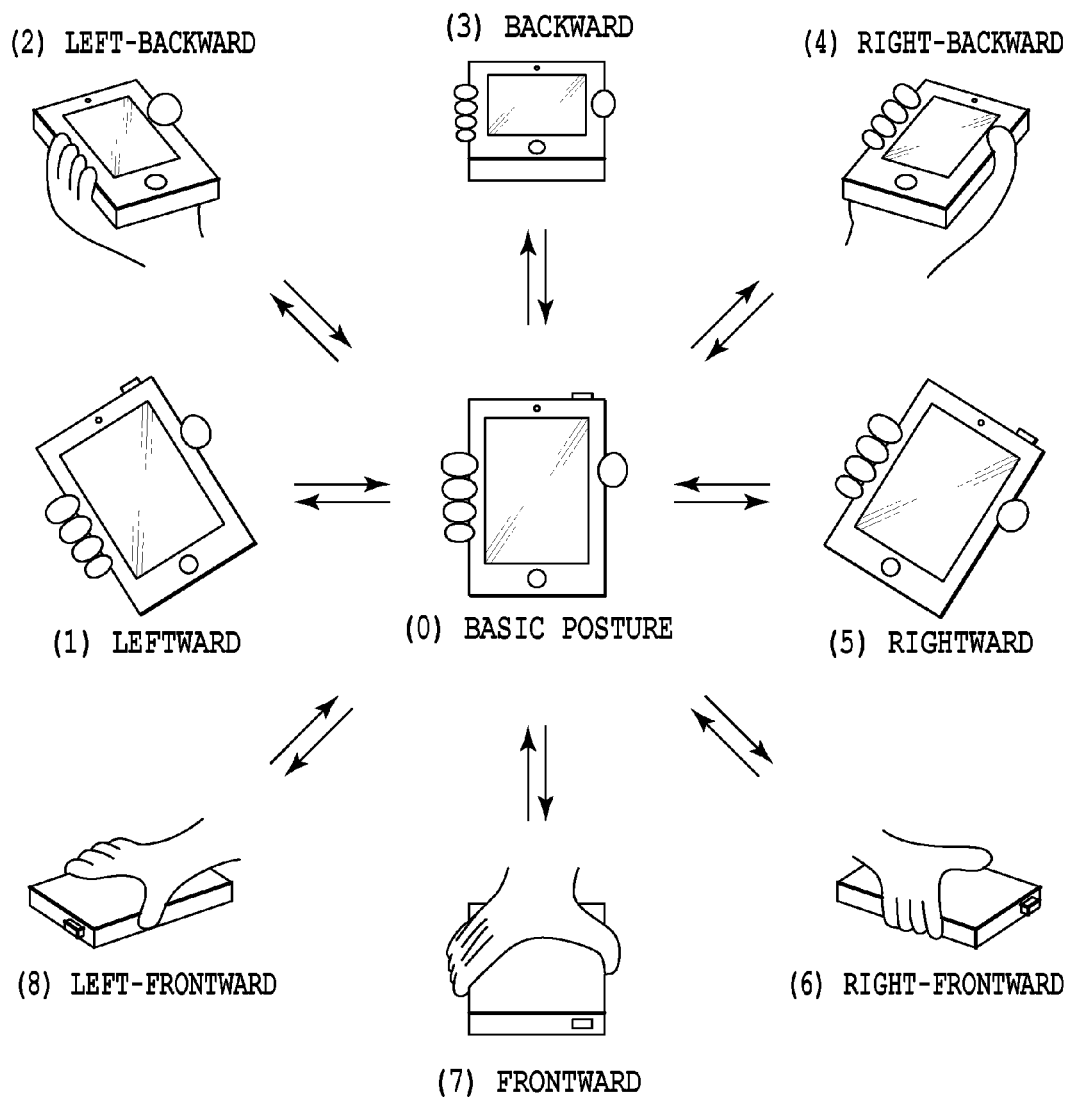
FIG. 6 is an example of shake gestures of the smartphone in the embodiment.

FIG. 6 is a conceptual diagram illustrating modes to detect gestures of shaking the smartphone 1 in predetermined directions (hereinafter referred to "shake gestures" in this specification) with a user holding the smartphone 1 in his/her hand. In FIG. 6, the user can make (1) a leftward shake gesture of tilting the smartphone 1 leftward from (0) a basic posture a predetermined angle, and then restoring the smartphone to the basic posture. Similarly, the user can make (2) a left-backward shake gesture, (3) a backward shake gesture, (4) a right-backward shake gesture, (5) a rightward shake gesture, (6) a right-frontward shake gesture, (7) a frontward shake gesture, and (8) a left-frontward shake gesture.

In the present embodiment, the smartphone 1 as a gesture detecting device can detect the shake gestures in the eight directions, i.e., leftward, left-backward, backward, right-backward, rightward, right-frontward, frontward, and left-frontward.

Gesture detection by the smartphone 1 is described in detail with reference to FIG. 7.

x represents coordinate information on an x axis. The coordinate information is specified by part of the deviation value ax1 outputted by the acceleration sensor 111. For example, when the smartphone 1 is in a state of the front view in FIG. 4A and positioned as indicated by the solid line, the output from the acceleration sensor 111 is "0". At this time, the gesture processing program 122 specifies an x axis coordinate value as "0". As the smartphone 1 is tilted toward the posture indicated by the chain double-dashed line, the part of the deviation value ax1 outputted by the acceleration sensor 111 decreases stepwise, and therefore the x axis coordinate value also decreases stepwise. When the smartphone 1 is tilted further leftward and then tilted just 90 degrees, the output from the acceleration sensor 111 is "−1". At this time, the gesture processing program 122 specifies the x axis coordinate value as "−1".

z represents coordinate information on a z axis. The coordinate information is specified by part of the deviation value az1 outputted by the acceleration sensor 111. For example, when the smartphone 1 is in a state of the front view in FIG. 5A and positioned as indicated by the solid line, the output from the acceleration sensor 111 is "0". At this time, the gesture processing program 122 specifies a z axis coordinate value as "0". As the smartphone 1 is tilted toward the posture indicated by the chain double-dashed line, the part of the deviation value az1 outputted by the acceleration sensor 111 decreases stepwise, and therefore the z axis coordinate value also decreases stepwise. When the smartphone 1 is tilted further backward and then tilted just 90 degrees, the output from the acceleration sensor 111 is "−1". At this time, the gesture processing program 122 specifies the z axis coordinate value as "−1".

y represents coordinate information on a y axis. The coordinate information is specified by part of the deviation value ay1 outputted by the acceleration sensor 111. For example, when the smartphone 1 is positioned as indicated by the solid line in FIGS. 4A and 4B or 5, the output from the acceleration sensor 111 is "−1". At this time, the gesture processing program 122 specifies a y axis coordinate value as "−1". As the smartphone 1 is tilted toward the posture indicated by the chain double-dashed line, the part of the deviation value ay1 outputted by the acceleration sensor 111 increases stepwise, and therefore the y axis coordinate value also increases stepwise. When the smartphone 1 is tilted further and then tilted just 90 degrees, the output from the acceleration sensor 111 is "0". At this time, the gesture processing program 122 specifies the y axis coordinate value as "0".

F(x) is an x axis determination F, and can determine a gesture of the smartphone 1 in the left-right direction. Specifically, when shaking out the smartphone 1, F(x) obtains a left-right determination value as a direction determination value at timing when exceeding a threshold value at the time of shaking out. Similarly, when shaking back the smartphone 1, F(x) obtains a left-right determination value as a direction determination value at timing when falling below a threshold value at the time of shaking back. The left-right determination values are respectively related to directions, and on the basis of a combination of the obtained left-right determination values, it can be determined which direction a tilt angle equal to or more than the predetermined angle is formed in.

Similarly, F(z) is a z axis determination F, and can determine a gesture of the smartphone 1 in the front-back direction. Specifically, when shaking out the smartphone 1, F(x) obtains a front-back determination value as a direction determination value at timing when exceeding a threshold value at the time of shaking out. Similarly, when shaking back the smartphone 1, F(x) also obtains a front-back determination value as a direction determination value at timing when falling below a threshold value at the time of shaking back. The front-back determination values are respectively related to directions, and on the basis of a combination of the obtained front-back determination values, it can be determined which direction a tilt angle equal to or more than the predetermined angle is formed in. Further, F(y) is a y axis tilt determination F, and outputs +1 when y outputted by the acceleration sensor 111 exceeds a predetermined value.

tr(x) is a trigger signal, and rises or falls at timing when the smartphone 1 performs specific behavior along the x axis. In the present embodiment, rising of tr(x) triggers detection of a state of a below-described toggle signal tg(x), as well as starting a below-described evaluation function G.

tr(z) is a trigger signal, and rises or falls at timing when the smartphone 1 performs specific behavior along the z axis. In the present embodiment, rising of tr(z) triggers detection of a state of a below-described toggle signal tg(z), as well as starting the below-described evaluation function G.

tg(x) is the toggle signal, and in order to determine switching of a gesture of the smartphone 1, rises or falls at predetermined timing. Further, on the basis of a change in state of tg(x), the evaluation function G is performed. Details will be described later.

tg(z) is the toggle signal, and in order to determine switching of a gesture of the smartphone 1, rises or falls at predetermined timing. Further, on the basis of a change in state of tg(z), the evaluation function G is performed. Details will be described later.

The evaluation function G is a gesture evaluation function G, and on the basis of outputs of F(x), F(z), F(y), tr(x), tr(z), tg(x), and tg(z), outputs gesture determination values. The gesture determination values are respectively values of L, lb, B, rb, R, rf, F, and lf, which respectively correspond to the eight types of directions, i.e., leftward, left-backward, backward, right-backward, right, right-frontward, frontward, and left-frontward. The smartphone 1 in the present embodiment can determine a shake gesture in any of the eight types of directions, i.e., leftward, left-backward, backward, right-backward, right, right-frontward, frontward, and left-frontward by performing a process such as referring to a table that preliminarily stores the gesture determination values. In addition, depending on setting of the gesture evaluation function G, more detailed directions can also be set.

Next, the gesture detection by the smartphone 1 is described in detail with reference to a timing chart in FIG. 7.

When the smartphone 1 is shaken leftward, x decreases stepwise. When x falls below a threshold value s2in, it is sensed that the smartphone 1 is tilted leftward, exceeding the predetermined angle (t1). At this time, F(x) obtains −2 as the left-right determination value. F(x) performs the determination process on the basis of the left-right determination value −2 to determine "L" indicating the leftward shake gesture (t1). In synchronization with this timing, tr(x) lowers a signal from +1 to 0 (t1), and tg(x) raises a signal from 0 to +1 (t1).

When the smartphone 1 is shaken back rightward, x increases stepwise. When x exceeds a threshold value stout, it is sensed that the smartphone 1 is tilted rightward, exceeding the predetermined angle (t2). At this time, F(x) obtains −3 as the left-right determination value. F(x) performs the determination process on the basis of the left-right determination value −2 at t1 and the left-right determination value −3 at t2 to determine "L" indicating the leftward shake gesture (t2). In synchronization with this timing, tr(x) raises the signal from 0 to +1 (t2).

In order to determine switching of the gesture of the smartphone 1 in synchronization with this timing, the evaluation function G determines whether or not states of tg(x) and tg(z) are changed (t2). In this example, a value of tg(x) changes from 0 (t0) to +1 (t2), whereas a value of tg(z) remains at 0 (t0 to t2). The evaluation function G adopts "L", which is the output value of F(x) at t2, on the basis of the change in state of tg(x). From the above, on the basis of adopting "L", the evaluation function G determines "L" indicating that a gesture of the smartphone 1 is the leftward shake gesture (t2).

When the smartphone 1 is shaken left-backward, x and z decrease stepwise. When x falls below the threshold value s2in, it is sensed that the smartphone 1 is tilted leftward, exceeding the predetermined angle (t3). At this time, F(x) obtains −2 as the left-right determination value. F(x) performs the determination process on the basis of the left-right determination value −2, and determines indicating the leftward shake gesture (t3). In synchronization with this timing, tr(x) lowers the signal from +1 to 0 (t3), and tg(x) lowers the signal from +1 to 0 (t3). Similarly, when z falls below a threshold value s4in, it is sensed that the smartphone 1 is tilted backward, exceeding the predetermined angle (t3). At this time, F(z) obtains −2 as the front-back determination value. F(z) performs the determination process on the basis of the front-back determination value −2 to determine "B" indicating the backward shake gesture (t3). In synchronization with this timing, tr(z) lowers a signal from +1 to 0 (t3), and tg(z) raises a signal from 0 to +1 (t3).

When the smartphone 1 is shaken back right-frontward, x and z increase stepwise. When x exceeds the threshold value stout, it is sensed that the smartphone 1 is tilted rightward, exceeding the predetermined angle (t4). At this time, F(x) obtains −3 as the left-right determination value. F(x) performs the determination process on the basis of the left-right determination value −2 at t3 and the left-right determination value −3 at t4 to determine "L" indicating the leftward shake gesture (t4). In synchronization with this timing, tr(x) raises the signal from 0 to +1 (t4). Similarly, when z exceeds a threshold value stout, it is sensed that the smartphone 1 is tilted frontward, exceeding the predetermined angle (t4). At this time, F(z) obtains −3 as the front-back determination value. F(z) performs the determination process on the basis of the front-back determination value −2 at t3 and the front-back determination value −3 at t4 to determine "B" indicating the backward shake gesture (t4). In synchronization with this timing, tr(z) raises the signal from 0 to +1 (t4).

In order to determine switching of the gesture of the smartphone 1 in synchronization with this timing, the evaluation function G determines whether or not the states of tg(x) and tg(z) are changed (t4). In this example, the value of tg(x) changes from +1 (t2) to 0 (t4), and also the value of tg(z) changes from 0 (t2) to +1 (t4). The evaluation function G adopts "L" and "B", which are the determination values of both of F(x) and F(z) at t4, on the basis of the changes in states of tg(x) and tg(z). From the above, on the basis of adopting "L" and "B", the evaluation function G determines "lb" indicating that a gesture of the smartphone 1 is the left-backward shake gesture (t4).

When the smartphone 1 is shaken backward, z decreases stepwise. When z falls below the threshold value s4in, it is sensed that the smartphone 1 is tilted backward, exceeding the predetermined angle (t5). At this time, F(z) obtains −2 as the front-back determination value. F(z) performs the determination process on the basis of the front-back determination value −2 to determine "B" indicating the backward shake gesture (t5). In synchronization with this timing, tr(z) raises the signal from +1 to 0 (t5), and tg(z) lowers the signal from +1 to 0 (t5).

When the smartphone 1 is shaken back frontward, z increases stepwise. When z exceeds the threshold value s4out, it is sensed that the smartphone 1 is tilted frontward, exceeding the predetermined angle (t6). At this time, F(z) obtains −3 as the front-back determination value. F(z) performs the determination process on the basis of the front-back determination value −2 at t5 and the front-back determination value −3 at t6 to determine "B" indicating the backward shake gesture (t6). In synchronization with this timing, tr(z) raises the signal from 0 to +1 (t6).

In order to determine switching of the gesture of the smartphone 1 in synchronization with this timing, the evaluation function G determines whether or not the states of tg(x) and tg(z) are changed (t6). In this example, the value of tg(x) remains at 0 (t4 to t6), whereas the value of tg(z) changes from +1 (t4) to 0 (t6). The evaluation function G adopts "B", which is the output value of F(z) at t6, on the basis of the change in state of tg(z). From the above, on the basis of adopting "B", the evaluation function G determines "B" indicating that a gesture of the smartphone 1 is the backward shake gesture (t6).

When the smartphone 1 is shaken right-backward, x increases stepwise and z decreases stepwise. When x exceeds a threshold value s1in, it is sensed that the smartphone 1 is tilted rightward, exceeding the predetermined angle (t7). At this time, F(x) obtains +2 as the left-right determination value. F(x) performs the determination process on the basis of the left-right determination value +2 to determine "R" indicating the rightward shake gesture (t7). In synchronization with this timing, tr(x) lowers the signal from +1 to 0 (t7), and tg(x) raises the signal from 0 to +1 (t7). Similarly, when z falls below the threshold value s4in, it is sensed that the smartphone 1 is tilted backward, exceeding the predetermined angle (t7). At this time, F(z) obtains −2 as the front-back determination value. F(z) performs the determination process on the basis of the front-back determination value −2 to determine "B" indicating the backward shake gesture (t7). In synchronization with this timing, tr(z) lowers the signal from +1 to 0 (t7), and tg(z) raises the signal from 0 to +1 (t7).

When the smartphone 1 is shaken back left-frontward, x decreases stepwise and z increases stepwise. When x falls below a threshold value s1out, it is sensed that the smartphone 1 is tilted leftward, exceeding the predetermined angle (t8). At this time, F(x) obtains +3 as the left-right determination value. F(x) performs the determination process on the basis of the left-right determination value +2 at t7 and the left-right determination value +3 at t8 to determine "R" indicating the rightward shake gesture (t8). In synchronization with this timing, tr(x) raises the signal from 0 to +1 (t8). Similarly, when z exceeds the threshold value s4out, it is sensed that the smartphone 1 is tilted frontward, exceeding the predetermined angle (t8). At this time, F(z) obtains −3 as the front-back determination value. F(z) performs the determination process on the basis of the front-back determination value −2 at t7 and the front-back determination value −3 at t8 to determine "B" indicating the backward shake gesture (t8). In synchronization with this timing, tr(z) raises the signal from 0 to +1 (t8).

In order to determine switching of the gesture of the smartphone 1 in synchronization with this timing, the evaluation function G determines whether or not the states of tg(x) and tg(z) are changed (t8). In this example, the value of tg(x) changes from 0 (t6) to +1 (t8), and also the value of tg(z) changes from 0 (t6) to +1 (t8). The evaluation function G adopts "R" and "B", which are the determination values of both of F(x) and F(z) at t8, on the basis of the changes in states of tg(x) and tg(z). From the above, on the basis of adopting "R" and "B", the evaluation function G determines "rb" indicating that a gesture of the smartphone 1 is the right-backward shake gesture (t8).

When the smartphone 1 is shaken rightward, x increases stepwise. When x exceeds the threshold value s1in, it is sensed that the smartphone 1 is tilted rightward, exceeding the predetermined angle (t9). At this time, F(x) obtains +2 as the left-right determination value. F(x) performs the determination process on the basis of the left-right determination value +2 to determine "R" indicating the rightward shake gesture (t9). In synchronization with this timing, tr(x) lowers the signal from +1 to 0 (t9), and tg(x) lowers the signal from +1 to 0 (t9).

When the smartphone 1 is shaken back leftward, x decreases stepwise. When x falls below the threshold value s1out, it is sensed that the smartphone 1 is tilted leftward, exceeding the predetermined angle (t10). At this time, F(x) obtains +3 as the left-right determination value. F(x) performs the determination process on the basis of the left-right determination value +2 at t9 and the left-right determination value +3 at t10 to determine "R" indicating the rightward shake gesture (t10). In synchronization with this timing, tr(x) raises the signal from 0 to +1 (t10).

In order to determine switching of the gesture of the smartphone 1 in synchronization with this timing, the evaluation function G determines whether or not the states of tg(x) and tg(z) are changed (t10). In this example, the value of tg(x) changes from +1 (t8) to 0 (t10), whereas the value of tg(z) remains at +1 (t8 to t10). The evaluation function G adopts "R", which is the output value of F(z) at t10, on the basis of the change in state of tg(x). From the above, on the basis of adopting "R", the evaluation function G determines "R" indicating that a gesture of the smartphone 1 is the rightward shake gesture (t10).

When the smartphone 1 is shaken right-frontward, x and z increase stepwise. When x exceeds the threshold value s1in, it is sensed that the smartphone 1 is tilted rightward, exceeding the predetermined angle (t11). At this time, F(x) obtains +2 as the left-right determination value. F(x) performs the determination process on the basis of the left-right determination value +2 to determine "R" indicating the rightward shake gesture (t11). In synchronization with this timing, tr(x) lowers the signal from +1 to 0 (t11), and tg(x) raises the signal from 0 to +1 (t11). Similarly, when z exceeds a threshold value s3in, it is sensed that the smartphone 1 is tilted frontward, exceeding the predetermined angle (t11). At this time, F(z) obtains +2 as the front-back determination value. F(z) performs the determination process on the basis of the front-back determination value +2 to determine "F" indicating the frontward shake gesture (t11). In synchronization with this timing, tr(z) lowers the signal from +1 to 0 (t11), and tg(z) lowers the signal from +1 to 0 (t11). When the smartphone 1 is shaken back left-backward, x and z decrease stepwise. When x falls below the threshold value s1out, it is sensed that the smartphone 1 is tilted leftward, exceeding the predetermined angle (t12). At this time, F(x) obtains +3 as the left-right determination value. F(x) performs the determination process on the basis of the left-right determination value +2 at t11 and the left-right determination value +3 at t12 to determine "R" indicating the rightward shake gesture (t12). In synchronization with this timing, tr(x) raises the signal from 0 to +1 (t12). Similarly, when z falls below a threshold value s3out, it is sensed that the smartphone 1 is tilted backward, exceeding the predetermined angle (t12). At this time, F(z) obtains +3 as the front-back determination value. F(z) performs the determination process on the basis of the front-back determination value +2 at t11 and the front-back determination value +3 at t12 to determine "F" indicating the frontward shake gesture (t12). In synchronization with this timing, tr(z) raises the signal from 0 to +1 (t12).

In order to determine switching of the gesture of the smartphone 1 in synchronization with this timing, the evaluation function G determines whether or not the states of tg(x) and tg(z) are changed (t12). In this example, the value of tg(x) changes from 0 (t10) to +1 (t12), and also the value of tg(z) changes from +1 (t10) to 0 (t12). The evaluation function G adopts "R" and "F", which are the determination values of both of F(x) and F(z) at t12, on the basis of the changes in states of tg(x) and tg(z). From the above, on the basis of adopting "R" and "F", the evaluation function G determines "rf" indicating that a gesture of the smartphone 1 is the right-frontward shake gesture (t12).

When the smartphone 1 is shaken frontward, z increases stepwise. When z exceeds the threshold value s3in, it is sensed that the smartphone 1 is tilted frontward, exceeding the predetermined angle (t13). At this time, F(z) obtains +2 as the front-back determination value. F(z) performs the determination process on the basis of the front-back determination value +2 to determine "F" indicating the frontward shake gesture (t13). In synchronization with this timing, tr(z) lowers the signal from +1 to 0 (t13), and tg(z) raises the signal from 0 to +1 (t13). When the smartphone 1 is shaken back backward, z decreases stepwise. When z falls below the threshold value s3out, it is sensed that the smartphone 1 is tilted backward, exceeding the predetermined angle (t14). At this time, F(z) obtains +3 as the front-back determination value. F(z) performs the determination process on the basis of the front-back determination value +2 at t13 and the front-back determination value +3 at t14 to determine "F" indicating the frontward shake gesture (t14). In synchronization with this timing, tr(z) raises the signal from 0 to +1 (t14).

In order to determine switching of the gesture of the smartphone 1 in synchronization with this timing, the evaluation function G determines whether or not the states of tg(x) and tg(z) are changed (t14). In this example, the value of tg(x) remains at +1 (t12 to t14), whereas the value of tg(z) changes from 0 (t12) to +1 (t14). The evaluation function G adopts "F", which is the output value of F(z) at t14, on the basis of the change in state of tg(z). From the above, on the basis of adopting "F", the evaluation function G determines "F" indicating that a gesture of the smartphone 1 is the frontward shake gesture (t14).

When the smartphone 1 is shaken left-frontward, x decreases stepwise and z increases stepwise. When x falls below the threshold value s2in, it is sensed that the smartphone 1 is tilted leftward, exceeding the predetermined angle (t15). At this time, F(x) obtains −2 as the left-right determination value. F(x) performs the determination process on the basis of the left-right determination value −2 to determine "L" indicating the leftward shake gesture (t15). In synchronization with this timing, tr(x) lowers the signal from +1 to 0 (t15), and tg(x) lowers the signal from +1 to 0 (t15). Similarly, when z exceeds the threshold value s3in, it is sensed that the smartphone 1 is tilted frontward, exceeding the predetermined angle (t15). At this time, F(z) obtains +2 as the front-back determination value. F(z) performs the determination process on the basis of the front-back determination value +2 to determine "F" indicating the frontward shake gesture (t15). In synchronization with this timing, tr(z) lowers the signal from +1 to 0 (t15), and tg(z) lowers the signal from +1 to 0 (t15).

When the smartphone 1 is shaken back right-backward, x increases stepwise and z decreases stepwise. When x exceeds the threshold value stout, it is sensed that the smartphone 1 is tilted rightward, exceeding the predetermined angle (t16). At this time, F(x) obtains −3 as the left-right determination value. F(x) performs the determination process on the basis of the left-right determination value −2 at t15 and the left-right determination value −3 at t16 to determine "L" indicating the leftward shake gesture (t16). In synchronization with this timing, tr(x) raises the signal from 0 to +1 (t16). Similarly, when z falls below the threshold value s3out, it is sensed that the smartphone 1 is tilted backward, exceeding the predetermined angle (t16). At this time, F(z) obtains +3 as the front-back determination value. F(z) performs the determination process on the basis of the front-back determination value +2 at t15 and the front-back determination value +3 at t16 to determine "F" indicating the frontward shake gesture (t16). In synchronization with this timing, tr(z) raises the signal from 0 to +1 (t16).

In order to determine switching of the gesture of the smartphone 1 in synchronization with this timing, the evaluation function G determines whether or not the states of tg(x) and tg(z) are changed (t16). In this example, the value of tg(x) changes from +1 (t14) to 0 (t16), and also the value of tg(z) changes from +1 (t14) to 0 (t16). The evaluation function G adopts "L" and "F", which are the determination values of both of F(x) and F(z) at t16, on the basis of the changes in states of tg(x) and tg(z). From the above, on the basis of adopting "L" and "F", the evaluation function G determines "lf" indicating that a gesture of the smartphone 1 is the left-frontward shake gesture (t16).

Figure 7:
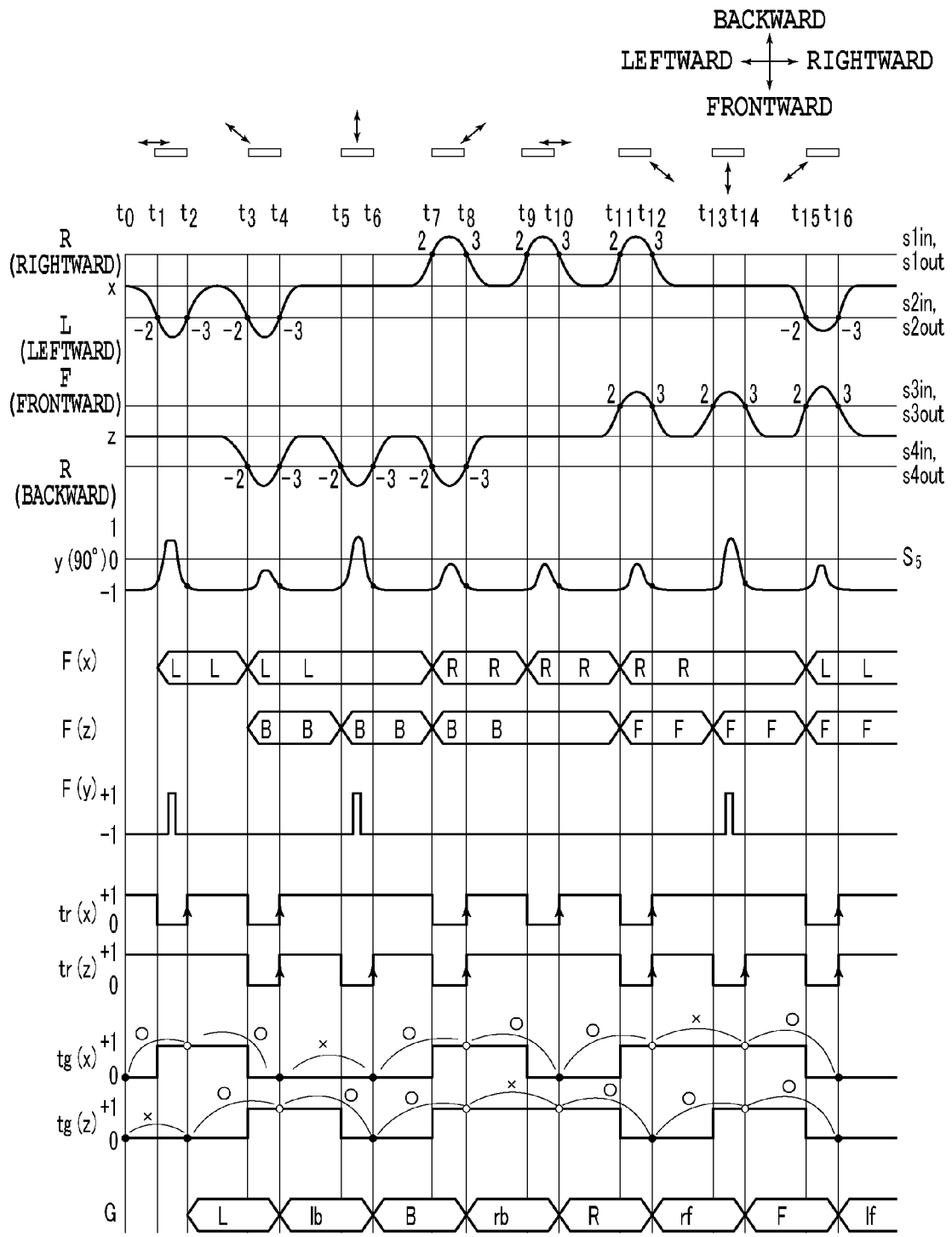
FIG. 7 is a timing chart illustrating gesture detecting modes of the smartphone in the embodiment.

In the timing chart of FIG. 7, described is the case where the smartphone 1 is shaken in the left-right direction and in the front-back direction at substantially the same timing; however, even in the case where the smartphone 1 is shaken in the left-right direction and in the front-back direction at different timings, the evaluation function G can determine a gesture of the smartphone 1.

In the following, the gesture detection by the smartphone 1 is described in detail with reference to a timing chart in FIG. 8. Note that description of gesture detection modes redundant with those in FIG. 7 is omitted, and gesture detection from t7 to t12 in FIG. 8 is described below.

Figure 8:
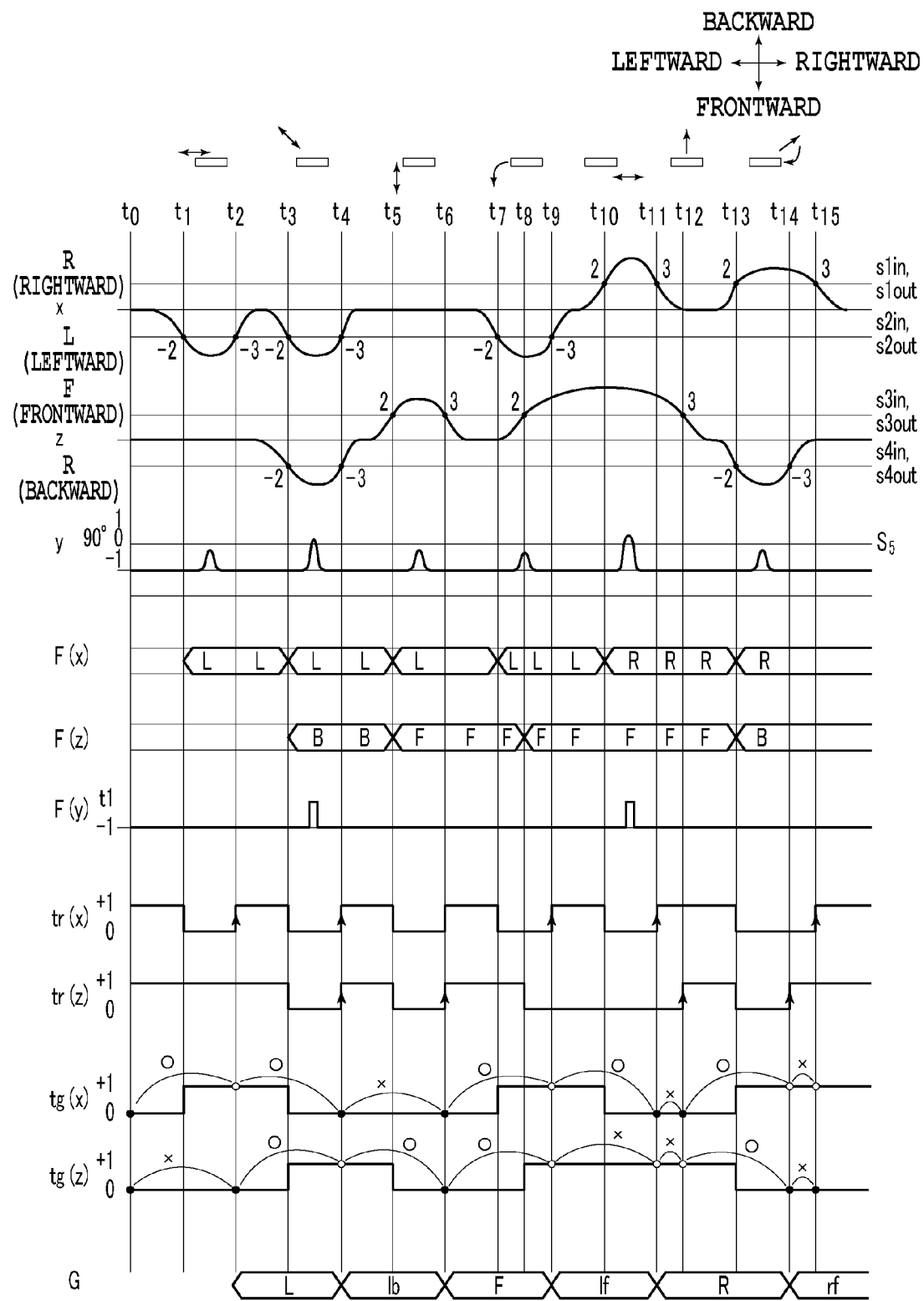
FIG. 8 is a timing chart illustrating gesture detecting modes of the smartphone in the embodiment.

In FIG. 8, when the smartphone 1 is shaken leftward at t7, x decreases stepwise. When x falls below the threshold value s2in, it is sensed that the smartphone 1 is tilted leftward, exceeding the predetermined angle (t7). At this time, F(x) obtains −2 as the left-right determination value. F(x) performs the determination process on the basis of the left-right determination value −2 to determine "L" indicating the leftward shake gesture (t7). In synchronization with this timing, tr(x) lowers the signal from +1 to 0 (t7), and tg(x) raises the signal from 0 to +1 (t7).

When the smartphone 1 is shaken frontward, z increases stepwise. When z exceeds the threshold value s3in, it is sensed that the smartphone 1 is tilted frontward, exceeding the predetermined angle (t8). At this time, F(z) obtains +2 as the front-back determination value. F(z) performs the determination process on the basis of the front-back determination value +2 to determine "F" indicating the frontward shake gesture (t8). In synchronization with this timing, tr(z) lowers the signal from +1 to 0, and tg(z) raises the signal from 0 to +1 (t8).

When the smartphone 1 is shaken back rightward, x increases stepwise. When x exceeds the threshold value stout, it is sensed that the smartphone 1 is tilted rightward, exceeding the predetermined angle (t9). At this time, F(x) obtains −3 as the left-right determination value. F(x) performs the determination process on the basis of the left-right determination value −2 at t7 and the left-right determination value −3 at t9 to determine "L" indicating the leftward shake gesture (t9). In synchronization with this timing, tr(x) raises the signal from 0 to +1 (t9).

In order to determine switching of the gesture of the smartphone 1 in synchronization with this timing, the evaluation function G determines whether or not the states of tg(x) and tg(z) are changed (t9). In this example, the value of tg(x) changes from 0 (t6) to +1 (t9), and also the value of tg(z) changes from 0 (t6) to +1 (t9). The evaluation function G adopts "L" and "F", which are the determination values of both of F(x) and F(z) at t9, on the basis of the changes in states of tg(x) and tg(z). From the above, on the basis of adopting "L" and "F", the evaluation function G determines "lf" indicating that a gesture of the smartphone 1 is the left-frontward shake gesture (t9).

When the smartphone 1 is shaken rightward, x increases stepwise. When x exceeds the threshold value s1in, it is sensed that the smartphone 1 is tilted rightward, exceeding the predetermined angle (t10). At this time, F(x) obtains +2 as the left-right determination value. F(x) performs the determination process on the basis of the left-right determination value +2 to determine "R" indicating the rightward shake gesture (t10). In synchronization with this timing, tr(x) lowers the signal from +1 to 0 (t10), and tg(x) lowers the signal from +1 to 0 (t10).

When the smartphone 1 is shaken back leftward, x decreases stepwise. When x falls below the threshold value s1out, it is sensed that the smartphone 1 is tilted leftward, exceeding the predetermined angle (t11). At this time, F(x) obtains +3 as the left-right determination value. F(x) performs the determination process on the basis of the left-right determination value +2 at t10 and the left-right determination value +3 at t11 to determine "R" indicating the rightward shake gesture (t11). In synchronization with this timing, tr(x) raises the signal from 0 to +1 (t11).

In order to determine switching of the gesture of the smartphone 1 in synchronization with this timing, the evaluation function G determines whether or not the states of tg(x) and tg(z) are changed (t11). In this example, the value of tg(x) changes from +1 (t9) to 0 (t11), whereas the value of tg(z) remains at +1 (t9 to t11). The evaluation function G adopts "R", which is the output value of F(x) at t11, on the basis of the change in state of tg(x). From the above, on the basis of adopting "R", the evaluation function G determines "R" indicating that a gesture of the smartphone 1 is the rightward shake gesture (t11).

When the smartphone 1 is shaken back backward, the value z outputted by the motion detecting unit 110 decreases stepwise. When z falls below the threshold value s3out, it is sensed that the smartphone 1 is tilted backward, exceeding the predetermined angle (t12). At this time, F(z) obtains +3 as the front-back determination value. F(z) performs the determination process on the basis of the front-back determination value +2 at t8 and the front-back determination value +3 at t12 to determine "F" indicating the frontward shake gesture (t12). In synchronization with this timing, tr(z) raises the signal from 0 to +1 (t12).

In order to determine switching of the gesture of the smartphone 1 in synchronization with this timing, the evaluation function G determines whether or not the states of tg(x) and tg(z) are changed (t12). In this example, the value of tg(x) remains at 0 (t11 to t12), and the value of tg(z) also remains at +1 (t11 to t12). The evaluation function G outputs neither F(x) nor F(z) at t12 on the basis of no changes in states of tg(x) and tg(z). On the basis of the above processing results, the evaluation function G does not perform the gesture determination process of the smartphone 1 (t12).

As described above, even in the case where the smartphone 1 is tilted in the left-right direction and in the front-back direction at different timings, the evaluation function G can determine a gesture mode of the smartphone 1.

Also, as described above, the gesture detection by the smartphone 1 is described by determining which direction the smartphone 1 is tilted in. Further, detectable gestures are not only gestures in predetermined directions, but also, for example, spin gestures of spinning the smartphone 1.

Figure 9:
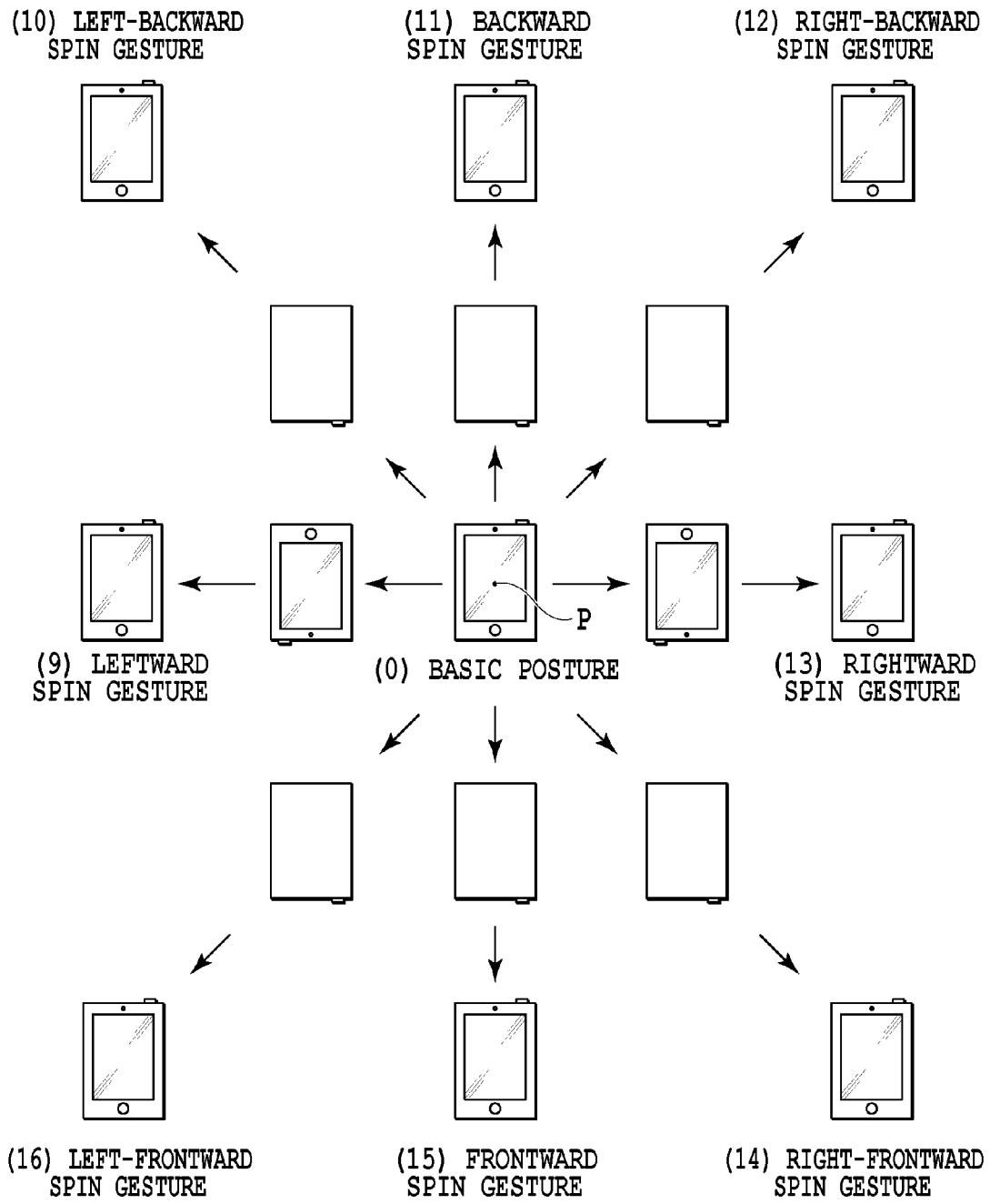
FIG. 9 is an example of spin gestures of the smartphone in a variation.

A variation of the present embodiment is described in detail with reference to FIGS. 9 to 11. In FIG. 9, the smartphone 1 illustrated in the center is in (0) the basic posture. A mode of spinning the smartphone 1 360 degrees leftward substantially around P in the xy plane around the z axis to return to the basic posture is referred to as (9) a leftward spin gesture; a mode of spinning the smartphone 1 360 degrees backward substantially around P in the yz plane around the x axis to return to the basic posture is referred to as (11) a backward spin gesture; a mode of spinning the smartphone 1 360 degrees rightward substantially around P in the xy plane around the z axis to return to the basic posture is referred to as (13) a rightward spin gesture; and a mode of spinning the smartphone 1 360 degrees frontward substantially around P in the yz plane around the x axis to return to the basic posture is referred to as (15) a frontward spin gesture. Further, a mode of spinning the smartphone 1 360 degrees in an intermediate direction between (9) the leftward spin gesture and (11) the backward spin gesture to return to the basic posture is referred to as (10) a left-backward spin gesture; a mode of spinning the smartphone 1 360 degrees in an intermediate direction between (11) the backward spin gesture and (13) the rightward spin gesture to return to the basic posture is referred to as (12) a right-backward spin gesture; a mode of spinning the smartphone 1 360 degrees in an intermediate direction between (13) the rightward spin gesture and (15) the frontward spin gesture to return to the basic posture is referred to as (14) a right-frontward spin gesture; and a mode of spinning the smartphone 1 360 degrees in an intermediate direction between (15) the frontward spin gesture and (9) the leftward spin gesture to return to the basic posture is referred to as (16) a left-frontward spin gesture.

When detecting the respective spin gestures, the smartphone 1 respectively outputs values of cl, cr, cf, cb, clb, clf, crb, and crf as gesture determination values, which respectively correspond to the spins in the eight types of directions, i.e., leftward spin, rightward spin, frontward spin, backward spin, left-backward spin, left-frontward spin, right-backward spin, and right-frontward spin.

The gesture detection by the smartphone 1 is described with reference to FIG. 10.

When starting to spin the smartphone 1 frontward, z increases stepwise. When z exceeds the threshold value s3in, it is sensed that the smartphone 1 is tilted, exceeding a predetermined angle (t1). At this time, F(z) obtains +2 as the front-back determination value. F(z) performs the determination process on the basis of the front-back determination value +2 to determine "F" indicating the frontward shake gesture (t1). In synchronization with this timing, tr(z) lowers the signal from +1 to 0 (t1), and tg(z) raises the signal from 0 to +1 (t1).

When the smartphone 1 is tilted a predetermined angle or more with respect to the y axis, y increases stepwise. When y exceeds a threshold value s5, it is sensed that the smartphone 1 is tilted, exceeding the predetermined angle (e.g., tilted 90 degrees frontward from the basic posture in the yz plane around the x axis) (t2). In synchronization with this timing, F(y) outputs a value of +1 (t2).

When the smartphone 1 continues to spin, z decreases stepwise after t2. When z falls below the threshold value s3out, it is sensed that the smartphone 1 is tilted, exceeding a predetermined angle, i.e., the smartphone 1 spins frontward from the basic posture in the yz plane around the x axis, exceeding 90 degrees, and comes close to a 180-degree posture. Note that when detecting a spin gesture of the smartphone 1, the determination process by F(z) is not performed while a value of F(y) is +1. Similarly, while the value of F(y) is +1, the gesture evaluation function G is not performed as well. This is to avoid a situation where in the case of performing the determination by F(z) and the gesture evaluation function G on the basis of a front-back determination value at t3, "F" indicating the frontward shake gesture may be determined. In synchronization with this timing, tr(z) raises the signal from 0 to +1 (t3).

When the smartphone 1 continues to spin, z decreases stepwise. When z falls below the threshold value s4in, it is sensed that the smartphone 1 is tilted, exceeding a predetermined angle, i.e., the smartphone 1 spins frontward from the basic posture in the yz plane around the x axis, exceeding 180 degrees, and comes close to a 270-degree posture (t4). Note that the value of F(y) at t4 is +1, and therefore the determination process by F(z) is not performed. In synchronization with this timing, tr(z) lowers the signal from +1 to 0 (t4), and tg(z) lowers the signal from +1 to 0 (t4).

When the smartphone 1 is tilted a predetermined angle or more with respect to the y axis, y decreases stepwise. When y falls below the threshold value s5, it is sensed that the smartphone 1 is tilted with respect to the y axis, exceeding the predetermined angle (e.g., tilted 270 degrees frontward from the basic posture in the yz plane around the x axis) (t5). In synchronization with this timing, F(y) outputs a value of 0 (t5).

When the smartphone 1 continues to spin, z increases stepwise after t5. When z exceeds the threshold value s4out, it is sensed that the smartphone 1 is tilted, exceeding a predetermined angle, i.e., the smartphone 1 spins 270 degrees or more frontward from the basic posture in the yz plane around the x axis (t6). Note that the value of F(y) is 0, and therefore the determination process by F(z) is performed. At this time, F(z) obtains −3 as the front-back determination value. F(z) performs the determination process on the basis of the front-back determination value +2 at t1 and the front-back determination value −3 at t6 to determine "cf" indicating the frontward spin gesture (t6). In synchronization with this timing, tr(z) raises the signal from 0 to +1 (t6).

In order to determine switching of the gesture of the smartphone 1 at t6, the evaluation function G determines whether or not the states of tg(x) and tg(z) are changed (t6). In this example, the value of tg(x) remains at +1 (t3 to t6), whereas the value of tg(z) changes from +1 (t3) to 0 (t6). The evaluation function G adopts "cf", which is the output value of F(z), on the basis of the change in state of tg(z). From the above, on the basis of adopting "cf", the evaluation function G determines "cf" indicating that a gesture of the smartphone 1 is the frontward spin gesture (t6).

When starting to spin the smartphone 1 backward, z decreases stepwise. When z falls below the threshold value s4in, it is sensed that the smartphone 1 is tilted, exceeding a predetermined angle (t7). At this time, F(z) obtains −2 as the front-back determination value. F(z) performs the determination process on the basis of the front-back determination value −2 to determine "B" indicating the backward shake gesture (t7). In synchronization with this timing, tr(z) lowers the signal from +1 to 0 (t7), and tg(z) raises the signal from 0 to +1 (t7). When the smartphone 1 is tilted the predetermined angle or more with respect to the y axis, y increases stepwise. When y exceeds the threshold value s5, it is sensed that the smartphone 1 is tilted with respect to the y axis, exceeding the predetermined angle (e.g., tilted 90 degrees backward from the basic posture in the yz plane around the x axis) (t8). In synchronization with this timing, F(y) outputs a value of +1 (t8).

When the smartphone 1 continues to spin, z increases stepwise after t8. When z exceeds the threshold value s4out, it is sensed that the smartphone 1 is tilted, exceeding the predetermined angle, i.e., the smartphone 1 spins backward from the basic posture in the yz plane around the x axis, exceeding 90 degrees, and comes close to the 180-degree posture. Note that when detecting a spin gesture of the smartphone 1, the determination process by F(z) is not performed while the value of F(y) is +1. Similarly, while the value of F(y) is +1, the gesture evaluation function G is not performed as well. This is to avoid a situation where in the case of performing the determination by F(z) and the gesture determination process F on the basis of a front-back determination value at t9, "B" indicating the backward shake gesture may be determined. In synchronization with this timing, tr(z) raises the signal from 0 to +1 (t9).

When the smartphone 1 continues to spin, z increases stepwise. When z exceeds the threshold value s3in, it is sensed that the smartphone 1 is tilted, exceeding a predetermined angle, i.e., the smartphone 1 spins backward from the basic posture in the yz plane around the x axis, exceeding 180 degrees, and comes close to a 270-degree posture (t10). Note that the value of F(y) at t10 is +1, and therefore the determination process by F(z) is not performed. In synchronization with this timing, tr(z) lowers the signal from +1 to 0 (t10), and tg(z) lowers the signal from +1 to 0 (t10).

When the smartphone 1 is tilted a predetermined angle or more with respect to the y axis, y decreases stepwise. When y falls below the threshold value s5, it is sensed that the smartphone 1 is tilted with respect to the y axis, exceeding the predetermined angle (e.g., tilted 270 degrees backward from the basic posture in the yz plane around the x axis) (t11). In synchronization with this timing, F(y) outputs a value of 0 (t11).

When the smartphone 1 continues to spin, z decreases stepwise after t11. When z falls below the threshold value s3out, it is sensed that the smartphone 1 is tilted, exceeding a predetermined angle, i.e., the smartphone 1 spins 270 degrees or more backward from the basic posture in the yz plane around the x axis (t12). Note that the value of F(y) is 0, and therefore the determination process by F(z) is performed. At this time, F(z) obtains +3 as the front-back determination value. F(z) performs the determination process on the basis of the front-back determination value −2 at t7 and the front-back determination value +3 at t12 to determine "cb" indicating the backward spin gesture (t12). In synchronization with this timing, tr(z) raises the signal from 0 to +1 (t12).

In order to determine switching of the gesture of the smartphone 1 at t12, the evaluation function G determines whether or not the states of tg(x) and tg(z) are changed (t12). In this example, the value of tg(x) remains at +1 (t9 to t12), whereas the value of tg(z) changes from +1 (t9) to 0 (t12). The evaluation function G adopts "cb", which is the output value of F(z), on the basis of the change in state of tg(z). From the above, on the basis of adopting "cb", the evaluation function G determines "cb" indicating that a gesture of the smartphone 1 is the backward spin gesture (t12).

When starting to spin the smartphone 1 rightward, x increases stepwise. When x exceeds the threshold value s1in, it is sensed that the smartphone 1 is tilted, exceeding a predetermined angle (t13). At this time, F(x) obtains +2 as the left-right determination value. F(x) performs the determination process on the basis of the left-right determination value +2 to determine "R" indicating the rightward shake gesture (t13). In synchronization with this timing, tr(x) lowers the signal from +1 to 0 (t13), and tg(x) lowers the signal from +1 to 0 (t13).

When the smartphone 1 is tilted a predetermined angle or more with respect to the y axis, y increases stepwise. When y exceeds the threshold value s5, it is sensed that the smartphone 1 is tilted with respect to the y axis, exceeding the predetermined angle (e.g., tilted 90 degrees rightward from the basic posture in the xy plane around the z axis) (t14). In synchronization with this timing, F(y) outputs a value of +1 (t14).

When the smartphone 1 continues to spin, x decreases stepwise after t14. When x falls below the threshold value s1out, it is sensed that the smartphone 1 is tilted, exceeding the predetermined angle, i.e., the smartphone 1 spins rightward from the basic posture in the xy plane around the z axis, exceeding 90 degrees, and comes close to a 180-degree posture. Note that when detecting a spin gesture of the smartphone 1, the determination process by F(x) is not performed while the value of F(y) is +1. Similarly, while the value of F(y) is +1, the gesture evaluation function G is not performed as well. This is to avoid a situation where in the case of performing the determination by F(x) and the gesture evaluation function G on the basis of a left-right determination value at t13, "R" indicating the rightward shake gesture may be determined. In synchronization with this timing, tr(x) raises the signal from 0 to +1 (t9).

When the smartphone 1 continues to spin, x decreases stepwise. When x falls below the threshold value s2in, it is sensed that the smartphone 1 is tilted, exceeding a predetermined angle, i.e., the smartphone 1 spins rightward from the basic posture in the xy plane around the z axis, exceeding 180 degrees, and comes close to a 270-degree posture (t16). Note that the value of F(y) at t16 is +1, and therefore the determination process by F(x) is not performed. In synchronization with this timing, tr(x) lowers the signal from +1 to 0 (t16), and tg(x) raises the signal from 0 to +1 (t16).

When the smartphone 1 is tilted a predetermined angle or more with respect to the y axis, y decreases stepwise. When y falls below the threshold value s5, it is sensed that the smartphone 1 is tilted with respect to the y axis, exceeding the predetermined angle (e.g., tilted 270 degrees rightward from the basic posture in the xy plane around the z axis) (t17). In synchronization with this timing, F(y) outputs a value of 0 (t17).

When the smartphone 1 continues to spin, x increases stepwise after t17. When x exceeds the threshold value stout, it is sensed that the smartphone 1 is tilted, exceeding a predetermined angle, i.e., the smartphone 1 spins 270 degrees or more rightward from the basic posture in the xy plane around the z axis (t18). Note that the value of F(y) is 0, and therefore the determination process by F(x) is performed. At this time, F(x) obtains −3 as the left-right determination value. F(x) performs the determination process on the basis of the left-right determination value +2 at t13 and the left-right determination value −3 at t18 to determine "cr" indicating the rightward spin gesture (t18). In synchronization with this timing, tr(x) raises the signal from 0 to +1 (t18).

In order to determine switching of the gesture of the smartphone 1 at t18, the evaluation function G determines whether or not the states of tg(x) and tg(z) are changed (t18). In this example, the value of tg(x) changes from 0 (t15) to 1 (t18), whereas the value of tg(z) remains at 0 (t15 to t18). The evaluation function G adopts "cr", which is the output value of F(x), on the basis of the change in state of tg(x). From the above, on the basis of adopting "cr", the evaluation function G determines "cr" indicating that a gesture of the smartphone 1 is the rightward spin gesture (t18).

When starting to spin the smartphone 1 leftward, x decreases stepwise. When x falls below the threshold value s2in, it is sensed that the smartphone 1 is tilted, exceeding a predetermined angle (t19). At this time, F(x) obtains −2 as the left-right determination value. F(x) performs the determination process on the basis of the left-right determination value −2 to determine "L" indicating the leftward shake gesture (t19). In synchronization with this timing, tr(x) lowers the signal from +1 to 0 (t19), and tg(x) lowers the signal from +1 to 0 (t19).

When the smartphone 1 is tilted a predetermined angle or more with respect to the y axis, y increases stepwise. When y exceeds the threshold value s5, it is sensed that the smartphone 1 is tilted with respect to the y axis, exceeding the predetermined angle (e.g., tilted 90 degrees leftward from the basic posture in the xy plane around the z axis) (t20). In synchronization with this timing, F(y) outputs a value of +1 (t20).

When the smartphone 1 continues to spin, x increases stepwise after t20. When x exceeds the threshold value stout, it is sensed that the smartphone 1 is tilted, exceeding the predetermined angle, i.e., the smartphone 1 spins leftward from the basic posture in the xy plane around the z axis, exceeding 90 degrees, and comes close to the 180-degree posture. Note that when detecting a spin gesture of the smartphone 1, the determination process by F(x) is not performed while the value of F(y) is +1. Similarly, while the value of F(y) is +1, the gesture evaluation function G is not performed as well. This is to avoid a situation where in the case of performing the determination by F(x) and the gesture evaluation function G on the basis of a left-right determination value at t19, "L" indicating the leftward shake gesture may be determined. In synchronization with this timing, tr(x) raises the signal from 0 to +1 (t21).

When the smartphone 1 continues to spin, x increases stepwise. When x exceeds the threshold value s1in, it is sensed that the smartphone 1 is tilted, exceeding a predetermined angle, i.e., the smartphone 1 spins leftward from the basic posture in the xy plane around the z axis, exceeding 180 degrees, and comes close to a 270-degree posture (t22). Note that the value of F(y) at t22 is +1, and therefore the determination process by F(x) is not performed. In synchronization with this timing, tr(x) lowers the signal from +1 to 0 (t22), and tg(x) raises the signal from 0 to +1 (t22).

When the smartphone 1 is tilted a predetermined angle or more with respect to the y axis, y decreases stepwise. When y falls below the threshold value s5, it is sensed that the smartphone 1 is tilted with respect to the y axis, exceeding the predetermined angle (e.g., tilted 270 degrees leftward from the basic posture in the xy plane around the z axis) (t23). In synchronization with this timing, F(y) outputs a value of 0 (t23).

When the smartphone 1 continues to spin, x decreases stepwise after t23. When x falls below the threshold value s1out, it is sensed that the smartphone 1 is tilted, exceeding a predetermined angle, i.e., the smartphone 1 spins 270 degrees or more leftward from the basic posture in the xy plane around the z axis (t24). Note that the value of F(y) is 0, and therefore the determination process by F(x) is performed. At this time, F(x) obtains +3 as the left-right determination value. F(x) performs the determination process on the basis of the left-right determination value −2 at t19 and the left-right determination value +3 at t24 to determine "cl" indicating the leftward spin gesture (t24). In synchronization with this timing, tr(x) raises the signal from 0 to +1 (t24).

In order to determine switching of the gesture of the smartphone 1 at t24, the evaluation function G determines whether or not the states of tg(x) and tg(z) are changed (t24). In this example, the value of tg(x) changes from 0 (t21) to +1 (t24), whereas the value of tg(z) remains at 0 (t21 to t24). The evaluation function G adopts "cl", which is the output value of F(x), on the basis of the change in state of tg(x). From the above, on the basis of adopting "cl", the evaluation function G determines "cl" indicating that a gesture of the smartphone 1 is the leftward spin gesture (t24).

Subsequently, the gesture detection by the smartphone 1 is described with reference to FIG. 11. Note that parts redundant with those in FIG. 10 are omitted to give the description.

The evaluation function G can further determine the right-frontward spin gesture with reference to outputs of F(x), F(z), F(y), tr(x), tr(z), tg(x), and tg(z). That is, in order to determine switching of the gesture of the smartphone 1 at t30, the evaluation function G determines whether or not the states of tg(x) and tg(z) are changed (t30). In this example, the value of tg(x) changes from 0 (t27) to +1 (t30), and also the value of tg(z) changes from +1 (t27) to 0 (t30). The evaluation function G adopts "cr" and "cf", which are the output values of F(x) and F(z), on the basis of the changes in states of tg(x) and tg(z). From the above, on the basis of adopting "cr" and "cf", the evaluation function G determines "crf" indicating that a gesture of the smartphone 1 is the right-frontward spin gesture (t30).

Similarly, in order to determine switching of the gesture of the smartphone 1 at t36, the evaluation function G determines whether or not the states of tg(x) and tg(z) are changed (t30). In this example, the value of tg(x) changes from 0 (t33) to +1 (t36), and also the value of tg(z) changes from +1 (t33) to 0 (t36). The evaluation function G adopts "cl" and "cb", which are the output values of F(x) and F(z), on the basis of the changes in states of tg(x) and tg(z). From the above, on the basis of adopting "cl" and "cb", the evaluation function G determines "clb" indicating that a gesture of the smartphone 1 is the left-backward spin gesture (t36).

Similarly, in order to determine switching of the gesture of the smartphone 1 at t42, the evaluation function G determines whether or not the states of tg(x) and tg(z) are changed (t42). In this example, the value of tg(x) changes from 0 (t39) to +1 (t42), and also the value of tg(z) changes from +1 (t39) to 0 (t42). The evaluation function G adopts "cr" and "cb", which are the output values of F(x) and F(z), on the basis of the changes in states of tg(x) and tg(z). From the above, on the basis of adopting "cr" and "cb", the evaluation function G determines "crb" indicating that a gesture of the smartphone 1 is the right-backward spin gesture (t42).

Similarly, in order to determine switching of the gesture of the smartphone 1 at t48, the evaluation function G determines whether or not the states of tg(x) and tg(z) are changed (t48). In this example, the value of tg(x) changes from 0 (t45) to +1 (t48), and also the value of tg(z) changes from +1 (t45) to 0 (t48). The evaluation function G adopts "cl" and "cf", which are the output values of F(x) and F(z), on the basis of the changes in states of tg(x) and tg(z). From the above, on the basis of adopting "cl" and "cf", the evaluation function G determines "clf" indicating that a gesture of the smartphone 1 is the left-frontward spin gesture (t48).

As described above, the operations of the processor 100, motion detecting unit 110, and gesture processing program 122 make it possible to determine not only the gesture modes of the shake gestures of the smartphone 1 in the predetermined directions but also the gesture modes of the spin gestures.

FIG. 12 is a table illustrating a relationship between a gesture and determination values. In FIG. 12, for example, in the case where as the left-right determination value, −2 is obtained at the time of shaking out, and −3 is obtained at the time of shaking back, as described with FIGS. 7 and 8, F(x) outputs "L". In this case, the evaluation function G determines "L" as the gesture determination value on condition that the state of tg(z) is not changed. This makes it possible to detect that the behavior of the smartphone 1 is the leftward shake gesture.

In FIG. 12, for example, in the case where the left-right determination value, +2 is obtained at the time of shaking out, and +3 is obtained at the time of shaking back, and as the front-back determination value, +2 is obtained at the time of shaking out, and +3 is obtained at the time of shaking back, as described with FIGS. 7 and 8, F(x) and F(z) respectively output "R" and "F". In this case, the evaluation function G determines "rf" indicating the intermediate direction between "R" and "F" as the gesture determination value on condition that the states of tg(x) and tg(z) are changed. This makes it possible to detect that the behavior of the smartphone 1 is the right-frontward shake gesture.

Figure 10:
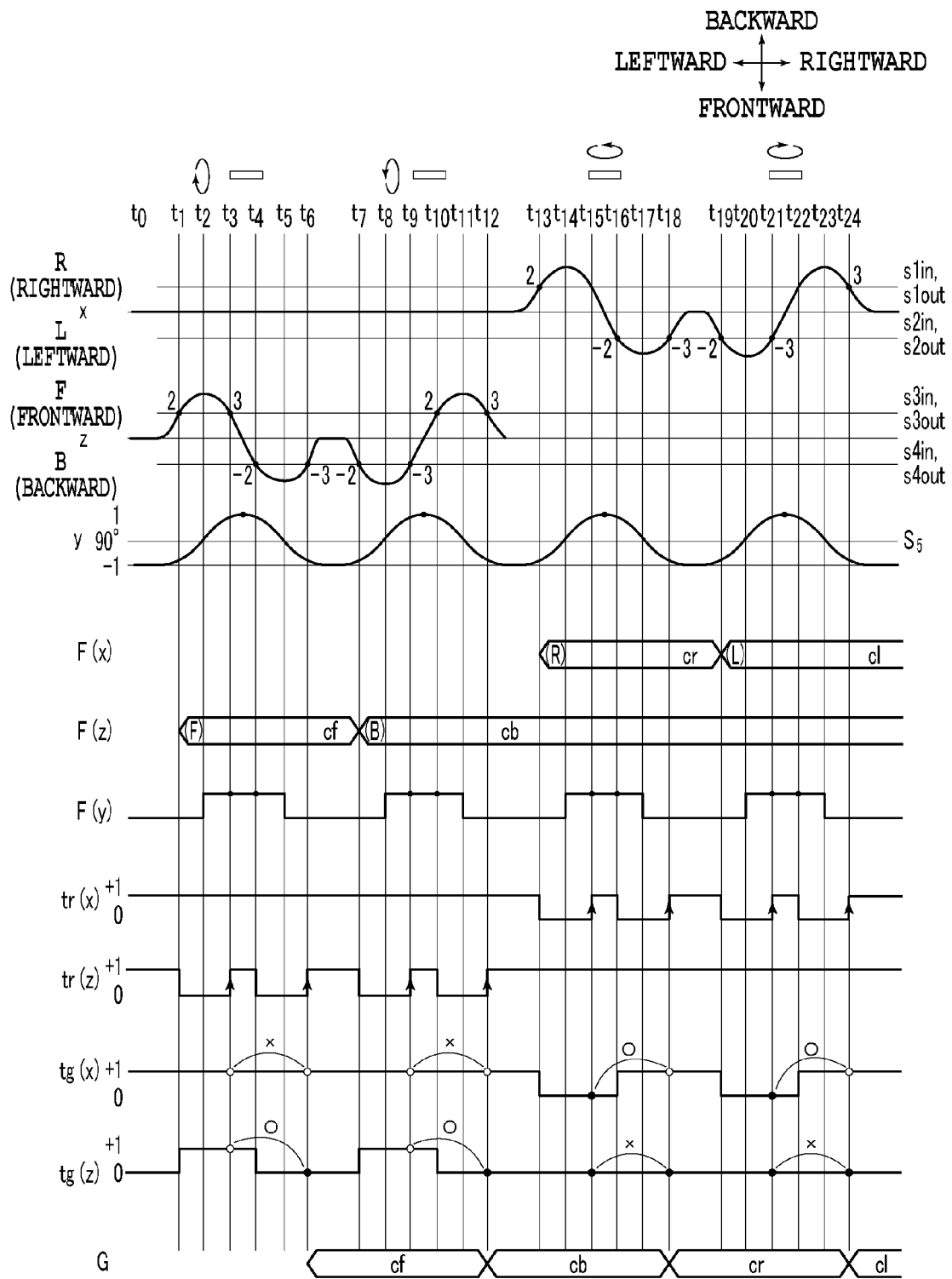
FIG. 10 is a timing chart illustrating gesture detecting modes of the smartphone in the variation.
Figure 11:
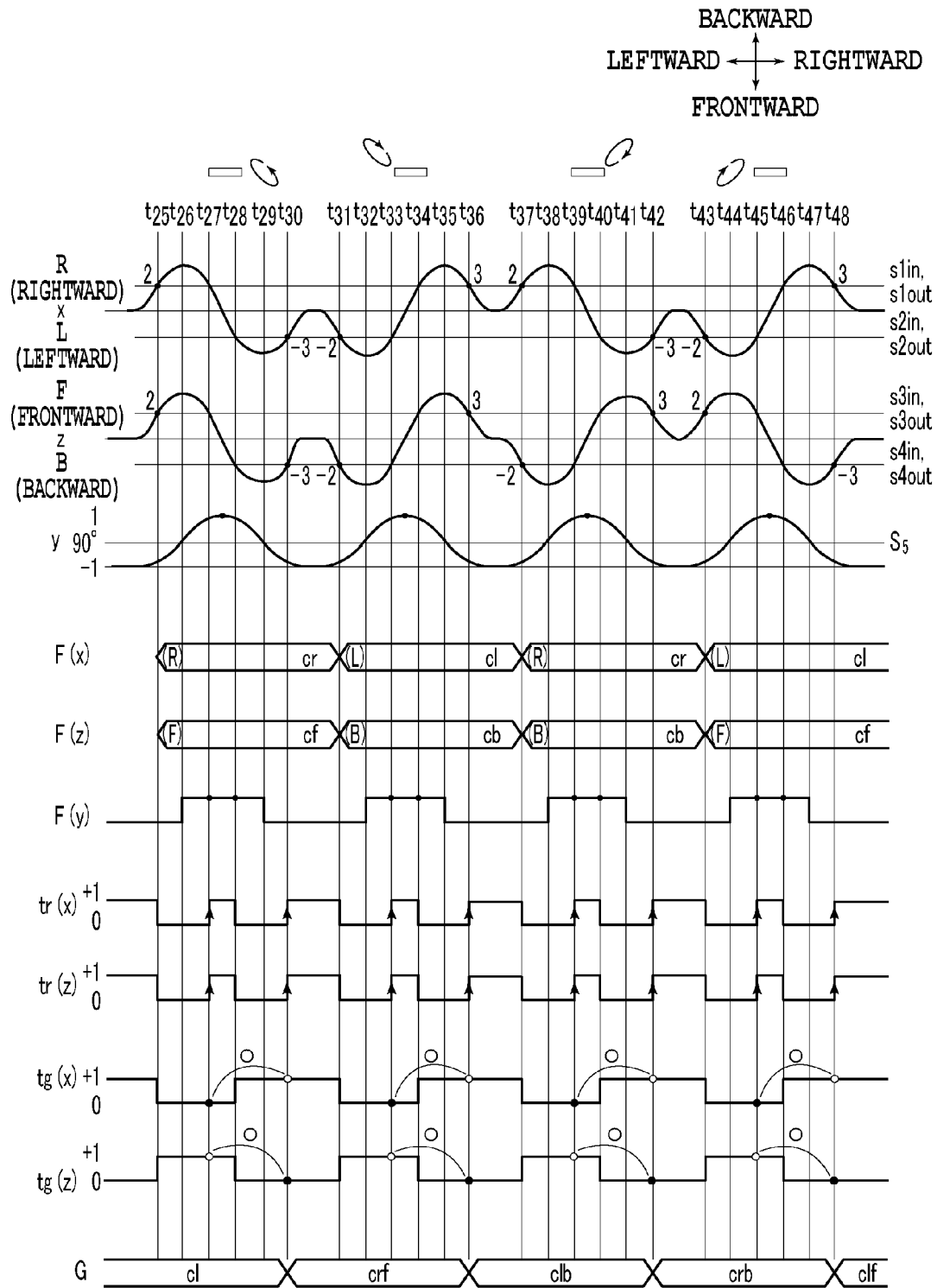
FIG. 11 is a timing chart illustrating the gesture detecting modes in the variation.

In FIG. 12, for example, in the case where the front-back determination value, 2 is obtained at the time of shaking out, and −3 is obtained at the time of shaking back, as described with FIG. 10, F(z) outputs "cf". in this case, the evaluation function G determines "cf" as the gesture determination value. This makes it possible to detect that the behavior of the smartphone 1 is the frontward spin gesture.

In FIG. 12, for example, in the case where as the left-right determination value, −2 is obtained at the time of shaking out, and +3 is obtained at the time of shaking back, and as the front-back determination value, +2 is obtained at the time of shaking out, and −3 is obtained at the time of shaking back, as described with FIG. 10, F(x) and F(z) respectively output "cl" and "cf". In this case, the evaluation function G determines "clf" indicating the intermediate direction between "cl" and "cf" as the gesture determination value on condition that the states of tg(x) and tg(z) are changed. This makes it possible to detect that the behavior of the smartphone 1 is the left-frontward spin gesture.

As described, for each of the gestures, a corresponding unique combination of left-right determination values and front-back determination values is set. For this reason, in this embodiment of the present invention, the 16 types of gestures consisting of the shake gestures and the spin gestures in total can be detected.

Next, an input process applied with the above-described gesture detection principle is described with reference to FIG. 13.

FIG. 13 (1) is a display example of an ID input form screen in the gesture detecting device. The ID input form screen is displayed on the touch screen display 130 of the smartphone 1, and includes an ID input form 1301, cursor 1302, authentication button 1303, and clear button 1304.

The ID input form screen is displayed, for example, when the authentication application 123 running on the smartphone 1 prompts a user to input an authentication ID. Also, on the touch screen display 130, navigators adapted to guide and indicate a gesture direction of the smartphone 1 are displayed. The navigators are eight types, i.e., A, B, C, D, E, F, G, H, and I, which respectively correspond to directions around the smartphone 1, i.e., leftward, left-backward, backward, right-backward, rightward, right-frontward, frontward, and left-frontward.

When the cursor 1302 is present in the ID input form 1301, a user holds the smartphone 1 in his/her hand and makes the smartphone 1 detect a predetermined gesture. Then, at timing when the smartphone 1 outputs a gesture determination value, the smartphone 1 displays information corresponding to the given gesture in the ID input form 1301.

Taking FIG. 13 (2) as an example to give description, a user holds the smartphone 1 in his/her hand to make the smartphone successively detect the "right-frontward", "leftward", "backward", and "rightward" shake gestures. Then, at timings when the smartphone 1 outputs gesture determination values, the smartphone 1 displays "F", "A", "C", and "E" in the ID input form 1301, which are pieces of character information corresponding to the respective shake gestures.

After that, when the user presses down the authentication button 1303 while the pieces of character information "F", "A", "C", and "E" are being displayed in the ID input form 1301, the authentication application 123 performs an authentication process. Specifically, it is determined whether or not the pieces of character information displayed in the ID input form 1301 correspond with pre-registered ID information, and when corresponding with the ID information, it is determined that authentication is approved, whereas when not corresponding with the ID information, it is determined that the authentication is not approved. Note that in this example, a mode of pressing down the authentication button 1303 to thereby perform authentication determination is described; however, a mode of automatically performing authentication when character information corresponding to the pre-registered ID information is inputted in the ID input form 1301 is also possible.

The alphabetical arrangement of the pieces of character information displayed on the touch screen display 130 as the navigators is only an example, and upon request of the authentication application 123, any characters, symbols, and/or the like can be related to the navigators. Also, as will be described later, a user him/herself can also set pieces of character information to be displayed as the navigators.

As described above, by selecting input information on the basis of a detected gesture, new operability can be provided to users who use smart devices such as smartphones.

Next, a process performed by the smartphone 1 as the gesture detecting device is described with reference to flowcharts in FIGS. 14 to 25.

Figure 14:
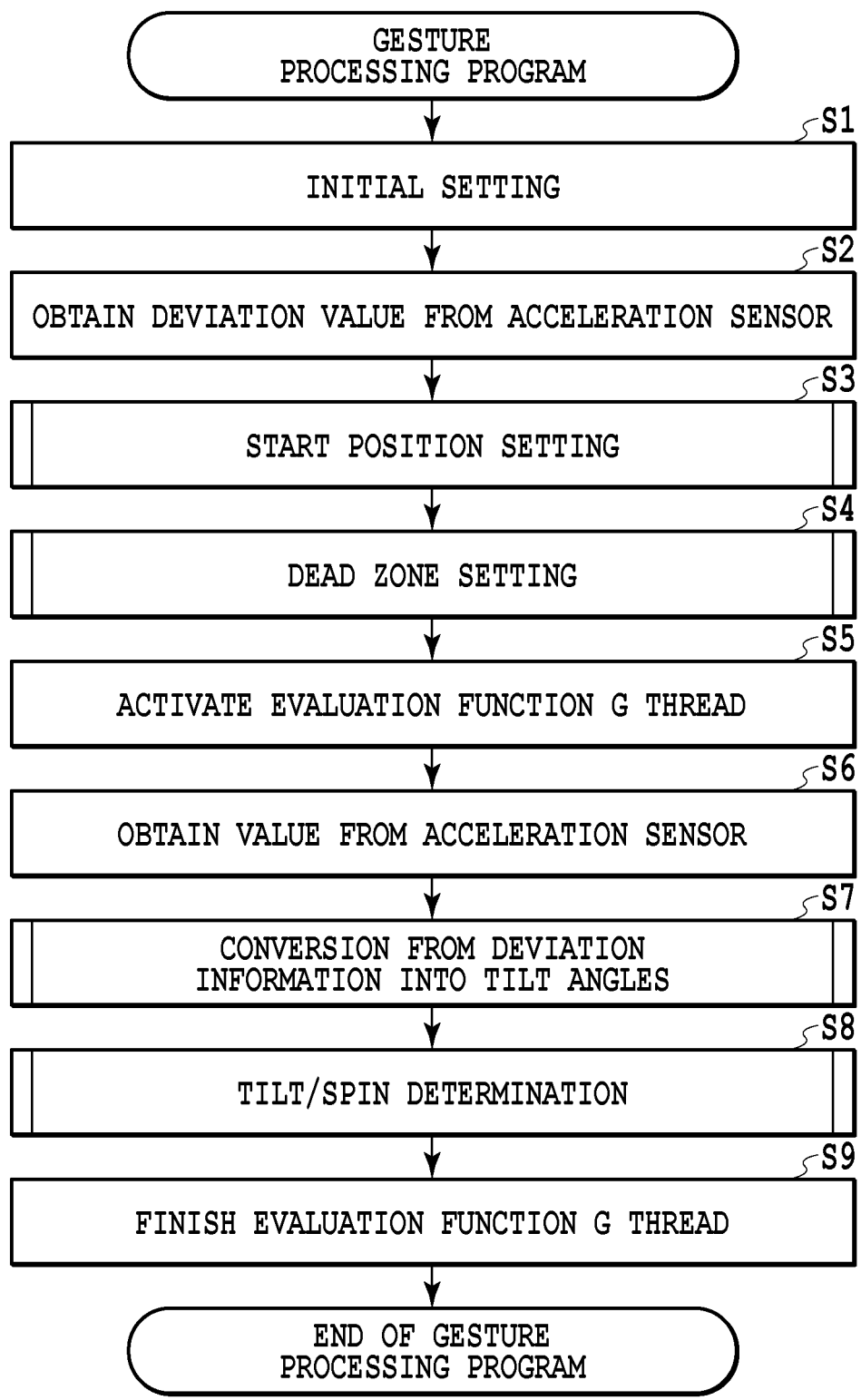
FIG. 14 is a processing flowchart of the smartphone in the embodiment.

FIG. 14 is a processing flowchart of the gesture processing program of the smartphone 1 according to the embodiment of the present invention.

In FIG. 14, when the program of the smartphone 1 starts, initial setting in S1 is performed.

In S2, deviation value and the like are obtained from the acceleration sensor 111 and the like of the motion detecting unit 110 (S2).

In S3, on the basis of the deviation value and the like obtained in S2, start position setting (calibration) of the smartphone 1 is performed. The start position setting (calibration) (S3) will be described later with FIG. 15.

In S4, dead zone setting is performed. The dead zone setting (S4) will be described in detail with FIG. 16.

In S5, a gesture evaluation function G thread adapted to perform the gesture evaluation function G is activated.

In S6, the deviation value and the like are again obtained from the acceleration sensor 111 and the like of the motion detecting unit 110.

In S7, a calculation is performed to convert the deviation value and the like obtained in S6 from the acceleration sensor 111 and the like into tilt angles. Alternatively, in the case of directly using the deviation value and the like outputted from the acceleration sensor 111 and the like, the process in S7 may be skipped.

In S8, on the basis of the tilt angle calculated in S7, tilt/spin determination is performed.

In S9, the gesture evaluation function G thread is finished. In the present embodiment, a gesture determination value is outputted in the process of the gesture evaluation function G thread in the form such as R, L, F, B, rf, fb, cr, cf, or crb illustrated in FIG. 12.

Figure 15:
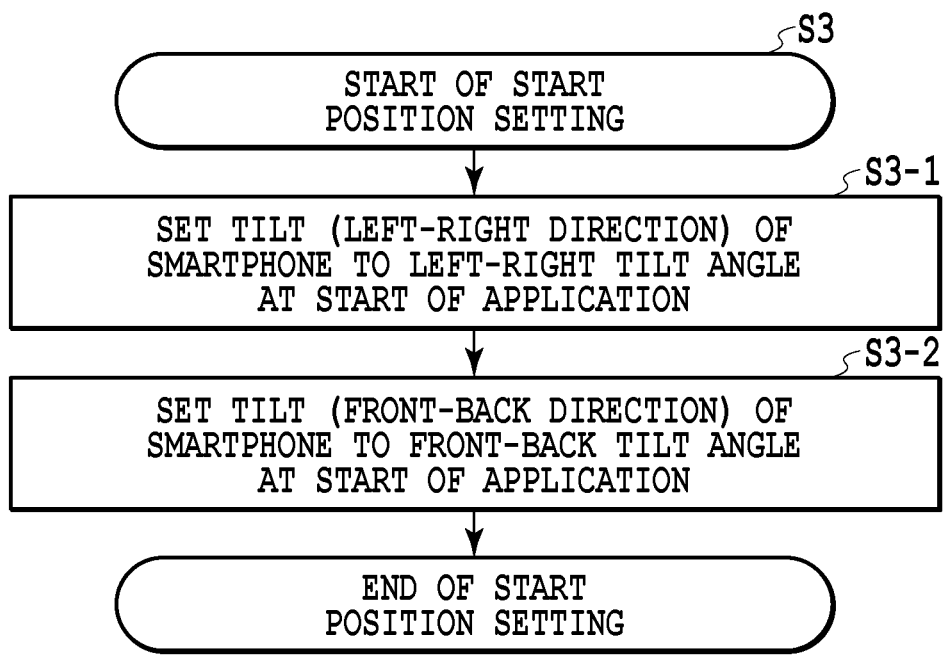
FIG. 15 is a processing flowchart of the smartphone in the embodiment.

FIG. 15 is a flowchart illustrating a subroutine for the start position setting (S3) in the overall flowchart of FIG. 14. In S3-1, a tilt angle (left-right direction) of the smartphone is set to a left-right tilt angle at the start of the application. Similarly, in S3-2, a tilt angle (front-back direction) of the smartphone is set to a front-back tilt angle at the start of the application. With the above processes, the start position setting (calibration) is completed.

Figure 16:
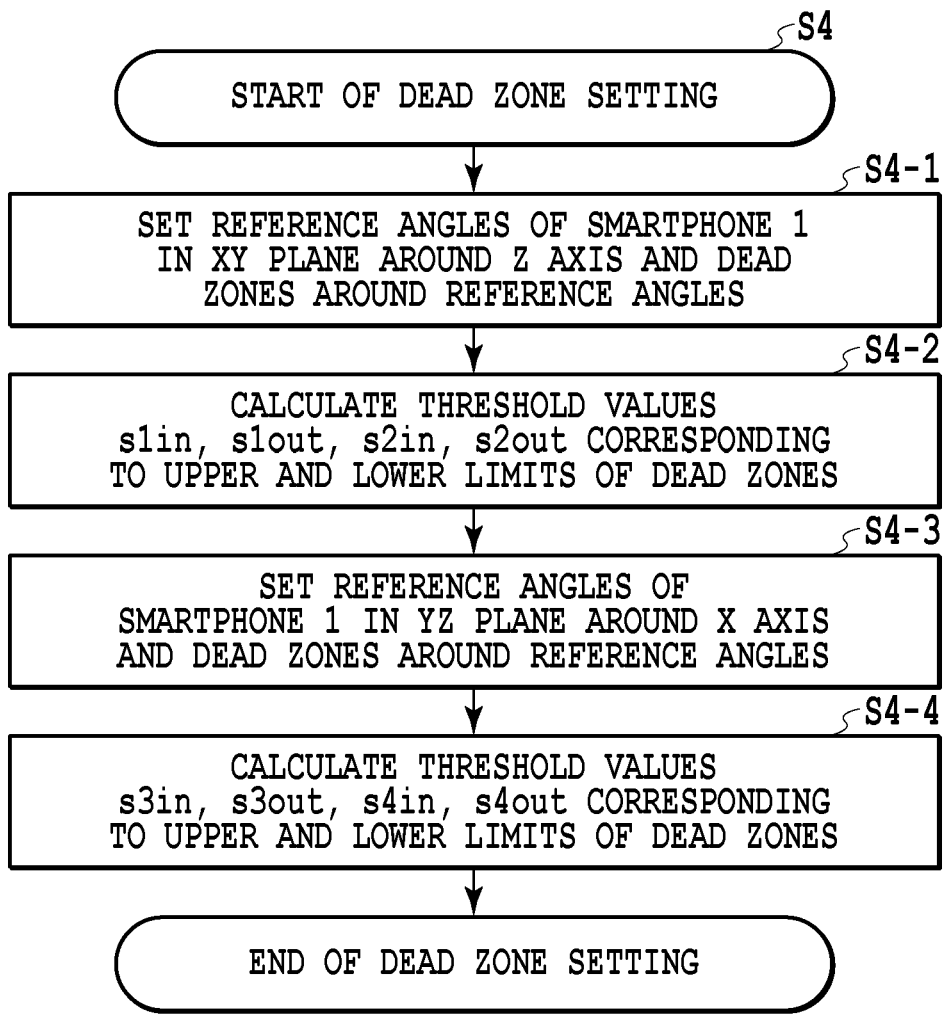
FIG. 16 is a processing flowchart of the smartphone in the embodiment.

FIG. 16 is a flowchart illustrating a subroutine for the dead zone setting (S4) in the overall flowchart of FIG. 14. Note that the dead zone refers to a zone where the acceleration sensor 111 and the like of the smartphone 1 do not output any deviation value on the left-right or front-back direction. For example, given that in FIGS. 4A and 4B, the position of the smartphone 1 indicated by the chain double-dashed line is defined as a "reference angle: −30 degrees", when the smartphone is shaken leftward and tilted more than −35 degrees (30+5), a leftward determination value of −2 is outputted. Similarly, when the smartphone 1 is shaken back rightward and tilted −25 degrees (30−5) or less, a rightward determination value of −3 is outputted. As described, by providing a difference in angle between shaking out and shaking back, noise such as chattering can be removed.

In S4-1, reference angles of the smartphone 1, and dead zones around the reference angles in the xy plane around the z axis are set. The reference angles and the dead zones are set as, for example, "reference angle: −30 degrees, dead zone: −25 degrees (shaking back) to −35 degrees (shaking out)" and "reference angle: +30 degrees, dead zone: +25 degrees (shaking back) to +35 degrees (shaking out)". Then, in S4-2, coordinate values corresponding to the upper limit angles and lower limit angles of the dead zones are calculated, and set as the threshold values s1in, s1out, s2in, and s2out. In this case, s1in, s1out, s2in, and s2out respectively correspond to "+35 degrees", "+25 degrees", "−35 degrees", and "−25 degrees".

In S4-3, reference angles of the smartphone 1, and dead zones around the reference angles in the yz plane around the x axis are set. The reference angles and the dead zones are set as, for example, "reference angle: −30 degrees, dead zone: −25 degrees (shaking back) to −35 degrees (shaking out)" and "reference angle: +30 degrees, dead zone: +25 degrees (shaking back) to +35 degrees (shaking out)". Then, in S4-4, coordinate values corresponding to the upper limit angles and lower limit angles of the dead zones are calculated, and set as the threshold values s3in, s3out, s4in, and s4out. In this case, s3in, s3out, s4in, and s4out respectively correspond to "+35 degrees", "+25 degrees", "−35 degrees", and "−25 degrees".

Figure 17:
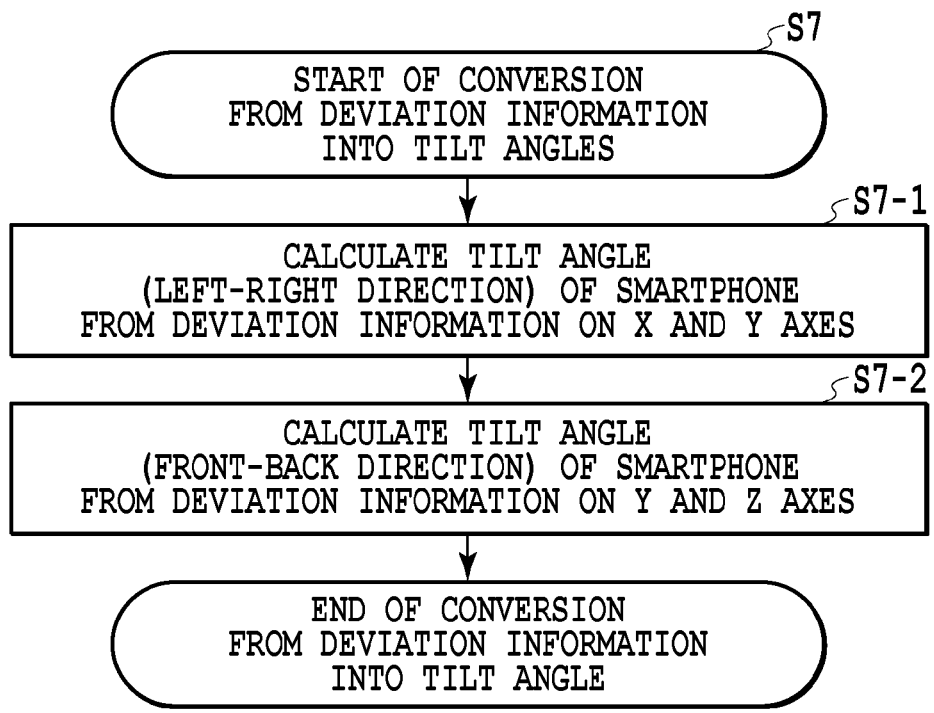
FIG. 17 is a processing flowchart of the smartphone in the embodiment.

FIG. 17 is a flowchart illustrating a subroutine for the conversion from the deviation value and the like into the tilt angles (S7) in the overall flowchart of FIG. 14. In S7-1, from deviation value on the x and y axes outputted from the acceleration sensor 111, a tilt angle (left-right direction) of the smartphone is calculated. Similarly, in S7-2, from deviation value on the y and z axes outputted from the acceleration sensor 111 of the motion detecting unit 110, a tilt angle (front-back direction) of the smartphone is calculated. From the above processes, the tilt angles of the smartphone in the left-right and front-back directions are calculated.

Figure 18:
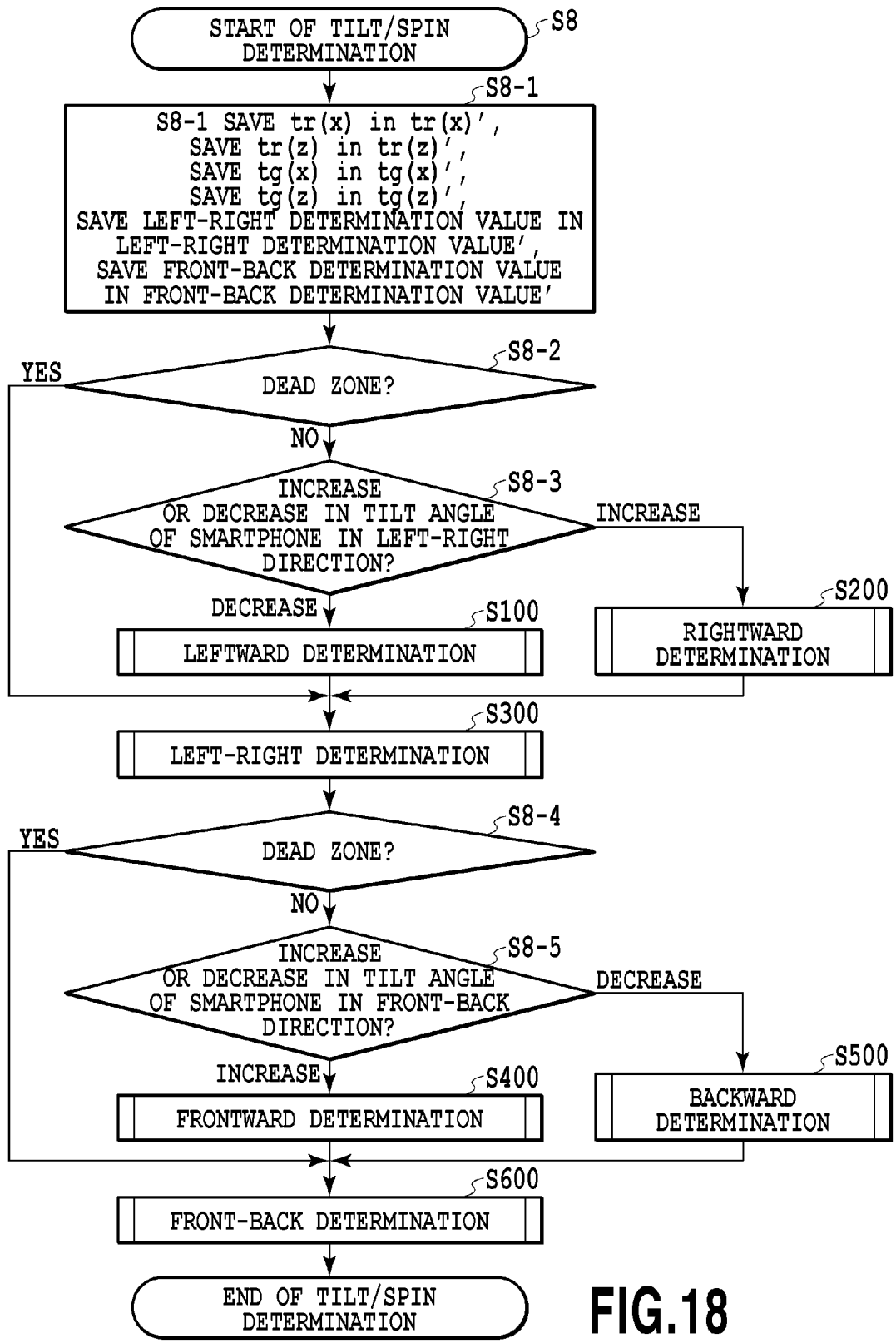
FIG. 18 is a processing flowchart of the smartphone in the embodiment.

FIG. 18 is a flowchart illustrating a subroutine for the tilt/spin determination (S8) in the overall flowchart of FIG. 14. In S8-1, a process to save pieces of information on the respective signals and pieces of information on the determination values in corresponding areas of the data storage unit 124 of the smartphone 1 is performed. Specifically, a process to save tr(x), tr(z), tg(x), tg(z), a left-right determination value, and a front-back determination value in tr(x)', tr(z)', tg(x)', tg(z)', a left-right determination value', and a front-back determination value', respectively, is performed.

In S8-2, it is determined whether or not to meet any of the dead zones set in S4. Here, it is determined whether or not shaking out and shaking in of the smartphone 1 in the left-right direction respectively meet tilt angles set within any of the dead zones. When it is determined yes in S8-2 (S8-2:Yes), the processing flow proceeds to a left-right determination process (S300). When it is determined no (S8-2: No), an increase or decrease in tilt angle of the smartphone in the left-right direction is determined (S8-3). When the tilt angle of the smartphone decreases, (S8-3: decrease), the tilt angle (e.g., leftward shaking out) of the smartphone is detected, and the processing flow proceeds to S100. Leftward determination (S100) is a process that in the case where a gesture of tilting the smartphone leftward a predetermined angle or more is detected, outputs a left-right determination value. On the other hand, when the tilt angle of the smartphone increases (S8-3: increase), the tilt angle (e.g., rightward shaking out) of the smartphone is detected, and the processing flow proceeds to S200. Rightward determination (S200) is a process that in the case where a gesture of tilting the smartphone rightward a predetermined angle or more is detected, outputs a left-right determination value. After that, in S300, left-right determination is performed. The left-right determination (S300) is a process that determines a gesture in the x direction on the basis of the left-right determination values of the smartphone illustrated in FIG. 12.

In S8-4, it is determined whether or not to meet any of the dead zones set in S4. Here, it is determined whether or not shaking out and shaking in of the smartphone 1 in the front-back direction respectively meet tilt angles set within any of the dead zones. When it is determined yes in S8-4 (S8-4:Yes), the processing flow proceeds to a front-back determination process (S600). When it is determined no (S8-4: No), an increase or decrease in tilt angle of the smartphone in the front-back direction is determined (S8-5). When the tilt angle of the smartphone increases, (S8-5: increase), the tilt angle (e.g., frontward shaking out) of the smartphone is detected, and the processing flow proceeds to S400. Frontward determination (S400) is a process that in the case where a gesture of tilting the smartphone frontward a predetermined angle or more is detected, outputs a front-back determination value. On the other hand, when the tilt angle of the smartphone decreases (S8-5: decrease), the tilt angle (e.g., backward shaking out) of the smartphone is detected, and the processing flow proceeds to S500. Backward determination (S500) is a process that in the case where a gesture of tilting the smartphone backward a predetermined angle or more is detected, outputs a front-back determination value. After that, in S600, front-back determination is performed. The front-back determination (S600) is a process that determines a gesture in the z direction on the basis of the left-right determination values of the smartphone illustrated in FIG. 12.

Figure 19:
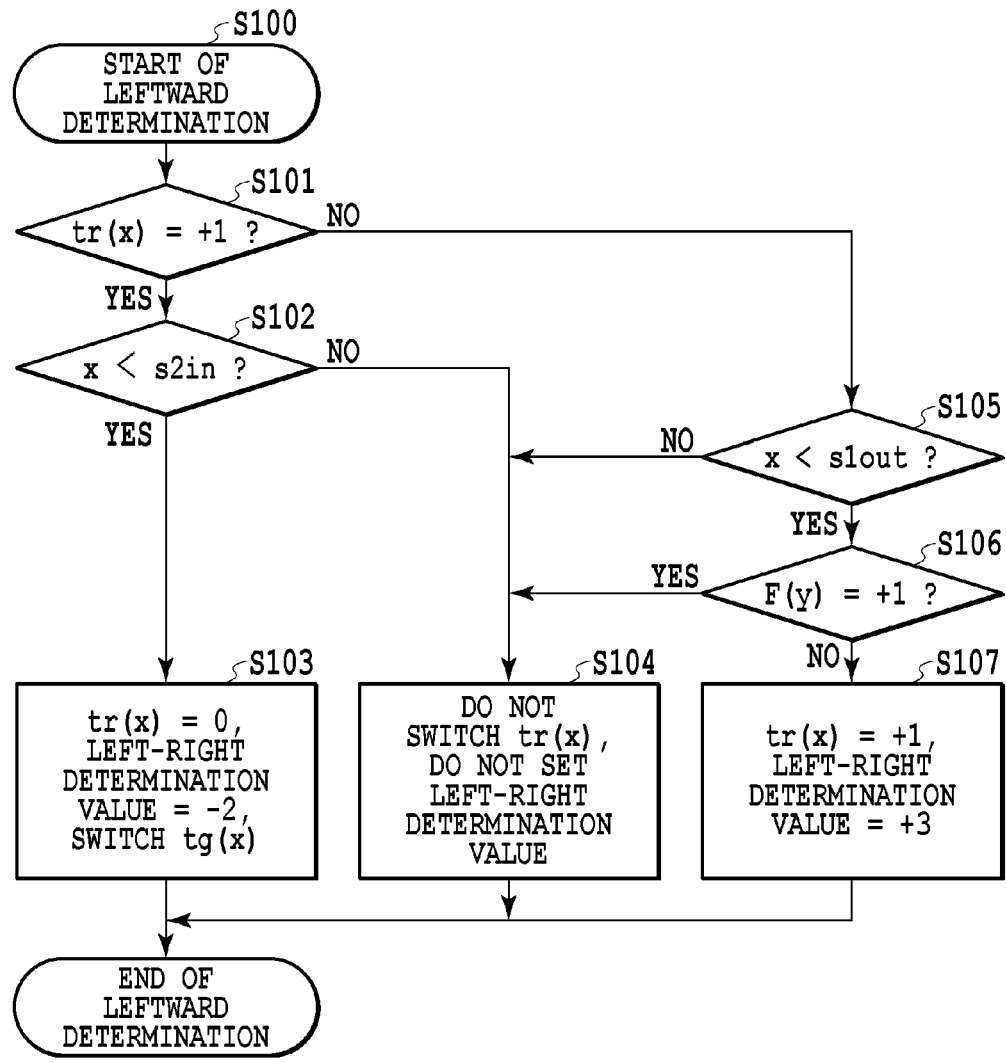
FIG. 19 is a processing flowchart of the smartphone in the embodiment.

FIG. 19 is a flowchart illustrating a subroutine for the leftward determination (S100) in the tilt/spin flowchart of FIG. 18. In S101, it is determined whether or not tr(x) is +1. When tr(x) is +1 (S101: Yes), it is determined whether or not coordinate information x on the x axis falls below the threshold value s2in (S102). That is, in S102, it is determined whether or not the smartphone 1 is shaken leftward a predetermined angle in the xy plane around the z axis. When it is determined that x falls below the threshold value s2in (S102: Yes), a process to set the value of tr(x) to "0" and the left-right determination value to "−2" is performed, and further a process to switch the value (0 or 1) of tg(x) is performed (S103).

On the other hand, when tr(x) is not +1 (S101: No), it is determined whether or not the coordinate information x on the x axis falls below the threshold value s1out (S105). That is, in S105, it is determined whether or not the smartphone 1 is shaken back leftward a predetermined angle in the xy plane around the z axis. When it is determined that x falls below the threshold value s1out (S105: Yes), the processing flow proceeds to S106. In S106, it is determined whether or not F(y) is +1. That is, in S106, it is determined whether or not the smartphone 1 is tilted with respect to the y axis, exceeding the predetermined angle (e.g., tilted 90 degrees rightward from the basic posture in the xy plane around the z axis). When F(y) is not +1 (S106: No), a process to set the value of tr(x) to "+1" and the left-right determination value to "+3" is performed (S107).

On the other hand, when it is determined that x exceeds the threshold value s2in (S102: No), when it is determined that x exceeds the threshold value s1out (S105: No), or when F(y) is +1 (S106: Yes), the processing flow proceeds to S104. In S104, the value of tr(x) is not switched, and the left-right determination value is not set as well. After the process in S103, S104, or S107 has been finished, the leftward determination (S100) is ended.

Figure 20:
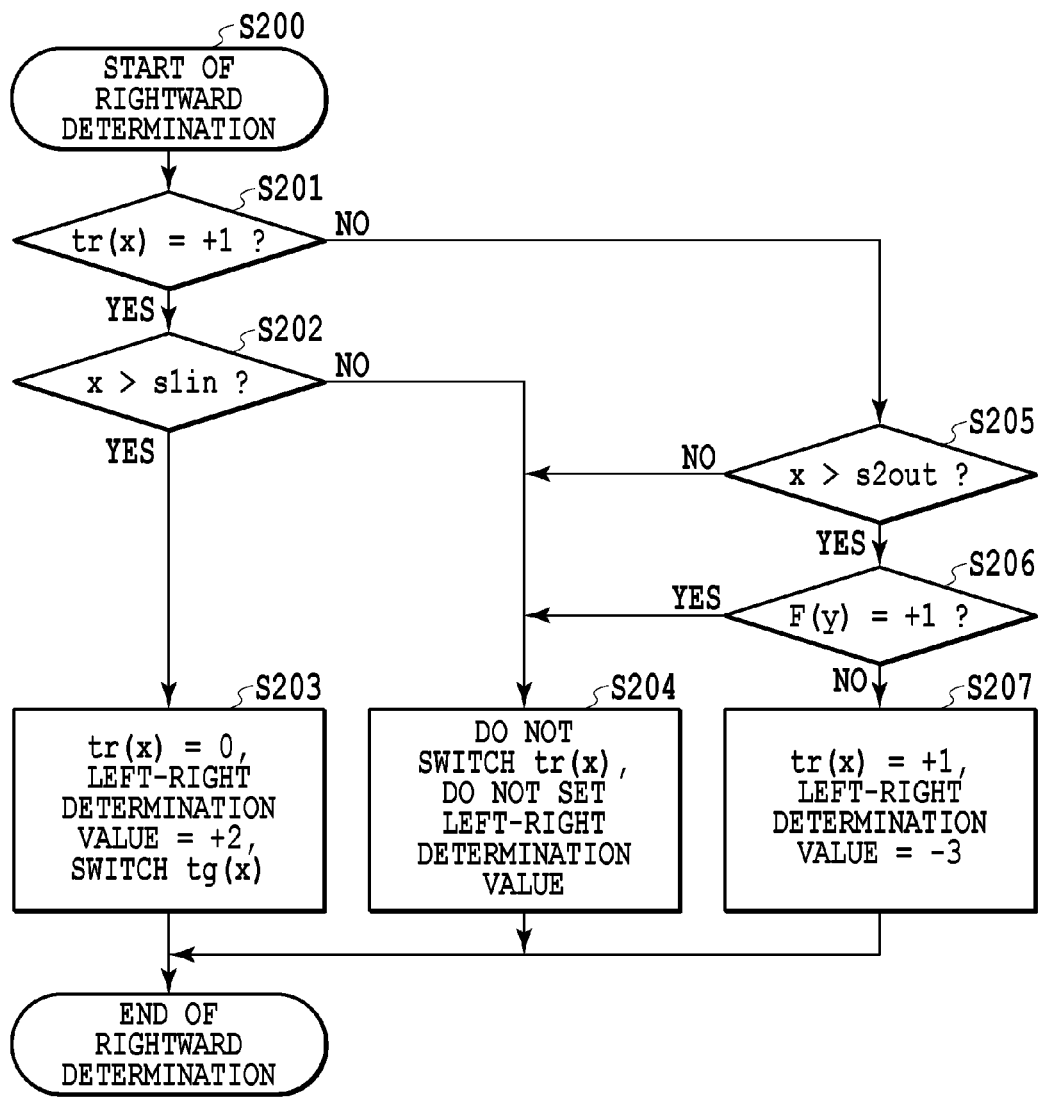
FIG. 20 is a processing flowchart of the smartphone in the embodiment.

FIG. 20 is a flowchart illustrating a subroutine for the rightward determination (S200) in the tilt/spin flowchart of FIG. 18. In S201, it is determined whether or not tr(x) is +1. When tr(x) is +1 (S201: Yes), it is determined whether or not coordinate information x on the x axis exceeds the threshold value s1in (S202). That is, in S202, it is determined whether or not the smartphone 1 is shaken rightward a predetermined angle in the xy plane around the z axis. When it is determined that x exceeds the threshold value s1in (S202: Yes), a process to set the value of tr(x) to "0" and the left-right determination value to "+2" is performed, and further a process to switch the value (0 or 1) of tg(x) is performed (S203).

On the other hand, when tr(x) is not +1 (S201: No), it is determined whether or not the coordinate information x on the x axis exceeds the threshold value s2out (S205). That is, in S205, it is determined whether or not the smartphone 1 is shaken back rightward a predetermined angle in the xy plane around the z axis. When it is determined that x exceeds the threshold value s2out (S205: Yes), the processing flow proceeds to S206. In S206, it is determined whether or not F(y) is +1. That is, in S206, it is determined whether or not the smartphone is tilted with respect to the y axis, exceeding the predetermined angle (e.g., tilted 90 degrees leftward from the basic posture in the xy plane around the z axis). When F(y) is not +1, (S206: No), a process to set the value of tr(x) to "+1" and the left-right determination value to "−3" is performed (S207).

On the other hand, when it is determined that x falls below the threshold value s1in (S202: No), when it is determined that x falls below the threshold value s2out (S205: No), or when F(y)=+1 (S206: Yes), the processing flow proceeds to S204. In S204, the value of tr(x) is not switched, and the left-right determination value is not set as well. After the process in S203, S204, or S207 has been finished, the rightward determination (S200) is ended.

Figure 21:
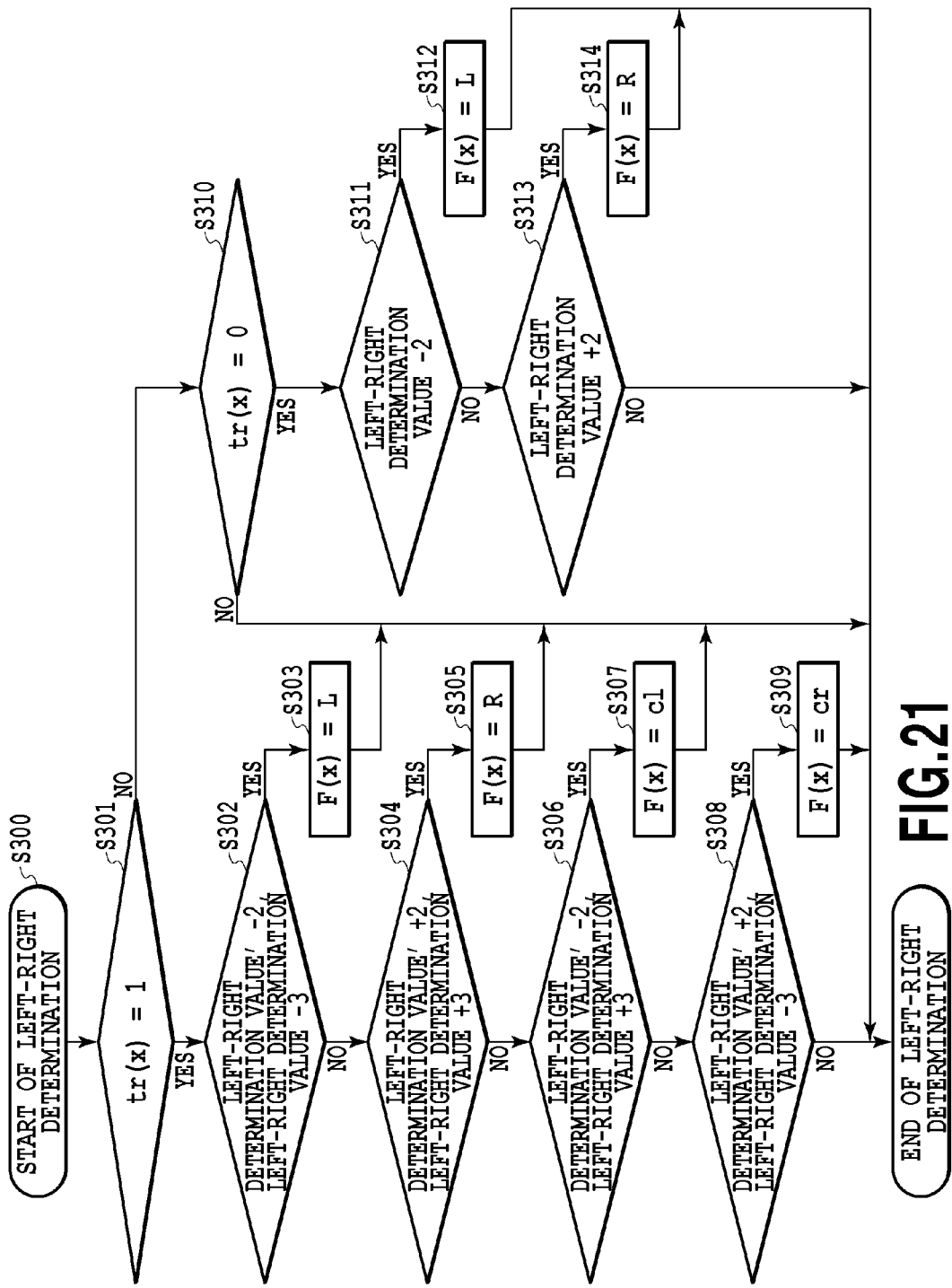
FIG. 21 is a processing flowchart of the smartphone in the embodiment.

FIG. 21 is a flowchart illustrating a subroutine for the left-right determination (S300) in the tilt/spin flowchart of FIG. 18. In S301, it is determined whether or not tr(x) is +1. When it is determined that tr(x) is +1 (S301: Yes), the left-right determination value' and the left-right determination value are specified (S302, S304, S306, S308). In S302, when the left-right determination value' is "−2" and the left-right determination value is "−3", the output of F(x) is "L" (S303). In S304, when the left-right determination value' is "+2" and the left-right determination value is "+3", the output of F(x) is "R" (S305). In S306, when the left-right determination value' is "−2" and the left-right determination value is "+3", the output of F(x) is "cl" (S307). In S308, when the left-right determination value' is "+2" and the left-right determination value is "−3", the output of F(x) is "cr" (S309).

On the other hand, in S301, when it is determined that tr(x) is not +1 (S301: No), the processing flow proceeds to S310. In S310, it is determined whether or not tr(x) is 0. When it is determined that tr(x) is 0 (S310: Yes), the left-right determination value is specified (S311, S313). In S311, when the left-right determination value is "−2", the output of F(x) is "L" (S312). In S313, when the left-right determination value is "+2", the output of F(x) is "R" (S314). On the other hand, in S310, when it is determined that tr(x) is not 0 (S310: No), in the same manner as that after the end of the F(x) process (S303, S305, S307, S309, S312, S314), the left-right determination (S300) is ended.

Figure 22:
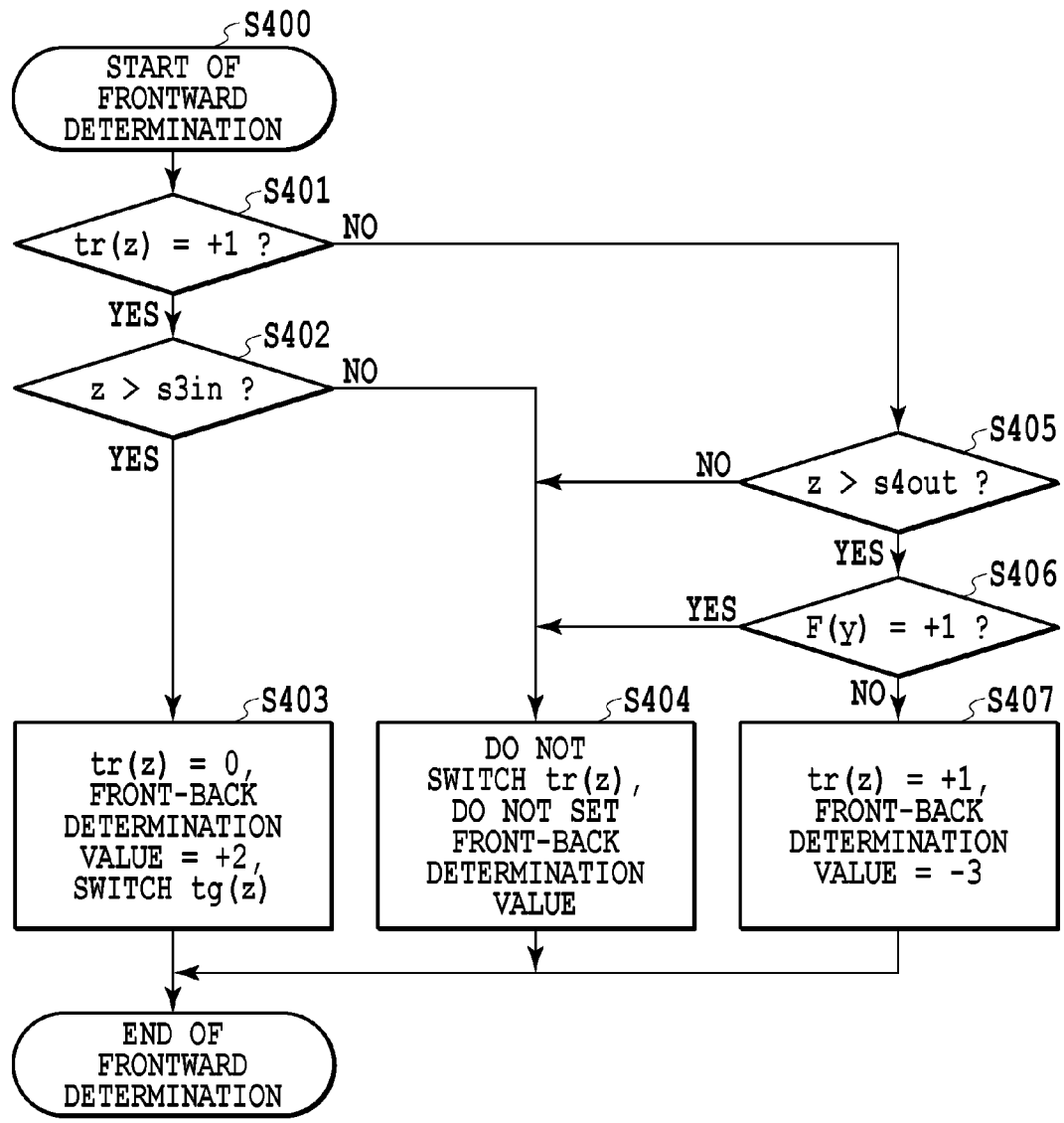
FIG. 22 is a processing flowchart of the smartphone in the embodiment.

FIG. 22 is a flowchart illustrating a subroutine for the frontward determination (S400) in the tilt/spin flowchart of FIG. 18. In S401, it is determined whether or not tr(z) is +1. When tr(z) is +1 (S401: Yes), it is determined whether or not coordinate information z on the z axis exceeds the threshold value s3in (S402). That is, in S402, it is determined whether or not the smartphone 1 is shaken frontward a predetermined angle in the yz plane around the x axis. When it is determined that z exceeds the threshold value s3in (S402: Yes), a process to set the value of tr(z) to "0", and the front-back determination value to "+2" is performed, and further a process to switch the value (0 or 1) of tg(z) is performed (S403).

On the other hand, when tr(z) is not +1 (S401: No), it is determined whether or not the coordinate information z on the z axis exceeds the threshold value s4out (S405). That is, in S405, it is determined whether or not the smartphone 1 is shaken back frontward a predetermined angle in the yz plane around the x axis. When it is determined that z exceeds the threshold value s4out (S405: Yes), the processing flow proceeds to S406. In S406, it is determined whether or not F(y) is +1. That is, in S406, it is determined whether or not the smartphone 1 is tilted with respect to the y axis, exceeding the predetermined angle (e.g., tilted 90 degrees backward from the basic posture in the yz plane around the x axis). When F(y) is not +1 (S406: No), a process to set the value of tr(z) to "+1" and the front-back determination value to "−3" is performed (S407).

On the other hand, when it is determined that z falls below the threshold value s3in (S402: No), when it is determined that z falls below the threshold value s4out (S405: No), or when F(y) is +1 (S406: Yes), the processing flow proceeds to S404. In S404, the value of tr(z) is not switched, and the front-back determination value is not set as well. After the process in S403, S404, or S407 has been finished, the frontward determination (S400) is ended.

Figure 23:
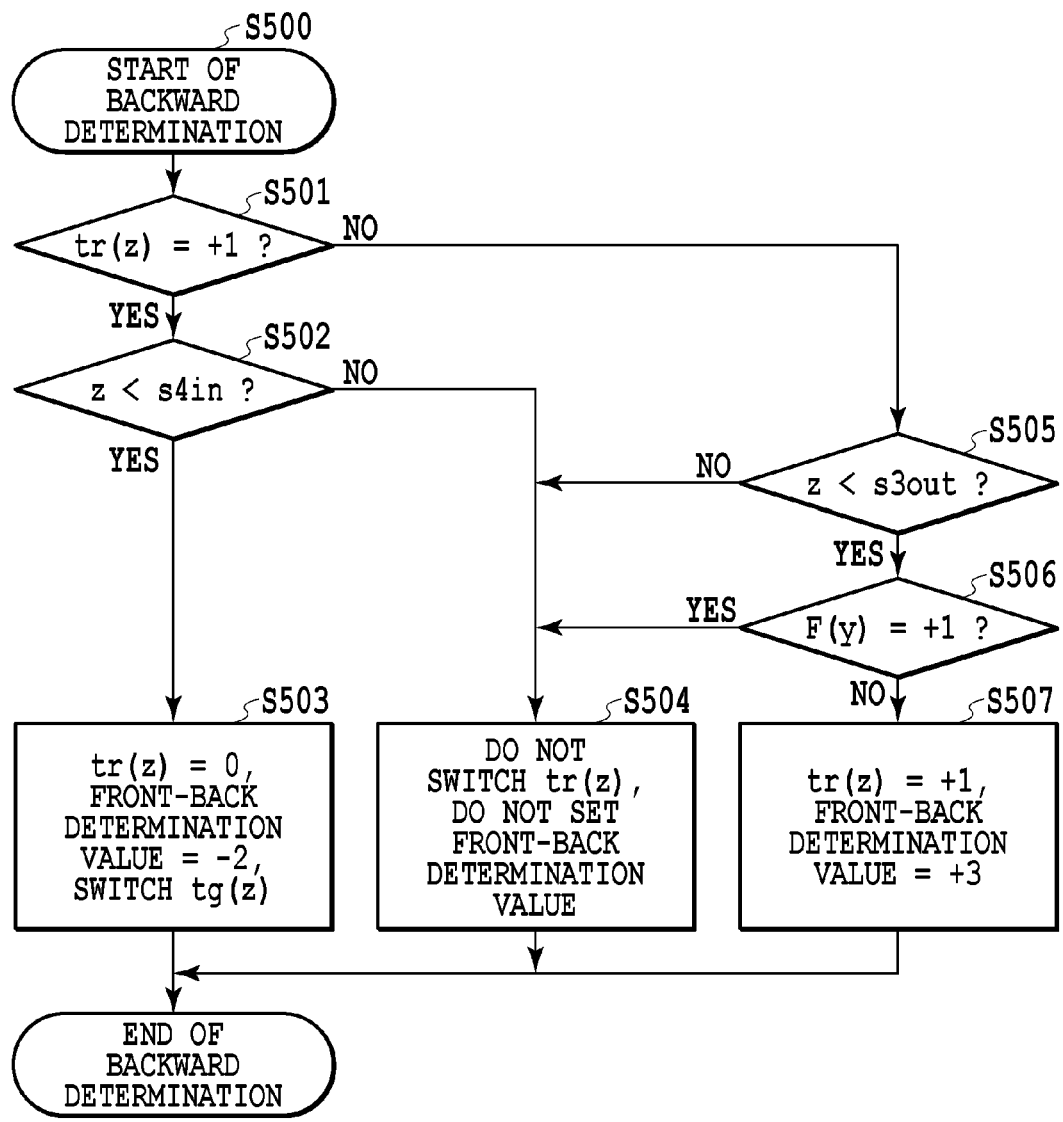
FIG. 23 is a processing flowchart of the smartphone in the embodiment.

FIG. 23 is a flowchart illustrating a subroutine for the backward determination (S500) in the tilt/spin flowchart of FIG. 18. In S501, it is determined whether or not tr(z) is +1. When tr(z) is +1 (S501: Yes), it is determined whether or not coordinate information z on the z axis falls below the threshold value s4in (S502). That is, in S502, it is determined whether or not the smartphone 1 is shaken backward a predetermined angle in the yz plane around the x axis. When it is determined that z falls below the threshold value s4in (S502: Yes), a process to set the value of tr(z) to "0", and the front-back determination value to "−2" is performed, and further a process to switch the value (0 or 1) of tg(z) is performed (S503). On the other hand, when tr(z) is not +1 (S501: No), it is determined whether or not the coordinate information z on the z axis falls below the threshold value s3out (S505). That is, in S505, it is determined whether or not the smartphone 1 is shaken back backward a predetermined angle in the yz plane around the x axis. When it is determined that z falls below the threshold value s3out (S505: Yes), the processing flow proceeds to S506. In S506, it is determined whether or not F(y) is +1. That is, in S506, it is determined whether or not the smartphone 1 is tilted with respect to the y axis, exceeding the predetermined angle (e.g., tilted 90 degrees frontward from the basic posture in the yz plane around the x axis). When F(y) is not +1, (S506: No), a process to set the value of tr(z) to "+1" and the front-back determination value to "+3" is performed (S507).

On the other hand, when it is determined that z exceeds the threshold value s4in (S502: No), when it is determined that z exceeds the threshold value s3out (S505: No), or when F(y)=+1 (S506: Yes), the processing flow proceeds to S504. In S504, the value of tr(z) is not switched, and the front-back determination value is not set as well. After the process in S503, S504, or S507 has been finished, the backward determination (S500) is ended.

Figure 24:
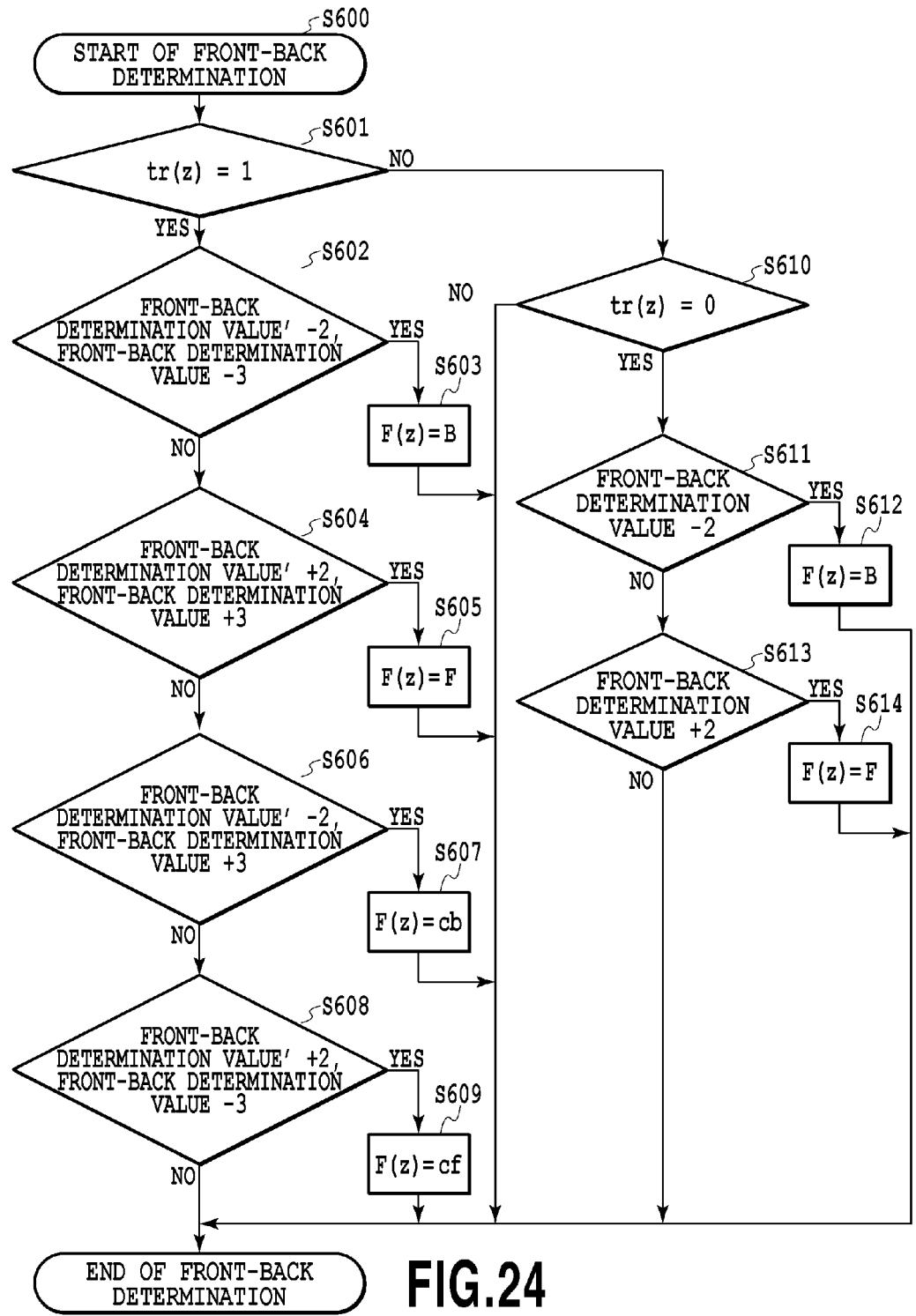
FIG. 24 is a processing flowchart of the smartphone in the embodiment.

FIG. 24 is a flowchart illustrating a subroutine for the front-back determination (S600) in the tilt/spin flowchart of FIG. 18. In S601, it is determined whether or not tr(z) is +1. When it is determined that tr(z) is +1 (S601: Yes), the front-back determination value' and the front-back determination value are specified (S602, S604, S606, S608). In S602, when the front-back determination value' is "−2" and the front-back determination value is "−3", the output of F(z) is "B" (S603). In S604, when the front-back determination value' is "+2" and the front-back determination value is "+3", the output of F(z) is "F" (S605). In S606, when the front-back determination value' is "−2" and the front-back determination value is "+3", the output of F(z) is "cb" (S607). In S608, when the front-back determination value' is "+2" and the front-back determination value is "−3", the output of F(z) is "cf" (S609).

On the other hand, in S601, when it is determined that tr(z) is not +1 (S601: No), the processing flow proceeds to S610. In S610, it is determined whether or not tr(z) is 0. When it is determined that tr(z) is 0 (S610: Yes), the front-back determination value is specified (S611, S613). In S611, when the front-back determination value is "−2", the output of F(z) is "B" (S612). In S613, when the front-back determination value is "+2", the output of F(z) is "F" (S614). On the other hand, in S610, when it is determined that tr(z) is not 0 (S610: No), in the same manner as that after the end of the F(z) process (S603, S605, S607, S609, S612, S614), the front-back determination (S600) is ended.

Figure 25:
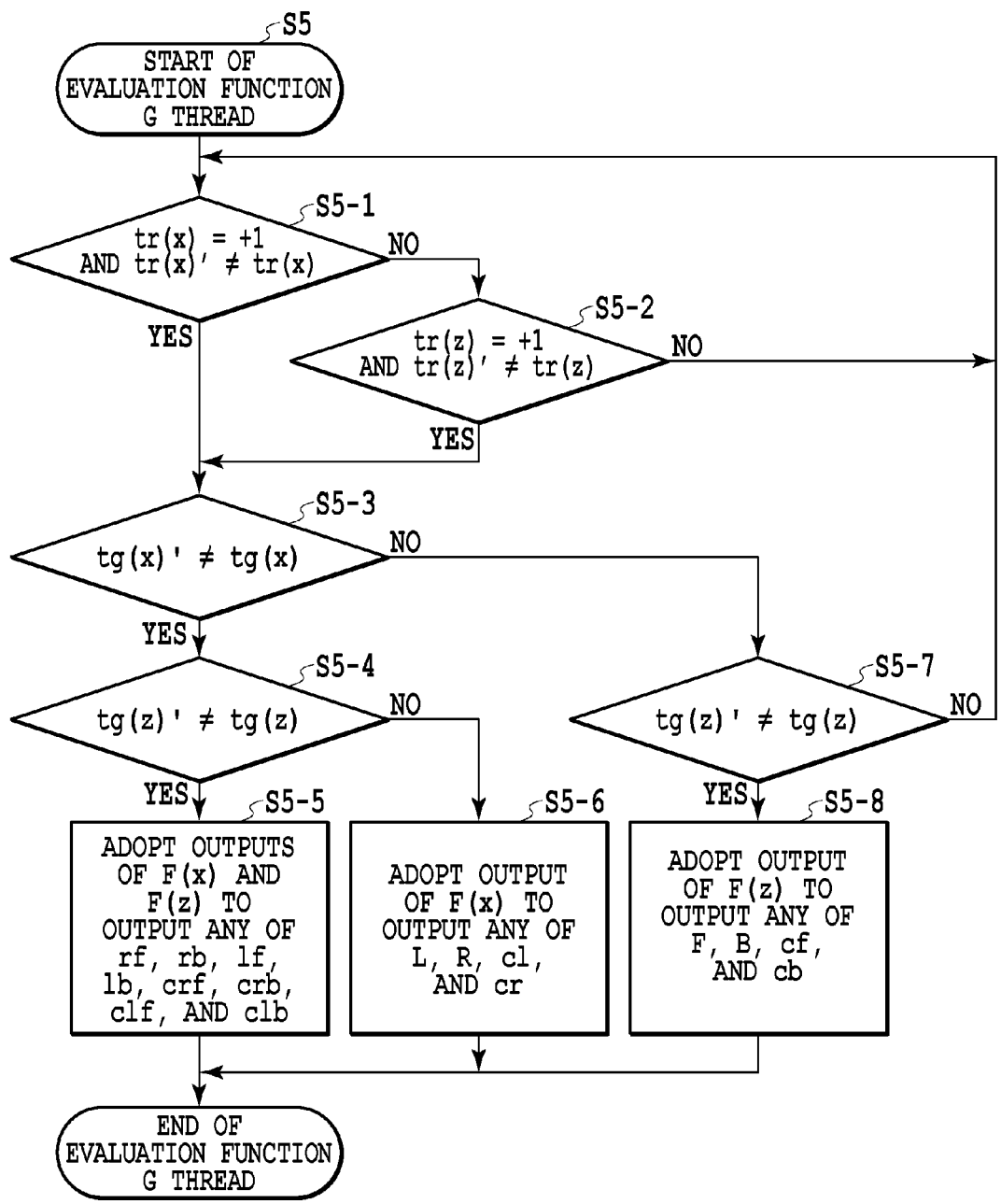
FIG. 25 is a processing flowchart of the smartphone in the embodiment.

FIG. 25 is a flowchart illustrating a process by the gesture evaluation function G thread in the overall flowchart of FIG. 14. In S5-1, it is determined whether or not tr(x) is +1, and tr(x)' is not equal to tr(x), i.e., tr(x) is changed. When it is determined that tr(x) is +1 and tr(x) is changed (S5-1: Yes), the processing flow proceeds to S5-3. On the other hand, in S5-1, when it is determined no (S5-1: No), it is determined whether or not tr(z) is +1, and tr(z)' is not equal to tr(z), i.e., tr(z) is changed (S5-2). When it is determined that tr(z) is +1 and tr(z) is changed (S5-2: Yes), the processing flow proceeds to S5-3. On the other hand, in S5-2, when it is determined no (S5-2: No), the processing flow returns to the process in S5-1 again.

Then, in S5-3, it is determined whether or not tg(x)' is not equal to tg(x), i.e., tg(x) is changed. When it is determined tg(x)' is different from tg(x) (S5-3: Yes), it is further determined whether or not tg(z)' and tg(z) are changed (S5-4). When it is determined that tg(z)' is different from tg(z) (S5-4: Yes), the outputs of F(x) and F(z) are adopted to output any of rf, rb, lf, lb, crf, crb, clf, and clb (S5-5). On the other hand, in S5-4, when it is determined that tg(z)' is equal to tg(z) (S5-4: No), the output of F(x) is adopted to output any of L, R, cl, and cr (S5-6).

Also, in S5-3, when it is determined that tg(x)' is equal to tg(x) (S5-3: No), it is further determined whether or not tg(z)' and tg(z) are changed (S5-7). When it is determined that tg(z)' is different from tg(z) (S5-7: Yes), the output of F(z) is adopted to output any of F, B, cf, and cb (S5-8). On the other hand, in S5-7, when it is determined no (S5-7: No), the processing flow returns to the process in S5-1 again. As described above, in the gesture evaluation function G thread, a process to output a gesture determination value is performed. When the smartphone 1 detects a gesture mode such as the "rightward shake gesture", the smartphone 1 detects the gesture mode by performing a process to refer to the table illustrated in FIG. 12. That is, in the case where "R" is outputted as a gesture determination value, by referring to the table illustrated in FIG. 12, the "rightward shake gesture" as a gesture mode can be detected. In S5-5, 5-6, or 5-8, when the gesture determination value is outputted, the gesture evaluation function G thread is ended.

As has been described above, the smartphone in the present embodiment can detect a gesture in space by a user to perform an input process or the like on the basis of the detected gesture in space.

Second Embodiment

In a second embodiment, a gesture detecting device is described which is characterized by storing gesture determination values in a data storage unit 124, and recognizing the stored gesture determination values as a time series combination. As an example of application of the gesture detecting device in the present embodiment, an authentication process is described.

Figure 26:
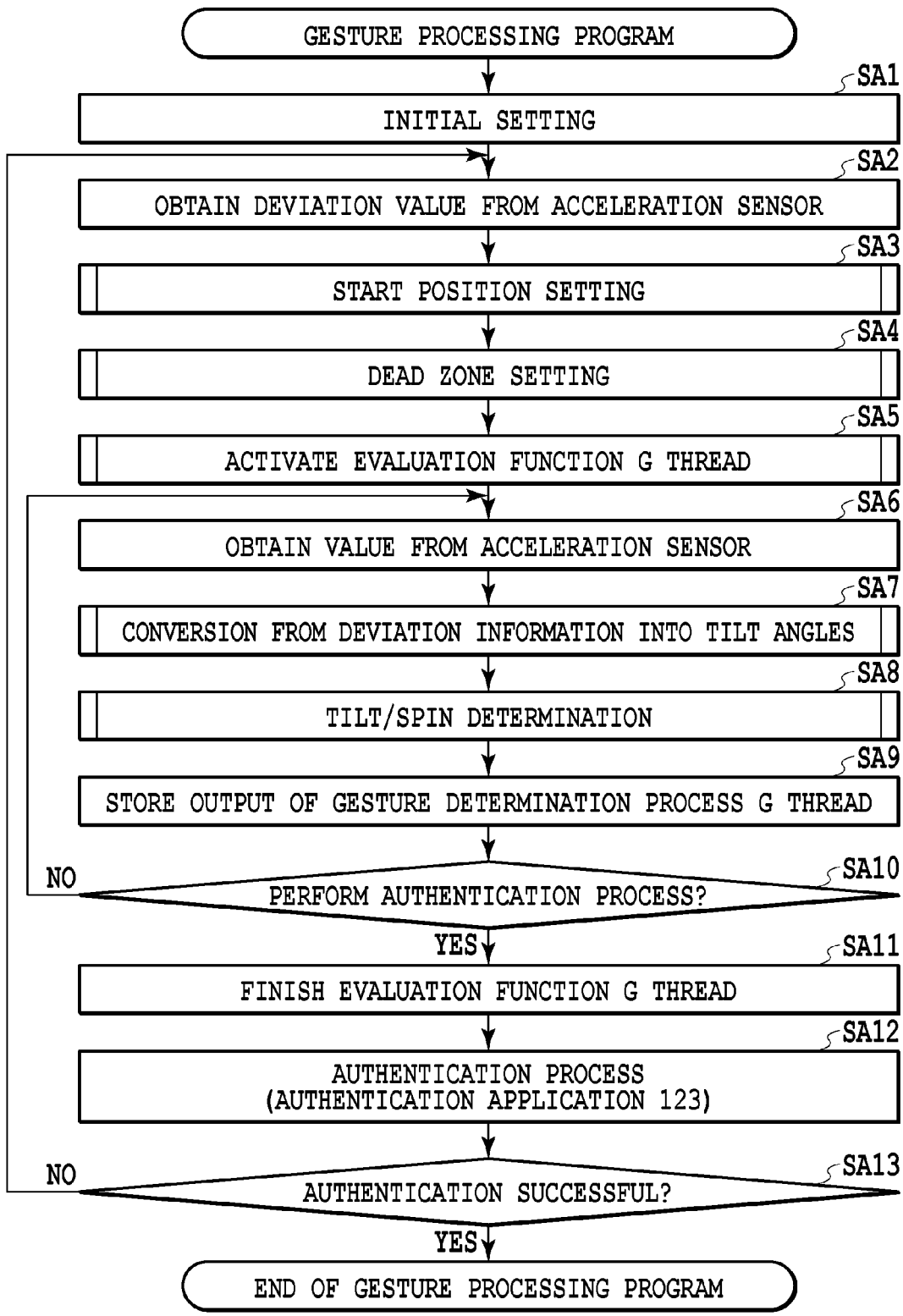
FIG. 26 is a processing flowchart of a smartphone in a second embodiment.

FIG. 26 is a processing flowchart of a gesture processing program 122 and authentication application 123 of a smartphone 1 in the second embodiment of the present invention. In the following, the description is given with reference to FIG. 26; however, parts redundant with those in FIG. 14 are omitted to give the description, and it is assumed that in each subroutine to be referred to, the same process as that in the first embodiment is performed.

In SA5, the gesture evaluation function G thread is activated, and then deviation value and the like are obtained from the acceleration sensor and the like (SA6) to perform the process to convert the deviation value and the like to the tilt angles (SA7). Then, after the end of the tile/spin determination (SA8) process, the processor 100 of the smartphone 1 stores an output from the gesture evaluation function G thread in the data storage unit 124 (SA9).

In SA10, a process to determine whether or not to perform the authentication process is performed (SA10). The process to determine whether or not to perform the authentication process may be performed by pressing down a below-described authentication button 2701 in FIG. 27, or may be automatically performed when the number of gesture determination values reaches a predetermined number.

In SA10, when it is determined that the authentication process is performed (SA10: Yes), the processor of the smartphone 1 finishes the gesture evaluation function G thread (SA11), and performs the authentication process (SA12). On the other hand, in SA10, when it is determined that the authentication process is not performed (SA10: No), the processing flow returns to the process in SA6 again.

In SA13, when the authentication process is successful (SA13: yes), the authentication application in the present embodiment is ended. On the other hand, in SA13, when the authentication process is unsuccessful (SA13: No), the processing flow returns to the process in SA2 again.

In the process by the gesture processing program 122 in the second embodiment, gesture determination values are stored in the data storage unit 124, and the stored gesture determination values are recognized as a time series combination. For this reason, gesture determination values are stored in time series, and a combination of the stored output values can be used for the authentication process.

FIG. 27 is a diagram illustrating an example of screen transition during the authentication process in the second embodiment of the present invention. When the gesture processing program 122 and authentication application 123 are started, the authentication button 2701 and re-input button 2702 are displayed in substantially the center of the touch screen display 130. At the same time, A, B, C, D, E, F, G, and H respectively corresponding to the eight shake gesture directions of the smartphone 1 (leftward, left-backward, backward, right-backward, rightward, right-frontward, frontward, and left-frontward) are displayed as navigators. Displaying the eight directions makes it possible for a user to recognize which direction a gesture is made in and thereby which value is outputted.

In the case where a user holds the smartphone 1 in his/her hand to make the smartphone 1 detect a series of gestures in predetermined directions while an authentication process screen in FIG. 27 (1) is being displayed, the processor 100 of the smartphone 1 performs a process to store gesture determination values in the data storage unit 124.

For example, in the case where the user holds the smartphone 1 in his/her hand to make the smartphone 1 detect a series of "leftward", "left-backward", "backward", "leftward", "backward, "leftward", and "backward" shake gestures, the processor 100 performs the process to store the gesture determination values "L", "lb", "B", "L", "B", "L", and "B" in the data storage unit 124.

FIG. 27 (2) is a diagram illustrating an example of screen display of an authentication result. In the case where as a result of the above-described gesture determination values, the output values stored in the data storage unit 124 correspond with pre-registered ID information on the user, for example, a screen indicating, for example, "authentication successful" or the like is displayed. On the other hand, in the case where as a result of the above-described output of the gesture evaluation function G, the gesture determination values stored in the data storage unit 124 do not correspond with the pre-registered ID information on the user, a screen indicating, for example, "authentication unsuccessful" or the like is displayed.

As described above, the smartphone in the present embodiment detects gestures in space by a user, and stores values determined on the basis of the detected gestures in space in the data storage unit 124. In addition, the smartphone can recognize the stored gesture determination values as a time series combination, and therefore perform a gesture-based authentication process or the like.

Third Embodiment

A third embodiment is a variation of the first and second embodiments, and in the following, a gesture detecting device is described that has a function of, at timing when a user makes the smartphone 1 detect a gesture, providing musical scale information or image information to support an input process.

Figure 28:
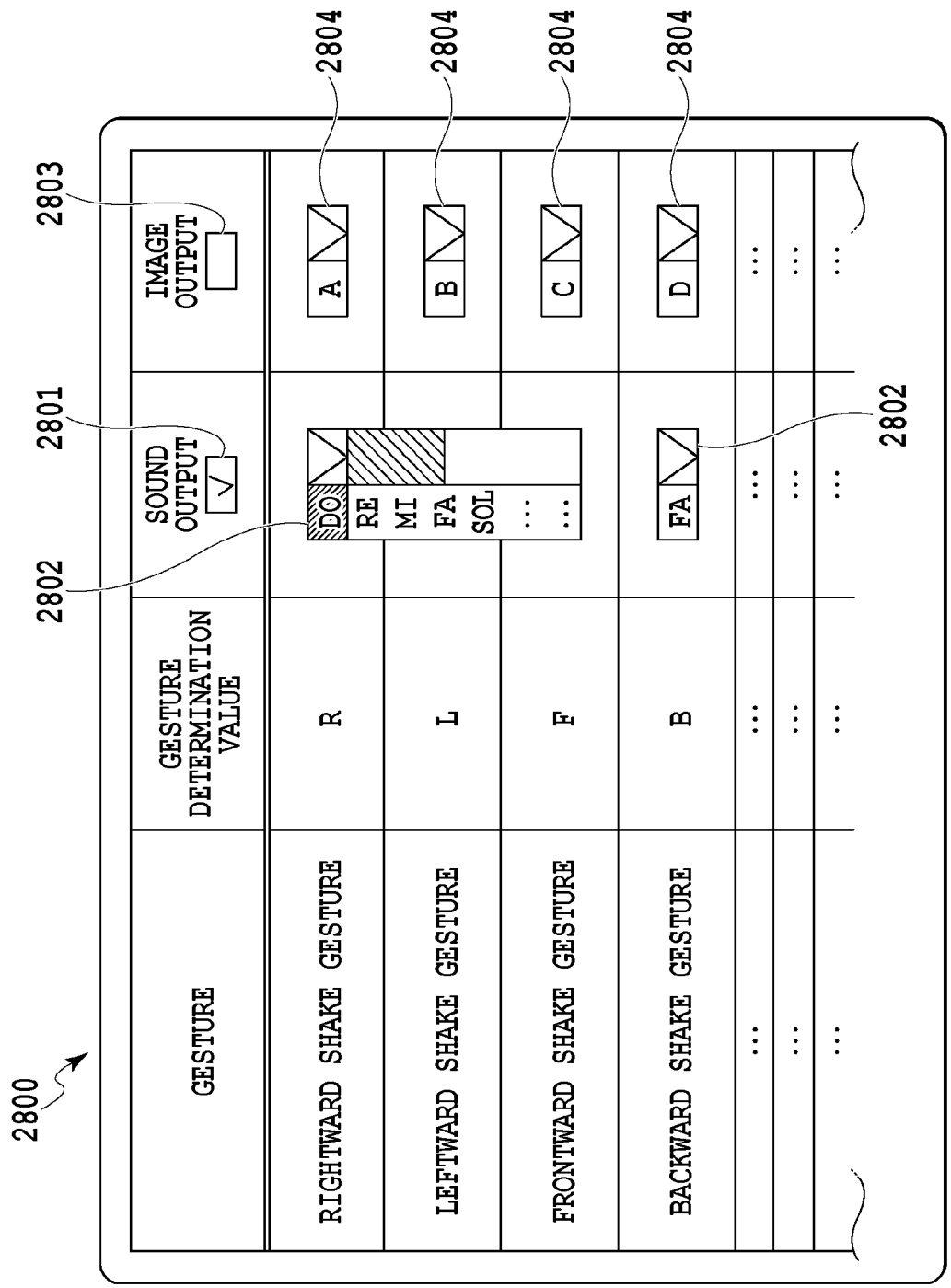
FIG. 28 is a screen display example of a smartphone in a third embodiment.

FIG. 28 is a diagram illustrating a display example of an output setting screen in this embodiment of the present invention. Output setting 2800 is displayed on the touch screen display 130. In the output setting 2800, respective items of a gesture, gesture determination value, sound output, and image output are displayed in a table format. As the gesture item, the gesture modes such as the "rightward shake gesture", "leftward shake gesture", "frontward shake gesture", and "backward shake gesture" are displayed. As the gesture determination value item, gesture determination values corresponding to the gesture modes, such as "R", "L", "F", "B" are respectively displayed.

In the vicinity of the display of the sound output, a checkbox 2801 is displayed. By selecting the checkbox 2801, a user can select the sound output that gives sound-based output at timing when the smartphone 1 outputs a gesture determination value.

In a column where sound outputs are displayed, a drop-down box 2802 is displayed in a position corresponding to each of the gesture determination values. For example, by selecting any of the sound outputs displayed in the drop-down boxes 2802, the user can perform setting to relate the predetermined sound output to a corresponding one of the gesture determination values. FIG. 28 exemplifies setting to relate the sound output "do" ("C") to the gesture determination value "R". In the present embodiment, the drop-down boxes 2802 are arranged corresponding to the respective gesture determination values.

In the vicinity of the display of the image output, a checkbox 2803 is displayed. By selecting the checkbox 2803, a user can select the image output that gives image-based output at timing when the smartphone 1 outputs a gesture determination value.

In a column where image outputs are displayed, a drop-down box 2804 is displayed in a position corresponding to each of the gesture determination values. For example, by selecting any of the image outputs displayed in the drop-down boxes 2802, a user can perform setting to relate the predetermined image output to a corresponding one of the gesture determination values. FIG. 28 exemplifies setting to relate the image output "A" to the gesture determination value "R". In the present embodiment, the drop-down boxes 2804 are arranged corresponding to the respective gesture determination values.

FIG. 29 is a diagram illustrating a correspondence table 2900 between a gesture determination value and outputs. As with FIG. 12, the gesture determination values "R", "L", "F", "B", "rf", "rb", "lf", "lb", "cr", "cl", "cf", "cb", "crf", "clf", "crb", and "crb" are stored respectively corresponding to the "rightward shake gesture", "leftward shake gesture", "frontward shake gesture", "backward shake gesture", "right-frontward shake gesture", "right-backward shake gesture", "left-frontward shake gesture", "left-backward shake gesture", "right spin gesture", "left spin gesture", "frontward spin gesture", "backward spin gesture", "right-frontward spin gesture", "left-frontward spin gesture", "right-backward spin gesture", and "left-backward spin gesture" that are the gesture modes in the present embodiment.

In the correspondence table 2900 between a gesture determination values and outputs, values of sound outputs set through the drop-down boxes 2802 in FIG. 28 are further stored. The sound outputs "do" ("C"), "re" ("D"), "mi" ("E"), "fa" ("F"), "sol" ("G") "la" ("A") "si" ("B"), "do+1" ("C+1"), "sound effect 1", "sound effect 2", "sound effect 3", "sound effect 4", "sound effect 5", "sound effect 6", "sound effect 7", and "sound effect 8" are stored respectively corresponding to the gesture determination values "R", "L", "F", "B", "rf", "rb", "lf", "lb", "cr", "cl", "cf", "cb", "crf", "crb, "clf", and "clb". Note that a sound effect may be a below-described 1-octave higher sound output.

Given that the sound output "do" ("C") corresponding to the gesture determination value "R" is a reference sound, "do+1" ("C+1") refers to a 1-octave higher sound output "do" ("C"). Also, the "sound effect 1", "sound effect 2", "sound effect 3", "sound effect 4", "sound effect 5", "sound effect 6", "sound effect 7", and "sound effect 8" are arbitrarily set sound outputs, and as the sound effects, pieces of sound data stored in the smartphone 1 may be used, or pieces of sound data set by a user may be used.

As described above, according to the settings of the correspondence table between a gesture determination value and outputs, the pieces of musical scale information "do" ("C"), "re" ("D"), "mi" ("E"), "fa" ("F"), "sol" ("G"), "la" ("A"), "si" ("B"), and "do+1" ("C+1") are set, corresponding to the respective shake gestures. In addition, at timing when the smartphone 1 outputs a gesture determination value, i.e., at timing when the smartphone 1 detects predetermined shake gesture behavior, a sound output related in the correspondence table 2700 between a gesture determination value and outputs is actually outputted through the speakers 150 of the smartphone 1.

In the correspondence table 2900 between a gesture determination value and outputs, values of the image outputs set through the drop-down boxes 2804 in FIG. 28 are further stored. The image outputs "A", "B", "C", "D", "E", "F", "G", "H", "I", "J", "K", "L", "M", "N", "O", and "P" are stored respectively corresponding to the gesture determination values "R", "L", "F", "B", "rf", "rb", "lf", "lb", "cr", "cl", "cf", "cb", "crf", "crb", "clf", and "clb".

As described above, according to the settings of the correspondence table 2900 between a gesture determination value and outputs, the pieces of image information indicating the alphabets "A", "B", "C", "D", "E", "F", "G", "H", "I", "J", "K", "L", "M", "N", "O", and "P" are set corresponding to the respective gestures. In addition, at timing when the smartphone 1 outputs a gesture determination value, an image output related in the correspondence table 2900 between a gesture determination value and outputs is actually outputted through the touch screen display 130 of the smartphone 1.

Figure 30:
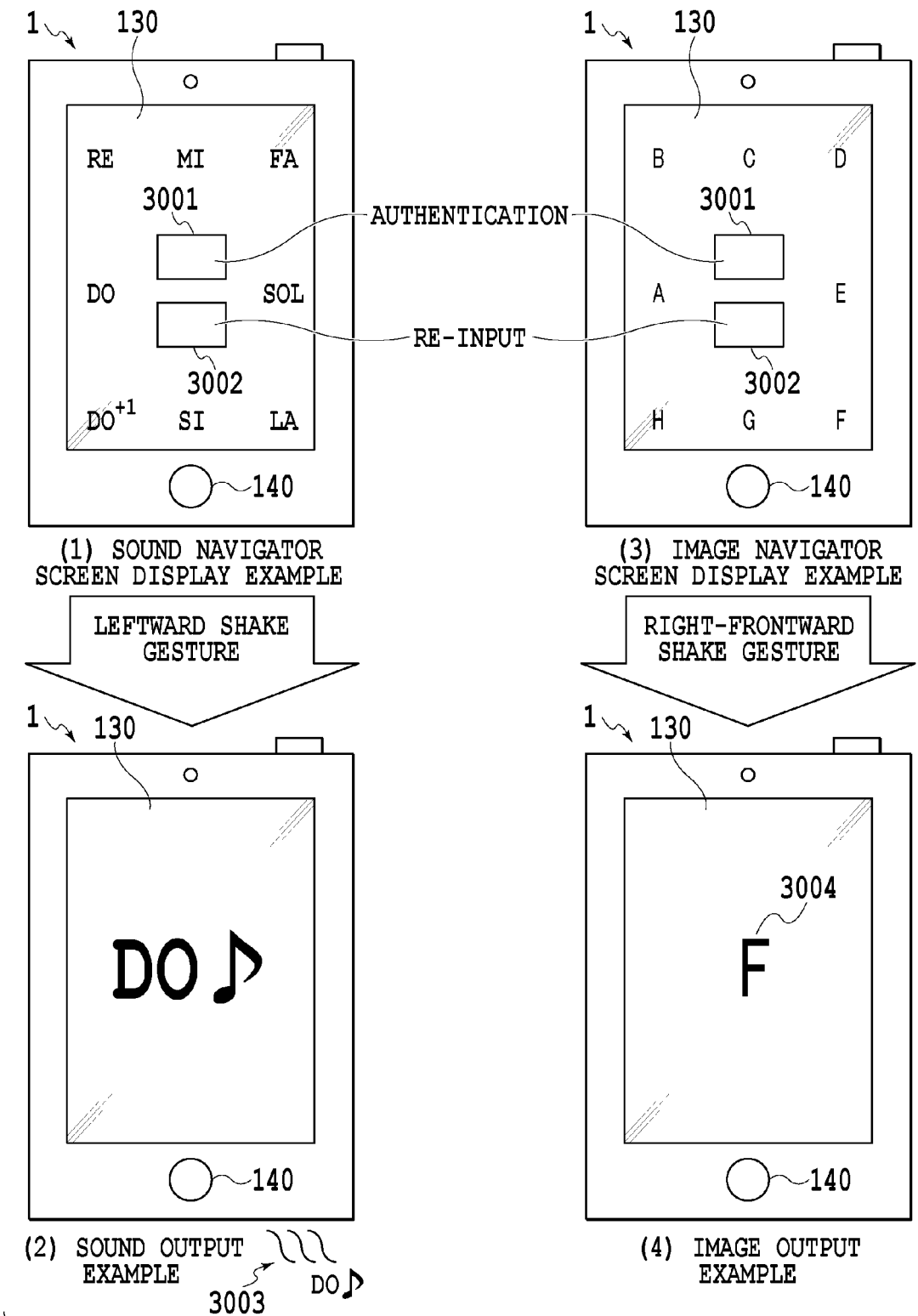
FIG. 30 is a sound/image output example of the smartphone in the third embodiment.

FIG. 30 is a diagram illustrating an example of sound and image outputs in this embodiment of the present invention. The sound or image output illustrated in FIG. 30 is outputted through the touch screen display 130 or speakers 150 of the smartphone 1 at the time of, for example, ID input for the authentication illustrated in FIG. 12 or 27. By selecting the checkbox 2801 in the output setting 2800 in FIG. 28, (1) a sound navigator screen illustrated in FIG. 30 is displayed. That is, when activating the gesture processing program 122 and authentication application 123, the processor 100 of the smartphone 1 refers to the correspondence table 2900 between a gesture determination value and outputs to display (1) the sound navigator screen on the touch screen display 130.

As illustrated in the sound navigator screen display example of FIG. 30 (1), when starting authentication, an authentication button 3001, and a re-input button 3002 are displayed in substantially the center of the touch screen display 130. At the same time, "do" ("C"), "re" ("D"), "mi" ("E"), "fa" ("F"), "sol" ("G"), "la" ("A"), "si" ("B"), and "do+1" ("C+1") are displayed in the eight shake gesture directions (leftward, left-backward, backward, right-backward, rightward, right-frontward, frontward, and left-frontward) of the smartphone 1 as navigators corresponding to the respective directions. Displaying the eight navigators makes it possible for a user to recognize which direction a shake gesture is made in and thereby which sound output is given.

For example, in the case where a user holds the smartphone 1 in his/her hand to make the smartphone 1 detect the leftward shake gesture while the sound navigator screen display example in FIG. 28 (1) is being displayed, the smartphone 1 gives a sound output 3003 illustrated in a sound output example in FIG. 30 (2). That is, in synchronization with timing when the smartphone 1 detects the leftward shake gesture, the sound "do" ("C") is outputted through the speakers 150 of the smartphone 1 as the sound output 3003. Note that the sound output example in FIG. 30 (2) exemplifies a mode of outputting an image "do" ("C") on the touch screen display 130 in synchronization with the sound output 3003; however, only the sound output 3003 may be outputted.

On the other hand, by selecting the checkbox 2803 in the output setting 2800 in FIG. 28, (3) an image navigator screen illustrated in FIG. 30 is displayed. That is, when activating the gesture processing program 122 and authentication application 123, the processor 100 of the smartphone 1 refers to the correspondence table 2900 between a gesture determination value and outputs to display (3) the image navigator screen on the touch screen display 130.

As illustrated in the image navigator screen display example in FIG. 30 (3), when starting authentication, the authentication button 3001 and re-input button 3002 are displayed in substantially the center of the touch screen display 130. At the same time, "A", "B", "C", "D", "E", "F", "G", and "H" are displayed in the eight shake gesture directions (leftward, left-backward, backward, right-backward, rightward, right-frontward, frontward, and left-frontward) of the smartphone 1 as navigators corresponding to the respective directions. Displaying the eight navigators makes it possible for a user to recognize which direction a shake gesture is made in and thereby which image output is given.

For example, in the case where a user holds the smartphone 1 in his/her hand to make the smartphone 1 detect the right-frontward shake gesture while the image navigator screen display example in FIG. 30 (3) is being displayed, the smartphone 1 gives an image output 3004 illustrated in an image output example in FIG. 30 (4). That is, in synchronization with timing when the smartphone 1 detects the right-frontward shake gesture, an alphabetical character image "F" is displayed on the touch screen display 130 of the smartphone 1 as the image output 3004.

FIG. 31 is a gesture correspondence table 3100 showing a correspondence between an input process and a sound output. In the gesture correspondence table 3100, for each of sequence numbers 1 to 7, a gesture determination value and sound output corresponding to a gesture are indicated in relation to one another. A user makes the smartphone 1 detect a series of gestures corresponding to the sequence numbers 1 to 7, and thereby gesture determination values can be stored in the data storage unit 124 as a time series combination.

Referring to the gesture correspondence table 3100, when detecting the leftward shake gesture corresponding to the sequence number 1, the smartphone 1 outputs "do" ("C") through the speakers 150 as a sound output corresponding to the gesture determination value "L". When detecting the leftbackward shake gesture corresponding to the sequence number 2, the smartphone 1 outputs "re" ("D") through the speakers 150 as a sound output corresponding to the gesture determination value "lb". When detecting the backward shake gesture corresponding to the sequence number 3, the smartphone 1 outputs "mi" ("E") through the speakers 150 as a sound output corresponding to the gesture determination value "B". When detecting the leftward shake gesture corresponding to the sequence number 4, the smartphone 1 outputs "do" ("C") through the speakers 150 as a sound output corresponding to the gesture determination value "L". When detecting the backward shake gesture corresponding to the sequence number 5, the smartphone 1 outputs "mi" ("E") through the speakers 150 as a sound output corresponding to the gesture determination value "B". When detecting the leftward shake gesture corresponding to the sequence number 6, the smartphone 1 outputs "do" ("C") through the speakers 150 as a sound output corresponding to the gesture determination value "L". When detecting the backward shake gesture corresponding to the sequence number 7, the smartphone 1 outputs "mi" through the speakers 150 as a sound output corresponding to the gesture determination value "B".

When a user makes the series of gestures corresponding to the sequence numbers 1 to 7, the series of sound outputs "do" ("C"), "re" ("D"), "mi" ("E"), "do" ("C"), "mi" ("E"), "do" ("C"), and "mi" ("E") is given through the speakers 150. The user makes the series of gestures at preferred time intervals to give the sound outputs corresponding to a melody of "Do-Re-Mi" ("C-D-E"), and thereby the sound outputs can be given as if a musical performance is given with a musical instrument.

As described, by setting sound outputs corresponding to gesture modes to give the sound outputs corresponding to the gesture modes, respectively, for example, a user can memorize ID information for an authentication device, which includes many pieces of input information, in relation to a melody.

FIG. 32 is a gesture correspondence table 3200 showing a correspondence between a series of input processes and image outputs. In the gesture correspondence table 3200, for each of sequence numbers 1 to 4, a gesture determination value and image output corresponding to a gesture are indicated in relation to one another. A user makes the smartphone 1 detect the series of gestures corresponding to the sequence numbers 1 to 3, and thereby gesture determination values can be stored in the data storage unit 124 as a time series combination.

Referring to the gesture correspondence table 3200, when detecting the right-frontward shake gesture corresponding to the sequence number 1, the smartphone 1 displays "F" on the touch screen display 130 as an image output corresponding to the gesture determination value "rf". When detecting the leftward shake gesture corresponding to the sequence number 2, the smartphone 1 displays "A" on the touch screen display 130 as an image output corresponding to the gesture determination value "L". When detecting the backward shake gesture corresponding to the sequence number 3, the smartphone 1 displays "C" on the touch screen display 130 as an image output corresponding to the gesture determination value "B". When detecting the rightward shake gesture corresponding to the sequence number 4, the smartphone 1 displays "E" on the touch screen display 130 as an image output corresponding to the gesture determination value "R".

When a user makes the series of gestures corresponding to the sequence numbers 1 to 4, the series of image outputs "F", "A", "C", and "E" is displayed on the touch screen display 130 at timings when the smartphone 1 recognizes the gestures. By making the series of gestures, the user can successively display "FACE", which is an English word meaning a "face", on the touch screen display 130.

As described, by setting image outputs corresponding to gesture modes to give the image outputs corresponding to the gesture modes, respectively, for example, a user can memorize ID information for an authentication device, which includes many pieces of input information, in relation to image outputs.

Figure 33:
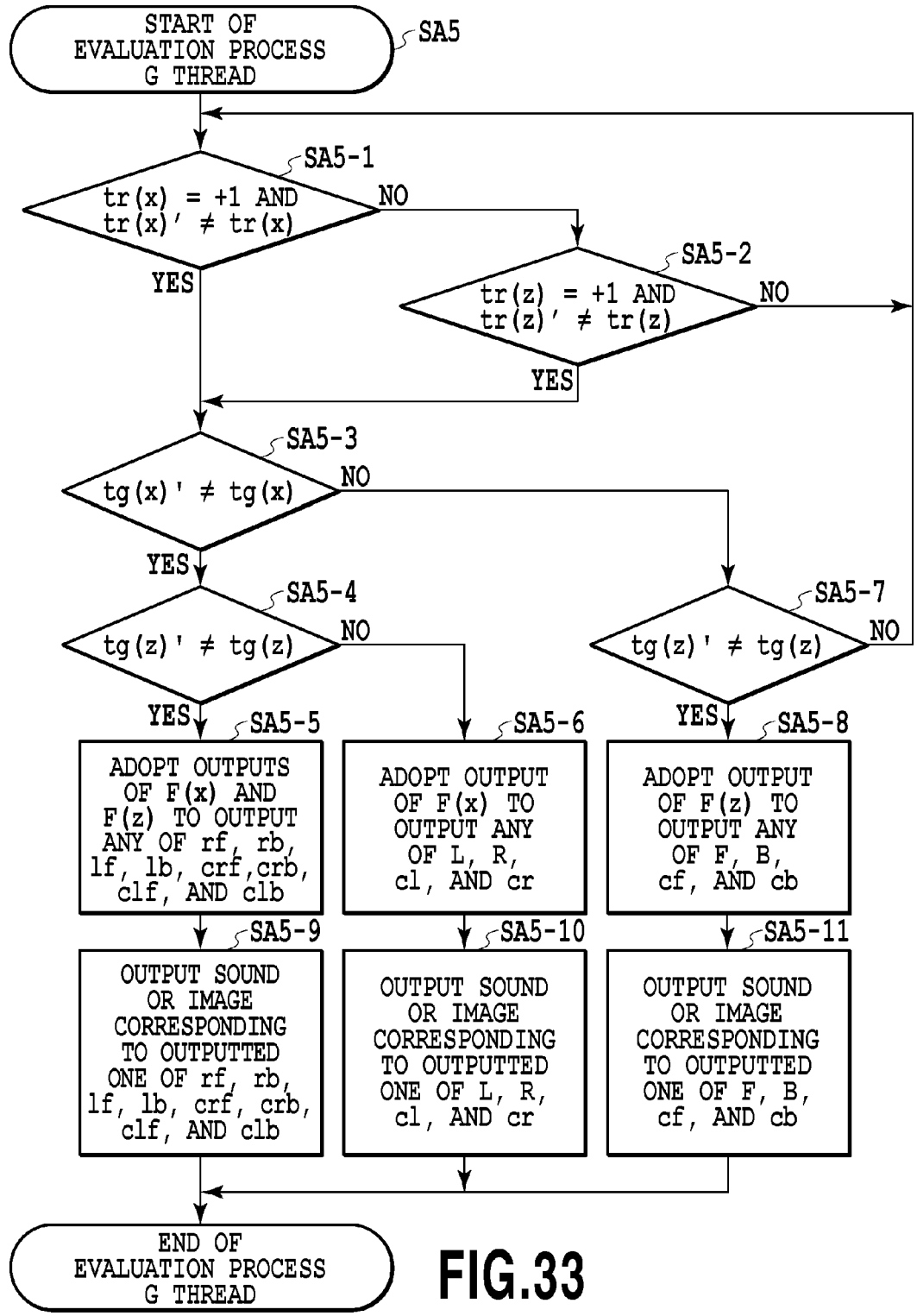
FIG. 33 is a processing flowchart of the smartphone in the third embodiment.

FIG. 33 is a flowchart illustrating a process by the gesture evaluation function G thread of FIG. 25 in the variation. Note that description of redundant processes is omitted and only processes in SA5-3 and subsequent steps necessary for the process in this variation are described.

In SA5-3, it is determined whether or not tg(x)' is not equal to tg(x), i.e., tg(x) is changed. When it is determined that tg(x)' is different from tg(x) (SA5-3: Yes), it is further determined that tg(z)' and tg(z) are changed (SA5-4). When it is determined that tg(z)' is different from tg(z) (SA5-4: Yes), the outputs of F(x) and F(z) are adopted to output any of rf, rb, lf, lb, crf, crb, clf, and clb (SA5-5). Subsequently, in SA5-9, a sound or image corresponding to the outputted one of rf, rb, lf, lb, crf, crb, clf, and clb is outputted (SA5-9).

On the other hand, in SA5-4, when it is determined that tg(z)' is equal to tg(z) (SA5-4: No), the output of F(x) is adopted to output any of L, R, cl, and cr (SA5-6). Subsequently, in SA-10, a sound or image corresponding to the outputted one of L, R, cl, and cr is outputted (SA5-10).

In addition, in SA5-3, when it is determined that tg(x)' is equal to tg(x) (SA5-3: No), it is further determined whether or not tg(z)' and Tg(z) are changed (SA5-7). When it is determined that tg(z)' is different from tg(z) (SA5-7: Yes), the output of F(z) is adopted to output any of F, B, cf, and cb (SA5-8). Subsequently, in SA5-11, a sound or image corresponding to the outputted one of F, B, cf, and cb is outputted (SA5-11).

On the other hand, in SA5-7, when it is determined no (SA5-7: No), the processing flow returns to SA5-1 again. Also, in SA5-9, SA5-10, or SA5-11, when a sound or image corresponding to a gesture determination value is outputted, the gesture evaluation function G thread is ended.

As described above, the smartphone in the present embodiment can support an input process by a user by outputting information such as a sound or image at timing when detecting a gesture. Even in the case where a character string used for an ID or the like is a long character string, or a complicated character string, the user can memorize the character string in relation to the sound or image, and also in the case of performing an input process on the smartphone as well, easily perform the input process in relation to the sound or image.

Fourth Embodiment

A fourth embodiment relates to a gesture detecting device having a function that makes it possible for a user to make a smartphone 1 detect gestures to operate various types of interfaces displayed on a touch screen display 130. In the following, description is given with reference to drawings.

Figure 34:
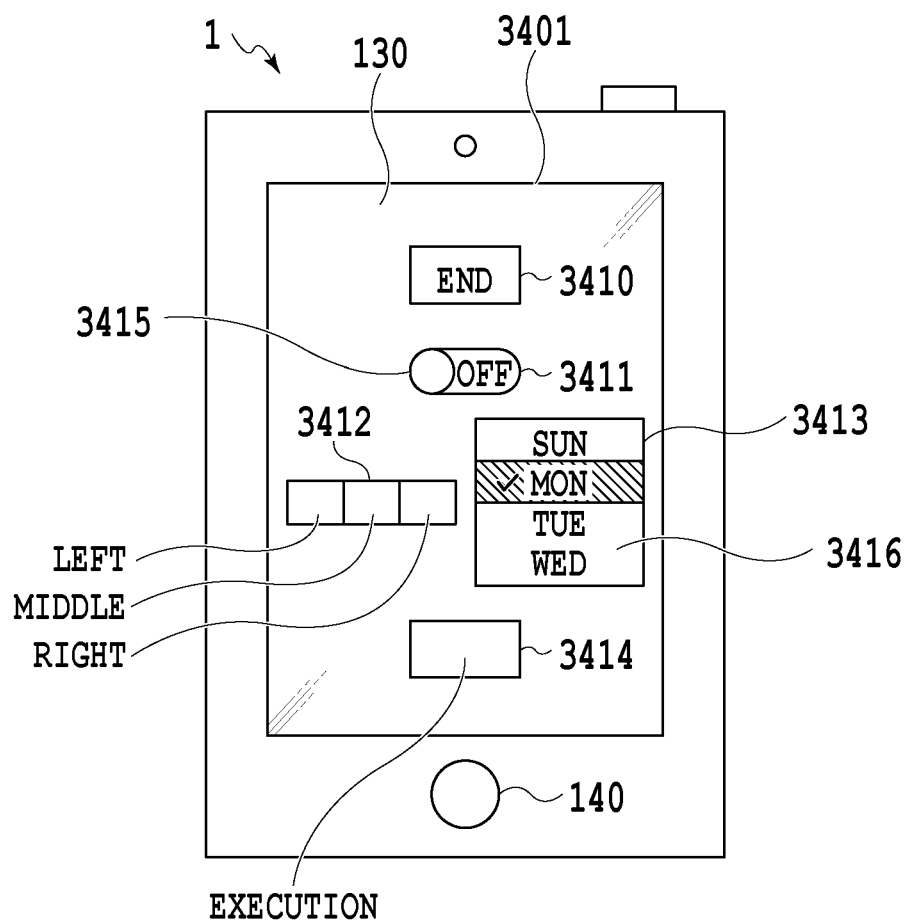
FIG. 34 is a screen display example of a smartphone in a fourth embodiment.

FIG. 34 is an explanatory diagram illustrating an operation screen 3401 of the smartphone 1. The operation screen 3401 is displayed on the touch screen display 130 as, for example, a setting screen for an application running on the smartphone 1. The operation screen 3401 includes an end button 3410, switch interface 3411, selection button interface 3412, drum interface 3413, execution button 3414, switch control 3415, and drum part 3416.

The end button 3410 is used to end the operation screen 3401. By pressing down the end button 3401, the operation screen 3401 or an application can be ended without updating setting information on each of the buttons from the switch interface 3411 to the drum interface 3413.

The switch interface 3411 is an interface that is used by a user to select an ON/OFF value. Operating the switch control 3415 rightward switches to ON, whereas operating the switch control 3415 leftward switches to OFF.

The selection button interface 3412 is an interface that is used by a user to select one from among options. The selection button interface 3412 preliminarily displays values selectable by a user, and the user can select one from among the values. In this example, as the values selectable by a user, "left", "middle", and "right" are displayed.

The drum interface 3413 is an interface that displays multiple values in order for a user to select one from among the values. The drum interface 3413 displays the values selectable by a user in the drum part 3416, and the user can select one from among the values. In this example, the days of the week are displayed in the drum part 3416 in the order of "Mon", "Tue", "Wed", "Thu", "Fri", "Sat", and "Sun". For example, in the case of rotating the drum part 3416 downward while "Wed" is being displayed at the front of the drum interface 3413, "Tue" will be displayed next at the front of the drum interface 3416. On the other hand, in the case of rotating the drum part 3416 upward while "Wed" is being displayed at the front of the drum interface 3413, "Thu" will be displayed next at the front of the drum interface 3416. As described, a user can select one from among the values displayed in the drum interface 3416.

The execution button 3414 is used to fix a value selected through each of the buttons and interfaces. By pressing down the execution button 3414, a next process by an application can be executed.

On the operation screen 3401 in this example, the respective buttons and respective interfaces are vertically arranged in four rows, and in the third row from above, the selection button interface 3412 and the drum interface 3413 are horizontally arranged in line.

In addition, any one button or interface of the end button 3410, switch interface 3411, selection button interface 3412, drum interface 3413, and execution button 3413 displayed on the operation screen 3401 becomes activated.

Note that "activated" defines an activated object in the case of receiving a gesture-based input operation. In the case where a button or an interface is activated, the button or the interface is in a state of being able to receive a gesture-based input operation. However, in the case where a user directly performs a touch operation on the touch screen display 130, all of the buttons and interfaces can receive the touch operation.

An activated button or interface is displayed in a mode different from a normal display mode in order to show a user that the button or interface is activated. Taking the operation screen 3402 in FIG. 36A as an example to give description, the switching interface 3411 is an activated interface that can receive a gesture-based operation. In this case, the switch interface 3411 is displayed in a color different from normal, such as a yellow. On the other hand, in the operation screen 3402, the drum interface 3413 is an interface that cannot receive a gesture-based operation. In this case, the drum interface 3413 is displayed in a grayout color, a normal display color. As described above, a user can easily distinguish an activated button or interface because the activated button or interface is displayed with a color of the activated button or interface being switched. Note that a method for displaying an activated button or interface in a mode different from a normal display mode is not limited to changing a color. For example, a possible mode may be one such as a mode of displaying a light imitating an LED above each of the buttons and interfaces, and lighting an LED arranged above an activated button or interface.

Next, a relationship between a gesture detected by the smartphone 1, and an operation performed by the smartphone 1 is described with reference to FIG. 35.

FIG. 35 is a diagram illustrating an operation definition table 3500. The operation definition table stores the type of a gesture detected by the smartphone 1, a gesture determination value corresponding to the gesture, and an operation to be performed by the smartphone in relation to one another.

In the operation definition table 3500, a local operation refers to a selection or switching operation to be performed on an activated interface.

Specifically, a rightward shake gesture makes it possible to perform rightward selection or rightward switching on an activated interface. A leftward shake gesture makes it possible to perform leftward selection or leftward switching on an activated interface. A frontward shake gesture makes it possible to perform downward selection or downward switching on an activated interface. A backward shake gesture makes it possible to perform upward selection or upward switching on an activated interface.

On the other hand, in the operation definition table 3500, a global operation refers to a selection operation for activate a button or an interface, or an operation of initializing a value selected through each of the interfaces.

In the present embodiment, in the case where the smartphone 1 is subjected to two successive shake gestures at predetermined time intervals or less (e.g., 0.5 seconds or less), it is determined that a double shake gesture is detected. Depending on intervals at which the smartphone 1 detects shake gestures, the smartphone 1 can detect the gestures as mutually different gestures. This makes it possible to, between a local operation and a global operation, make the smartphone 1 detect a mutually different gesture and perform a mutually different operation.

Specifically, a rightward double shake gesture makes it possible to select a button or interface arranged rightward. A leftward double shake gesture makes it possible to select an interface arranged leftward. A frontward double shake gesture makes it possible to select a button or interface arranged downward. A backward double shake gesture makes it possible to select a button or interface arranged upward.

Successive leftward, rightward, leftward, rightward, leftward, and rightward shake gestures make it possible to perform an operation of restoring a value selected through each of the buttons and interfaces to an initial value and deactivating all selected values. In this case, i.e., in the case where a user makes the smartphone 1 recognize gestures and obtain L, R, L, R, L, and R as gesture determination values, respectively, the smartphone 1 determines that the gestures have been made. As a result, the smartphone 1 restores a value selected through each of the interfaces to an initial value, as well as activating the end button 3410. Then, the smartphone 1 performs the same process as pressing down the end button 3410.

Next, a mode where a user makes the smartphone 1 detect gestures to operate respective buttons and interfaces is described with reference to FIGS. 36A and 36B.

Figure 36B:
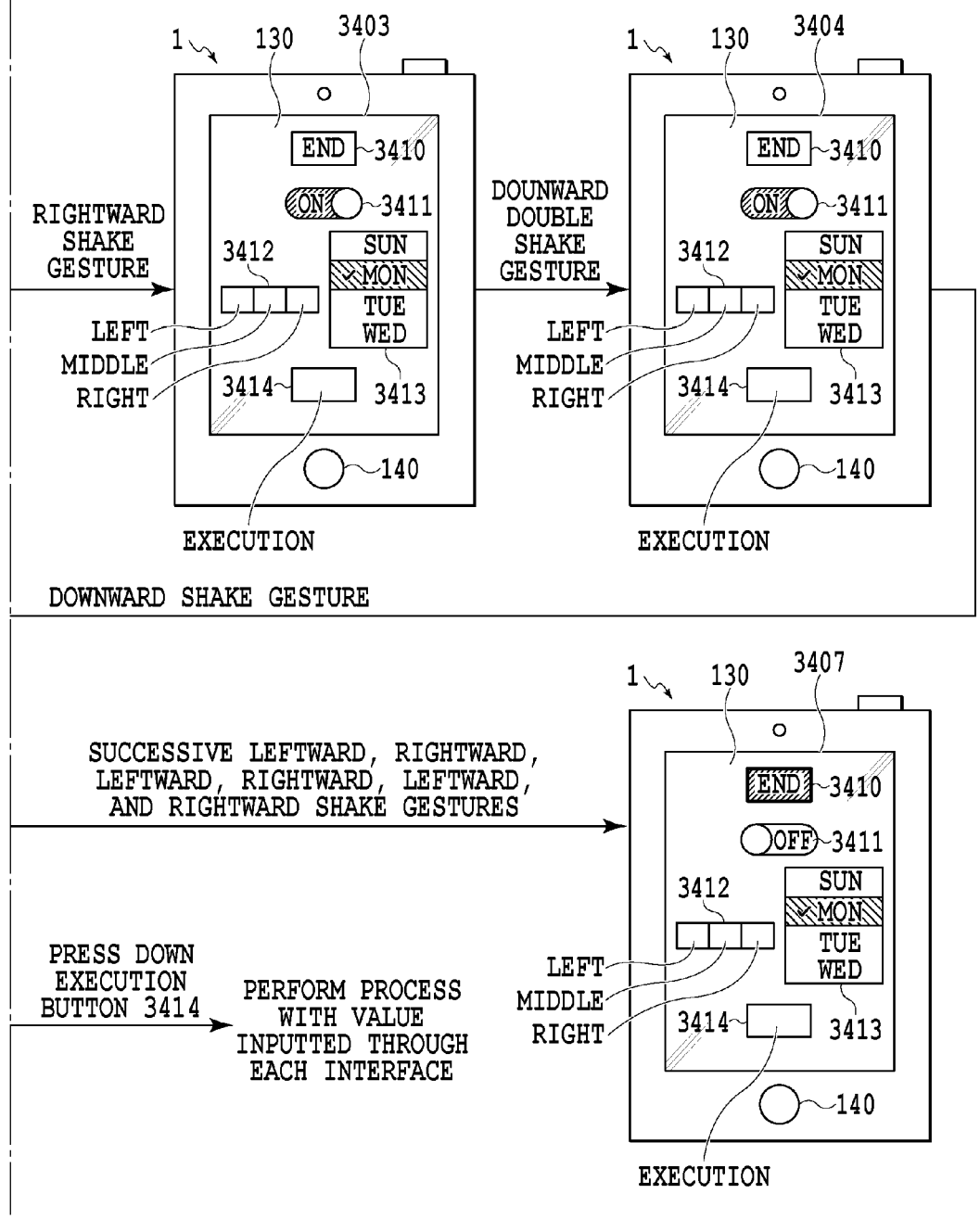
FIG. 36B is a screen transition diagram of the smartphone in the fourth embodiment.

FIGS. 36A and 36B are diagram illustrating screen transition from the operation screens 3401 to 3407 for the respective buttons and interfaces. The operation screen 3401 is an initial screen, on which the respective buttons and interfaces are displayed.

On the operation screen 3401, in order to indicate to a user that the end button 3410 is activated, the end button 3410 is displayed in a color different from normal, such as a yellow.

On the operation screen 3401, when the smartphone 1 detects the frontward double shake gesture, the switch interface 3411 arranged below the end button 3410 is selected to become an activated interface.

On the operation screen 3402, when the smartphone 1 detects the rightward shake gesture, the switch control 3415 is operated rightward, and the switch interface 3411 is switched to ON.

On the operation screen 3403, when the smartphone 1 detects the frontward double shake gesture, the drum interface 3413 arranged below the switch interface 3411 is selected to become an activated interface. In this example, at this time, "Mon" is displayed at the front of the drum interface 3413.

On the operation screen 3404, when the smartphone 1 detects the frontward shake gesture, a value displayed at the front of the drum part 3416 is switched from "Mon" to "Tue". In addition, at this time, the drum part 3416 behaving so as to rotate upward is displayed.

On the operation screen 3405, when the smartphone 1 detects the frontward double shake gesture, the execution button 3414 arranged below the drum interface 3413 is selected to become an activated interface.

On the operation screen 3406, when the smartphone 1 detects pressing down of the execution button 3414, it is determined that a process is to be performed with the values selected through the respective interfaces.

Alternatively, on the operation screen 3406, when the smartphone 1 detects the successive leftward, rightward, leftward, rightward, leftward, and rightward shake gestures, the values selected through the respective interfaces are initialized (operation screen 3407), and the display is restored to the same screen as the operation screen 3401, i.e., the initial screen.

Note that although not described with the screen transition in FIGS. 36A and 36B, when the selection interface 3412 is an activated interface as well, a switching operation can be performed by the smartphone 1 detecting a shake gesture in the left-right direction. That is, when the smartphone 1 detects the leftward shake gesture in the state where the selection interface 3412 is activated, switching can be performed so as to select a value displayed leftward, such as "left" with respect to "middle".

Further, in this example, the end button 3410 and the execution button 3414 are not related to any gesture for performing a local operation; however, the end button 3410 and the execution button 3414 may be respectively related to, for example, spin gestures described in the preceding embodiments. In such a case, a process to press down the execution button 3414 may be performed by making the smartphone 1 detect a spin gesture in a predetermined direction while the execution button 3414 is activated.

As described above, the gesture detecting device in the fourth embodiment has a function capable of operating the various types of interfaces displayed on the touch screen display 130 in such a way that a user makes the smartphone 1 detect gestures.

For this reason, in the case where the smartphone 1 cannot be made to recognize a touch operation due to wearing gloves or the like, an operation on the touch screen display can be replaced by making the smartphone 1 detect a predetermined gesture. This is not only effective when a general user operates a smartphone outdoors in winter, but produce an effect under environment where gloves must be worn, such as in a factory.

Fifth Embodiment

In a fifth embodiment, a gesture recognition device is described which has a function of learning and recognizing a gesture in space (hereinafter denoted as a "space gesture" in the present embodiment) using a neural network.

Note that the neural network refers to a network that reproduces the motions of neurons in the brain of an organism with a simplified model using artificial neurons, and mutually connects the artificial neurons hierarchically or in another manner. In addition, by making the neural network learn the weight or threshold value of each of coupling coefficients between layers, the neural network is adapted to be able to perform specific information processing.

Figure 40:
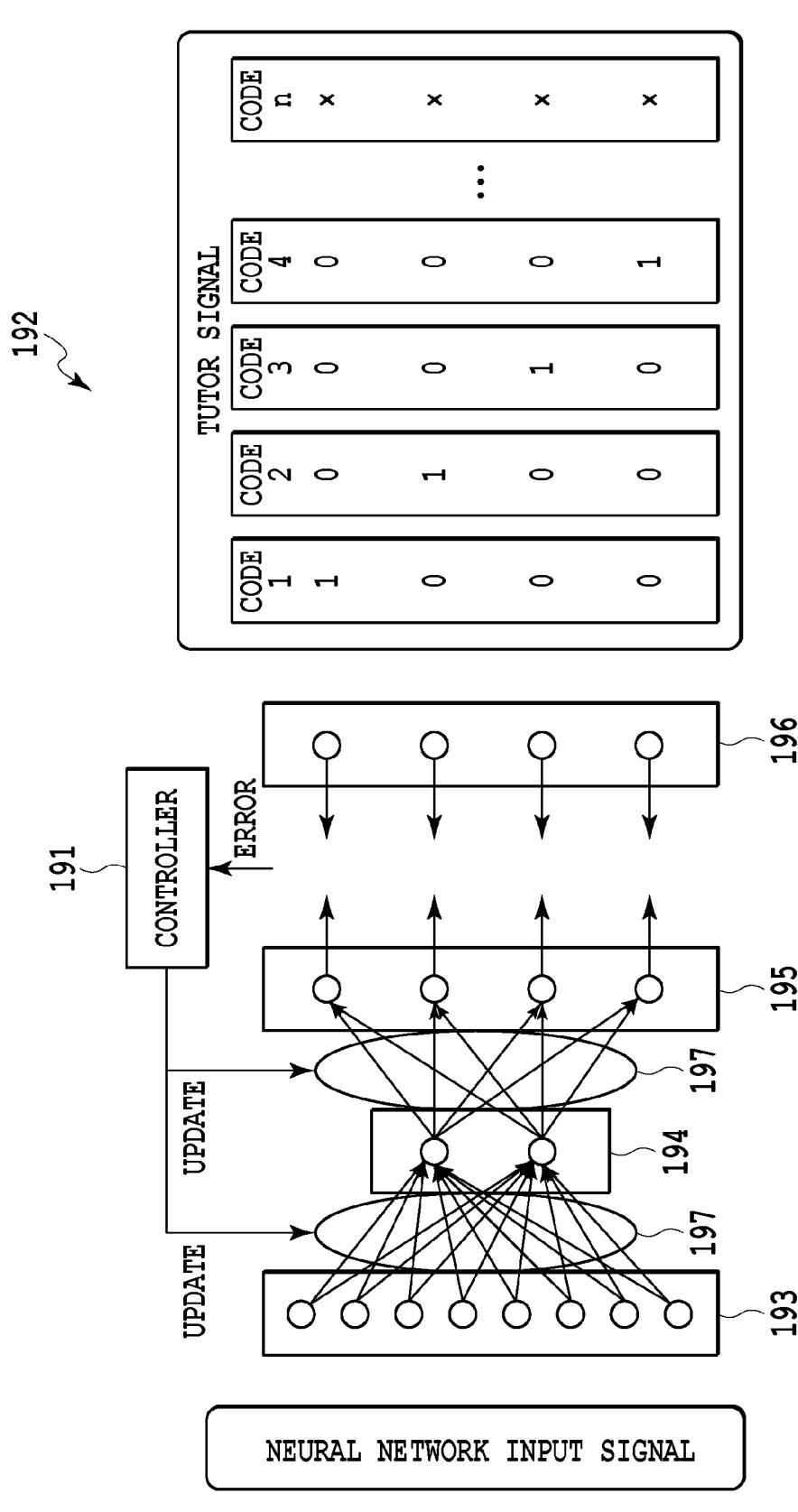
FIG. 40 is an explanatory diagram illustrating details of a neural network in the fifth embodiment.

As schematically illustrated in FIG. 40, the neural network 192 is configured to include a controller 191, input layer 193, intermediate layer 194, output layer 195, tutor signal layer 196, and coupling coefficients 197.

The controller 191 converts a gesture determination value into a neural network input signal to input the neural network input signal to the input layer 193. At the same time, the controller 191 inputs a tutor signal corresponding to the neural network input signal to the tutor signal layer 196.

The intermediate layer 194 and the output layer 195 respectively use the coupling coefficients 197 to perform calculations. The controller 191 updates the weight or threshold value of each of the coupling coefficients between adjacent twos of the layers such that an output of the output layer comes close to the tutor signal. To perform the update, the controller 191 determines a difference between the output from the output layer and the tutor signal, and until the difference converges to a certain allowable value or less, repeatedly inputs a set of the neural network input signal and the tutor signal to update the coupling coefficients 197. When the difference between the output from the output layer 195 and the tutor signal converges to the certain allowable value or less, learning the tutor signal is ended.

After the end of learning one tutor signal, learning another tutor signal is started. Subsequently, by repeating the same learning until learning an N-th tutor signal, the neural network 192 that can recognizes N types of space gestures can be formed.

Next, recognition using the learned neural network 192 is described. The controller 191 converts a gesture determination value into a neural network input signal to input the neural network input signal to the input layer 193. The intermediate layer 194 and the output layer 195 respectively use updated coupling coefficients 197 to perform calculations. The controller 191 outputs an output signal from the output layer 195 to a processor 100 of a smartphone 1 as a neural network output signal.

The processor 100 determines a difference between the neural network output signal and a corresponding tutor signal to determine whether or not the difference is the certain allowable value or less. At this time, when the difference between the neural network output signal and the corresponding tutor signal is the certain allowable value or less, a space gesture made to the smartphone 1 is recognized as a learned space gesture.

On the other hand, when the difference between the neural network output signal and the corresponding tutor signal exceeds the certain allowable value, the processor 100 does not recognize the space gesture made to the smartphone 1 as a learned space gesture. In such a case, when desiring to make the processor 100 recognize the space gesture as a learned space gesture, the neural network 192 may be configured to be able to perform learning additionally.

Figure 37:
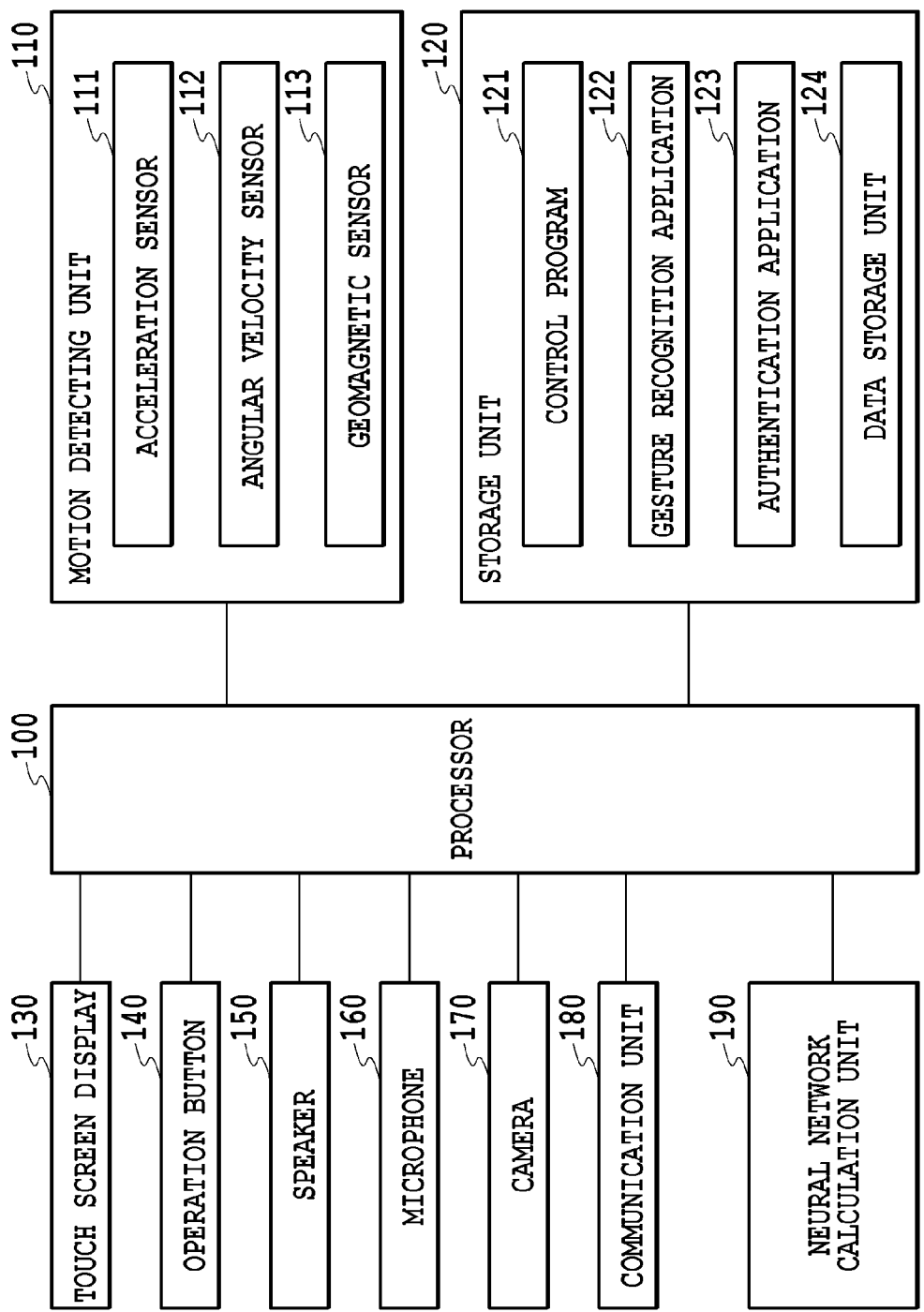
FIG. 37 is a block configuration diagram illustrating functions of a smartphone in a fifth embodiment.

FIG. 37 is a block configuration diagram of the smartphone 1 as the gesture recognition device in the fifth embodiment of the present invention. As illustrated in FIG. 37, the smartphone 1 has the processor 100, and a motion detecting unit 110, storage unit 120, touch screen display 130, operation button 140, speaker 150, microphone 160, camera 170, communication unit 180, and neural network calculation unit 190 that are respectively connected to the processor 100. Note that the neural network calculation unit 190 may be configured to be connected through the communication unit 180. In such a case, the processor 100 performs a process in the neural network calculation unit 190, which is, for example, incorporated in a server, through the communication unit 180, and thereby a processing load on the processor 100 can be reduced. In the following, description of components redundant with those in FIG. 3 is omitted.

The neural network calculation unit 190 is configured to include, for example, a neuro-processor, and can perform a learning/recognition process through the neural network 192.

Figure 38:
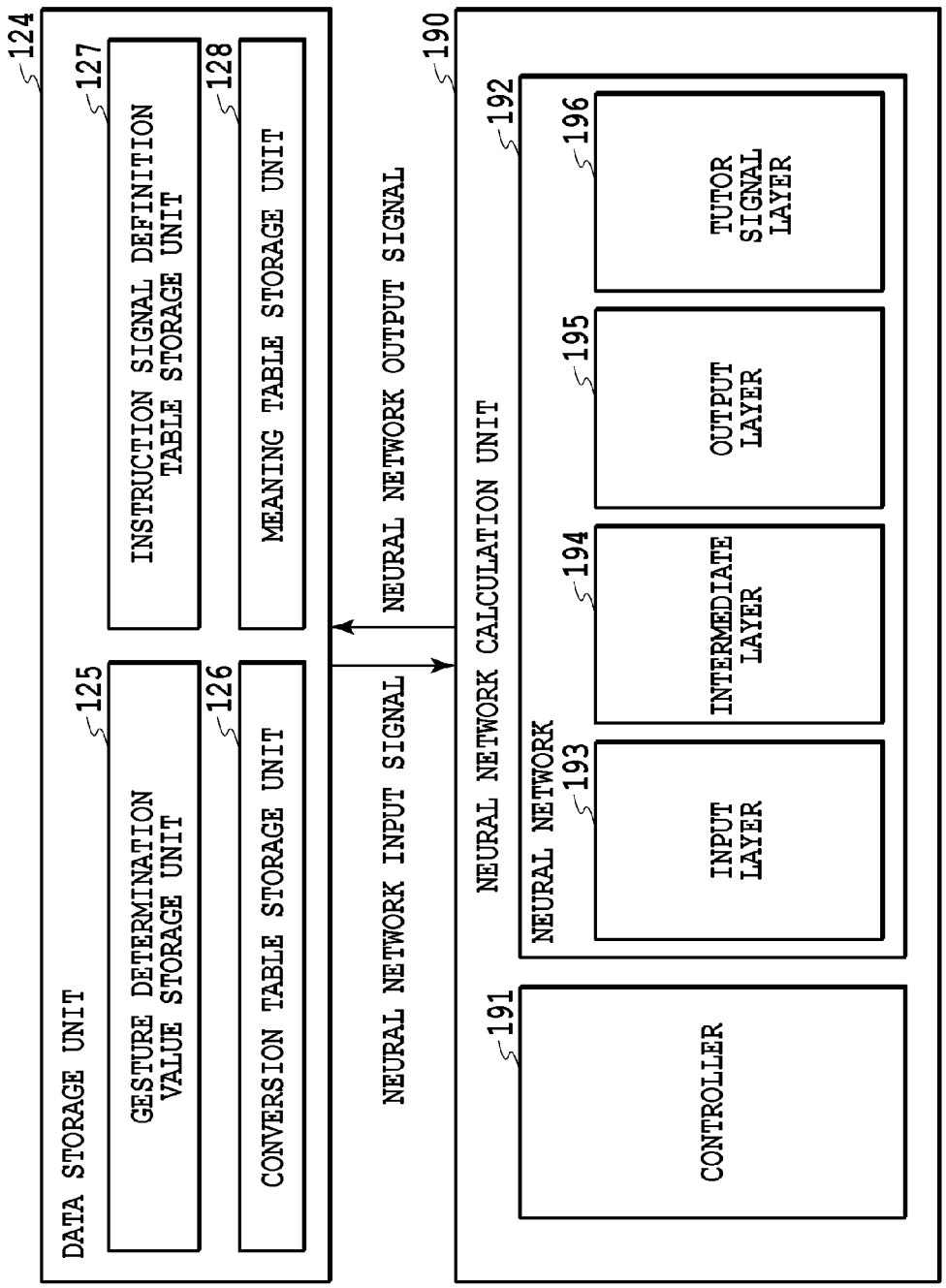
FIG. 38 is a block configuration diagram illustrating functions of a neural network calculation unit in the fifth embodiment.

FIG. 38 is a diagram illustrating a functional block of the neural network calculation unit 190. A data storage unit 124 and the neural network calculation unit 190 are connected to each other through the processor 100 (not illustrated), and configured to be able to transmit/receive a neural network input signal and a neural network output signal.

The data storage unit 124 includes a gesture determination value storage unit 125, conversion table storage unit 126, tutor signal definition table storage unit 127, and meaning table storage unit 128. The gesture determination value storage unit 125 is a storage area that can store gesture determination values.

The conversion table storage unit 126 is a storage area for a conversion table 3901 that is referred to when converting a gesture determination value into a neural network input signal.

The tutor signal definition table storage unit 127 is a storage area for a tutor signal definition table 3902.

The meaning table storage unit 128 is a storage area for a meaning table 3903.

The neural network calculation unit 190 includes: the controller 191; and the neural network 192 configured to include the input layer 193, intermediate layer 194, output layer 195, and tutor signal layer 196. The controller 191 performs integrated control of the neural network calculation unit 190 to control the learning/recognition process of the neural network 192.

FIGS. 39A, 39B, and 39C are explanatory diagrams illustrating contents of the conversion table 3901, tutor signal definition table 3902, and meaning table 3903.

The conversion table 3901 is referred to when converting a gesture determination value into a neural network input signal. The conversion table 3901 in FIG. 39A stores, as an example, "+1", "−1", "+4", "−4", "−2", "−3", "+3", and "+2" respectively in relation to gesture determination values "R", "L", "F", "B", "rf", "rb", "lf", and "lb".

The tutor signal definition table 3902 is a table for mutually referring to a code and a tutor signal. Note that a "code" here refers to information that relates a tutor signal and a space gesture to each other. For example, in the case of learning a space gesture corresponding to the code "1", a neural network input signal corresponding to the space gesture is inputted to the input layer 193, and at the same time, a tutor signal corresponding to the code "1" is inputted to the tutor signal layer 196 as well.

The tutor signal definition table 3902 in FIG. 39B stores, as an example, "1, 0, 0, 0", "0, 1, 0, 0", "0, 0, 1, 0", and "0, 0, 0, 1" respectively in relation to the codes "1", "2", "3", and "4". In the present embodiment, as a code, a number is used; however, a character, a symbol, a word or phrase having a meaning, or the like is also possible.

The meaning table 3903 is for mutually referring to a code and definition information. Note that "definition information" here is information having some meaning for a user, and information capable of specifying a code.

The meaning table in FIG. 39C stores, as an example, "A", "Δ", "Z", "Yamada, Taro" respectively in relation to the codes "1", "2", "3", and "4. Definition information can relate information having some meaning for a user to, for example, a learned space gesture. Details will be described later with FIGS. 42A and 42B.

Next, a process to learn/recognize a space gesture is described with reference to FIG. 40.

A space gesture in the present embodiment is configured by an arbitrary combination of shake gestures and spin gestures in the preceding embodiments (hereinafter denoted as "basic gestures" in the present embodiment). For example, referring to FIG. 6 to give description, a space gesture can be configured by a "combination of leftward and rightward shake gestures from the basic posture", "combination of frontward and backward shake gestures from the basic posture", "combination of leftward, backward, rightward, and frontward shake gestures from the basic posture", or the like.

As an example, a process to learn the "combination of leftward, backward, rightward, and frontward shake gestures from the basic posture" as a space gesture corresponding to the code "1" is described.

When the above combination of the shake gestures is detected, the processor 100 of the smartphone 1 outputs a gesture determination value "L, B, R, F" to the gesture determination value storage unit 125.

Then, the controller 191 of the neural network calculation unit 190 refers to the conversion table 3901 to obtain a neural network input signal "−1, −4, +1, +4".

The controller 191 inputs the neural network input signal "−1, −4, +1, +4" to the input layer 193. At the same time, the controller 191 refers to the tutor signal definition table 3902 to input a tutor signal "1, 0, 0, 0" corresponding to the code "1" to the tutor signal layer 196.

Subsequently, the intermediate layer 194 and the output layer 195 use the coupling coefficients 197 to perform calculations, respectively. The controller 191 updates the weight or threshold value of each of the coupling coefficients between adjacent twos of the layers such that an output of the output layer comes close to the tutor signal. To perform the update, the controller 191 determines a difference between the output from the output layer 195 and the tutor signal, and until the difference converges to the certain allowable value or less, repeatedly input a combination of the neural network input signal and the tutor signal to update the coupling coefficients 197.

Next, a process to use the learned neural network 192 to recognize the space gesture corresponding to the code "1" is described. The controller 191 converts a gesture determination value into a neural network input signal and inputs the neural network input signal to the input layer 193. The intermediate layer 194 and the output layer 195 use the updated coupling coefficients 197 to perform calculations, respectively. The controller 191 outputs an output signal from the output layer 195 to the processor 100 of the smartphone 1 as a neural network output signal.

In the case where a space gesture the smartphone 1 is made to detect is "(1) the combination of leftward, backward, rightward, and frontward shake gestures from the basic posture", a gesture determination value is "L, B, R, F", and a neural network input signal is "−1, −4, +1, +4".

In this case, the neural network input signal "−1, −4, +1, +4" is the same as the neural network input signal at the time of learning the space gesture corresponding to the code "1". For this reason, by inputting the neural network input signal "−1, −4, +1, +4" to the input layer 193 of the learned neural network 192, a neural network output signal that is the same as or approximate to "1, 0, 0, 0" can be obtained from the output layer 195.

On the other hand, the tutor signal corresponding to the code "1" is also "1, 0, 0, 0". For this reason, a difference between the neural network output signal and the tutor signal corresponding to the code "1" is determined to be equal to or less than the certain allowable value. From the above, "(1) the combination of the leftward, backward, rightward, and frontward shake gestures from the basic posture" is recognized as the space gesture corresponding to the code "1".

In the case where a space gesture the smartphone 1 is made to detect is "(2) a combination of frontward, rightward, backward, and leftward shake gestures from the basic posture", a gesture determination value is "F, R, B, L", and a neural network input signal is "+4, +1, −4, −1".

In this case, the neural network input signal "+4, +1, −4, −1" is different from the neural network input signal at the time of learning the space gesture corresponding to the code "1". For this reason, even by inputting the neural network input signal "+4, +1, −4, −1" to the input layer 193 of the learned neural network 192, a value that is the same as or approximate to the tutor signal "1, 0, 0, 0" corresponding to the core "1" cannot be obtained as a neural network output signal.

The tutor signal corresponding to the code "1" is "1, 0, 0, 0", and therefore a difference between the neural network output signal and the tutor signal corresponding to the code "1" is determined to exceed the certain allowable value. From the above, "(2) the combination of the frontward, rightward, backward, and leftward shake gestures from the basic posture" is not recognized as the space gesture corresponding to the code "1".

In the case where a space gesture the smartphone 1 is made to detect is "(3) a combination of leftward, backward, rightward, and left-frontward shake gestures from the basic posture", a gesture determination value is "L, B, R, lf", and a neural network input signal is "−1, −4, +1, +3". In this case, only the last detected basic gesture is different from (1).

In this case, the neural network input signal "−1, −4, +1, +3" is only partially different from the neural network input signal at the time of learning the space gesture corresponding to the code "1". For this reason, by inputting the neural network input signal "−1, −4, +1, +3" to the input layer 193 of the learned neural network 192, a neural network output signal such as "0.8, 0.2, 0, 0" approximate to "1, 0, 0, 0" can be obtained.

The tutor signal corresponding to the code "1" is "1, 0, 0, 0", and therefore a difference from the neural network output signal "0.8, 0.2, 0, 0" is "0.2, 0.2, 0, 0". Here, a comparative example where a difference between "1" and "0.8" is "0.2", and a difference between "0" and "0.2" is "0.2" is described; however, the present embodiment is not limited to this.

In the case where as the allowable value for each element of the signal, "0.3" is set, each of the elemental differences between the neural network output signal and the tutor signal corresponding to the code "1" is "0.2" that is equal to or less than the allowable value. For this reason, in this case, "(3) the combination of the leftward, backward, rightward, and left-frontward shake gestures from the basic posture" can be recognized as the space gesture corresponding to the code "1".

Even in the case where the same user attempts to make the smartphone 1 detect the same space gesture, fluctuation or subtle difference in gesture may occur in part of a detection result of the space gesture depending on time or place. By preliminarily performing a sufficient learning process, the smartphone 1 can be made to recognize a space gesture even in the case where part of a detection result of the space gesture includes fluctuation or subtle difference in gesture.

Note that each of the input layer 193, intermediate layer 194, output layer 195, and tutor signal layer 196 of the neural network 192 in FIG. 40 is described so as to have a configuration to process a signal; however, the present invention is not limited to this. For example, the neural network 192 may be configured to process pieces of data as input data and output data.

Figure 41B:
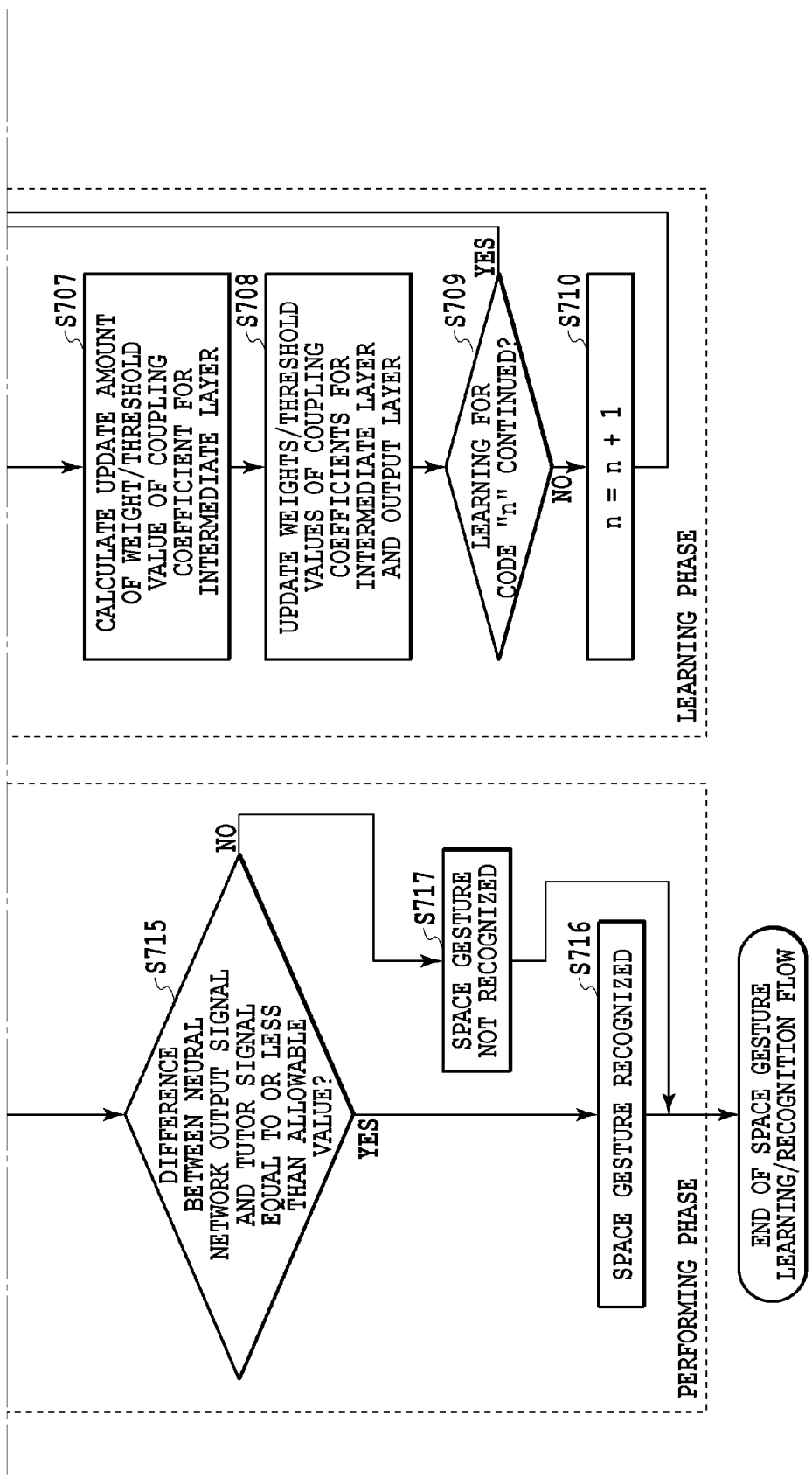
FIG. 41B is a processing flowchart of the smartphone in the fifth embodiment.

FIGS. 41A and 41B are flowcharts illustrating the space gesture learning/recognition process. In the following, description is given with reference to the flowchart.

First, described is a learning phase where the space gesture learning process is performed. In S701, 1 is inputted to a variable n. n is used to specify a code of a learning target (S701). Then, in S702, it is determined whether or not learning has been completed to the last code. That is, when the learning has been performed to the last code, and a difference between a neural network output signal and a tutor signal has been converged to a certain allowable value or less in learning for every code, it is determined that the learning has been completed to the last code (S702).

In S703, the controller 191 gives a neural network input signal and a tutor signal to the input layer 193 and the tutor signal layer 196, respectively (S703).

In S704, the controller 191 performs a calculation for the intermediate layer 194 (S704). The calculation for the intermediate layer 194 is performed using the coupling coefficient 197, and a calculation result is outputted to the output layer 195.

In S705, the controller 191 performs a calculation for the output layer 195 (S705). The calculation for the output layer 195 is performed using the coupling coefficient 197, and an output value is outputted from the output layer 195.

In S706, the controller 191 compares the output signal outputted from the output layer 195 and the tutor signal with each other. As a result of the comparison, a difference between the output signal and the tutor signal is calculated, and on the basis of the calculated difference, an update amount of the weigh or threshold value of the coupling coefficient 197 for the output layer 195 is calculated.

In S707, similarly, on the basis of the calculated difference, an update amount of the weigh or threshold value of the coupling coefficient for the intermediate layer 194 is calculated.

In S708, on the basis of the update amounts of the weights or threshold values of the coupling coefficients 197 calculated in S706 and S707, the weights or threshold values of the coupling coefficients 197 for the intermediate layer 194 and the output layer 195 are updated.

In S709, it is determined whether or not the learning for the code "n" is continued (S709). That is, it is determined whether or not the learning for the code "n" has progressed to the extent that a difference between the neural network output signal and the tutor signal is converged to the certain allowable value or less. When it is determined that the learning for the code "n" is continued (S709: Yes), the processing steps in S703 to S708 are repeated again to continue the learning. On the other hand, when it is determined that the learning for the code "n" is not continued (S709: No), the processing flow proceeds to S710, where a process "n=n+1" is performed to specify a next tutor signal.

After the end of the process in S710, the processing flow returns to S702 again, where it is determined whether or not the learning has been completed to the last code (S702). By performing the learning to an N-th tutor signal according to the processing flow as described above, the neural network 192 that can recognize N types of space gestures can be formed.

Next, a performing phase is described where the space gesture recognition process is performed. In S711, the controller 191 gives a neural network input signal to the input layer 193 of the learned neural network 192.

In S712, the controller 191 performs a calculation for the intermediate layer 194 in the same manner as that in the processing step S704 (S712). The calculation for the intermediate payer 194 is performed using the coupling coefficient 197, and a calculation result is outputted to the output layer 195.

In S713, the controller 191 performs a calculation for the output layer 195 in the same manner as that in the processing step S705 (S713). The calculation for the output layer 195 is performed using the coupling coefficient 197.

In S714, the controller 191 outputs a calculation result in S713 as a neural network output signal (S714).

Then, in S715, the processor 100 of the smartphone 1 determines a difference between the neural network output signal and a corresponding tutor signal to determine whether or not the difference is the certain allowable value or less (S715). When the difference is the allowable value or less (S715: Yes), the processor 100 recognizes a space gesture (S716). On the other hand, when the difference exceeds the allowable value (S715: No), the processor 100 does not recognize the space gesture (S717).

When the processing step S716 or S717 is finished, the space gesture learning/recognition flow is ended.

Figure 42B:
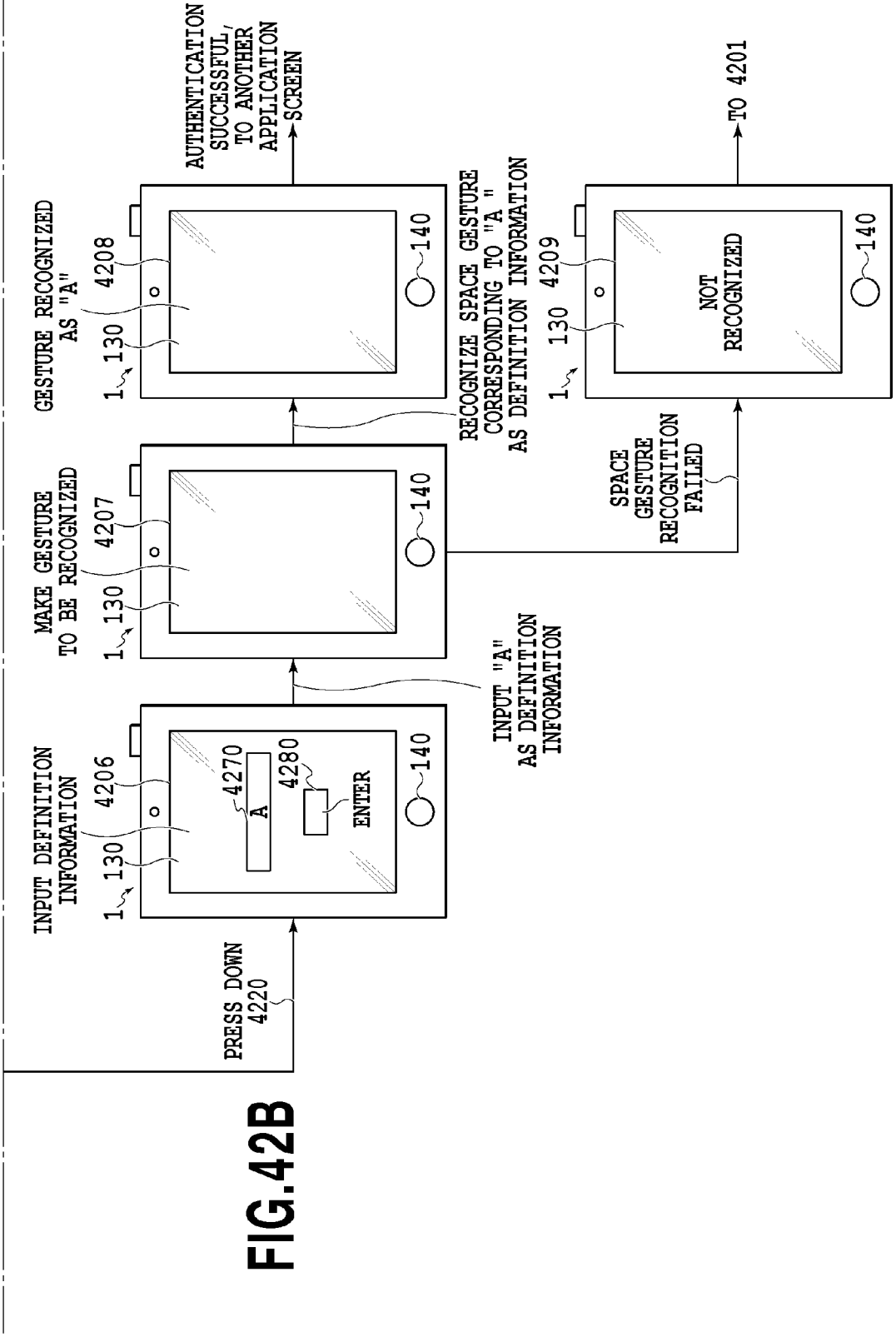
FIG. 42B is a processing flowchart of the smartphone in the fifth embodiment.

FIGS. 42A and 42B are diagram illustrating an example of screen transition during a period when the smartphone learns/recognizes a space gesture. In the following, description is given with reference to the diagram.

As an initial screen 4201, selection buttons 4210 and 4220 are displayed on the touch screen display 130.

First, sequential screen transition appearing when making the smartphone 1 learn space gestures is described. When pressing down the selection button 4210, a definition information input screen 4202 is displayed on the touch screen display 130.

In this example, "A" is inputted on the definition information input screen 4202 as definition information. When inputting "A" in a definition information input form 4230 and pressing down an enter button 4240, a gesture learning screen 4203 is displayed.

When a user makes the smartphone 1 detect an arbitrary combination of basic gestures while the gesture learning screen 4203 is being displayed, the combination of the basic gestures is learned as a space gesture corresponding to the definition information "A".

When it is determined that the learning of the space gesture corresponding to the definition information "A" is continued (FIG. 41B, S709), a learning continuation screen 4204 is displayed on the touch screen display 130. When the learning continuation screen 4202 is displayed, the gesture learning screen 4203 is again displayed, and a display prompting making the space gesture corresponding to the definition information "A" is given.

On the other hand, when it is determined that the learning of the space gesture corresponding to the definition information "A" is ended (FIG. 41B, S709), a selection screen 4205 is displayed on the touch screen display 130.

When pressing down a selection button 4250 on the selection screen 4205, the definition information input screen 4202 is again displayed. The user inputs next definition information (e.g., "Δ") in the definition information input form 4230, and can thereby make the smartphone 1 learn a space gesture corresponding to the next definition information.

When pressing down a selection button 4260 on the selection screen 4205, the learning is ended, and the initial screen 4201 is again displayed.

Next, sequential screen transition appearing during a period when making the smartphone 1 recognize space gestures is described. When pressing down the selection button 4220 while the initial screen 4201 is being displayed, a definition information input screen 4206 is displayed on the touch screen display 130. In this example, "A" is inputted on the definition information input screen 4206 as definition information. When inputting "A" in a definition information input form 4270 and pressing down an enter button 4280, a gesture recognition screen 4207 is displayed.

The user makes the smartphone 1 recognize a predetermined space gesture while the gesture recognition screen 4207 is being displayed. If the user can successfully make the smartphone 1 recognize the space gesture, which the smartphone 1 has been made to learn in relation to the definition information "A" (FIG. 41B, S715), a gesture recognition successful screen 4208 is displayed on the touch screen display 130.

On the other hand, the user makes the smartphone 1 recognize a predetermined space gesture while the gesture recognition screen 4207 is being displayed. If the user fails to make the smartphone 1 recognize the space gesture, which the smartphone 1 has been made to learn in relation to the definition information "A" (FIG. 41B, S715), a gesture recognition failed screen 4209 is displayed on the touch screen display 130. Then, the initial screen 4201 is again displayed.

In a variation of the present embodiment, an authentication application 123 of the smartphone 1 can apply whether or not a space gesture is recognized to user authentication. That is, in the case where an actor can successfully make the smartphone 1 recognize a space gesture, which a user has made the smartphone 1 learn in relation to definition information, the authentication application 123 determines that the actor having made the space gesture is the valid user. In this case, the authentication application 123 provides a function of logging in to a service, or the like subsequently to the gesture recognition successful screen 4208 on the assumption that the user authentication is successful. On the other hand, in the case where an actor fails to make the smartphone 1 recognize a space gesture, which a user has made the smartphone 1 learn in relation to definition information, the authentication application 123 determines that the actor having made a space gesture is an invalid user.

As described above, the gesture recognition device in the fifth embodiment is characterized by having a function of learning/recognizing a space gesture using a neural network. This makes it possible for the gesture recognition device to recognize an arbitrary space gesture as a value having some meaning for a user.

As described above, the smartphone in each of the embodiments of the present invention detects gestures, and on the basis of the detected gestures in space, performs various processes. This makes it possible for smart devices such as smartphones to provide new operability to a user.

Also, any of the above-described embodiments is based on a computer program to be executed on an information processor, and therefore the present invention can take the form of a computer program. Further, the computer program can be stored on a computer storage medium such as a CD-ROM, and executed by a computer reading the storage medium, and therefore the present invention can take the form of a computer storage medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A gesture detecting device comprising:
a motion detecting unit; and
a processor,
wherein the motion detecting unit outputs pieces of deviation value in three-dimensional sensor axis directions in response to a gesture made to the gesture detecting device, and
wherein the processor is configured to:
when in response to the gesture made to the gesture detecting device, first deviation value on a first sensor axis changes so as to exceed a threshold value, and then the first deviation value on the first sensor axis changes so as to fall below the threshold value, detect a tilt of the gesture detecting device to obtain a first direction determination value for the first sensor axis;
when in response to the gesture made to the gesture detecting device, second deviation value on a second sensor axis changes so as to exceed a threshold value, and then the second deviation value on the second sensor axis changes so as to fall below the threshold value, detect a tilt of the gesture detecting device to obtain a second direction determination value for the second sensor axis; and
while in response to the gesture made to the gesture detecting device, third deviation value on a third sensor axis is changing so as to exceed a threshold value, obtain neither the first direction determination value nor the second direction determination value, and thereby detects the gesture made to the gesture detecting device.

2. The gesture detecting device according to claim 1, wherein the processor is configured to:
when in response to the gesture made to the gesture detecting device, the first deviation value on the first sensor axis changes so as to exceeds the threshold value, and then the first deviation value on the first sensor axis changes so as to exceed a second threshold value different from the threshold value, detect spin of the gesture detecting device to obtain a determination value indicating a spin gesture with respect to the first sensor axis; and
when in response to the gesture made to the gesture detecting device, the second deviation value on the second sensor axis changes so as to exceeds the threshold value, and then the second deviation value on the second sensor axis changes so as to exceed a second threshold value different from the threshold value, detect spin of the gesture detecting device to obtain a determination value indicating a spin gesture with respect to the second sensor axis.

3. The gesture detecting device according to claim 2, wherein the processor is configured to:
when obtaining only the first direction determination value for the first sensor axis, output a gesture determination value indicating that the gesture detecting device is tilted in a direction specified by the first direction determination value;
when obtaining only the second direction determination value for the second sensor axis, output a gesture determination value indicating that the gesture detecting device is tilted in a direction specified by the second direction determination value;
when obtaining both of the first direction determination value for the first sensor axis and the second direction determination value for the second sensor axis, output a gesture determination value indicating that the gesture detecting device is tilted in a direction that is substantially intermediate between the direction specified by the first direction determination value and the direction specified by the second direction determination value;
when obtaining only the determination value indicating the spin gesture with respect to the first sensor axis, output a gesture determination value indicating that the gesture detecting device is spun in a direction specified by the determination value indicating the spin gesture with respect to the first sensor axis;
when obtaining only the determination value indicating the spin gesture with respect to the second sensor axis, output a gesture determination value indicating that the gesture detecting device is spun in a direction specified by the determination value indicating the spin gesture with respect to the second sensor axis; and
when obtaining both of the determination value indicating the spin gesture with respect to the first sensor axis and the determination value indicating the spin gesture with respect to the second sensor axis, output a gesture determination value indicating that the gesture detecting device is spun in a direction that is substantially intermediate between the direction specified by the determination value indicating the spin gesture with respect to the first sensor axis and the direction specified by the determination value indicating the spin gesture with respect to the second sensor axis.

4. The gesture detecting device according to claim 3, at timing when outputting the gesture determination value, displaying information related to the gesture determination value in a display unit.

5. The gesture detecting device according to claim 3, at timing when outputting the gesture determination value, giving an operation related to the gesture determination value to a user interface displayed in a display unit.

6. The gesture detecting device according to claim 3, at timing when outputting the gesture determination value, giving an output indicating a gesture mode of the gesture detecting device, the gesture mode being related to the gesture determination value.

7. The gesture detecting device according to claim 6,
wherein the output indicating the gesture mode of the gesture detecting device is a sound output, and
wherein the processor is configured to
at timing when outputting the gesture determination value, output the sound output indicating the gesture mode through a speaker.

8. The gesture detecting device according to claim 6,
wherein the output indicating the gesture mode of the gesture detecting device is an image output, and
wherein the processor is configured to
at timing when outputting the gesture determination value, display the image output indicating the gesture mode in a display unit.

9. The gesture detecting device according to claim 3, further comprising a storage part,
wherein the processor is configured to
store the gesture determination value in the storage part as a time series combination, and
perform an authentication process by determining whether or not the gesture determination value stored as the time series combination corresponds with predetermined information.

10. A gesture recognition device comprising:
the gesture detecting device according to claim 3, and
a neural network calculation unit,
wherein the processor of the gesture detecting device stores a first series of gesture determination values detected by the gesture detecting device in a storage part in time series combination;

the neural network calculation unit converts the first series of gesture determination values stored in the storage part into a neural network input signal, and inputs the converted neural network input signal and a tutor signal to a hierarchical neural network to thereby make the hierarchical neural network learn;

the processor of the gesture detecting device stores a second series of gesture determination values detected by the gesture detecting device in the storage device in time series combination;

the neural network calculation unit converts the second series of gesture determination values stored in the storage part into a neural network input signal, then inputs the neural network input signal to the hierarchical neural network having been made to learn the converted neural network input signal, and thereby obtains an output signal from the hierarchical neural network; and the processor of the gesture detecting device determines a difference between the obtained output signal and the tutor signal, and when the determined difference is equal to or less than an allowable value, recognizes that the second series of gesture determination values are detected for gestures that are same as a series of gestures for which the gesture detecting device detects the first series of gesture determination values.

* * * * *